(12) United States Patent
    Gatzemeyer

(10) Patent No.: US 12,690,664 B2
(45) Date of Patent: **\*Jul. 28, 2026**

(54) ORAL CARE SYSTEM AND METHOD

(71) Applicant: Colgate-Palmolive Company, New York, NY (US)

(72) Inventor: John Gatzemeyer, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,847

(22) Filed: Jun. 2, 2022

(65) Prior Publication Data

US 2023/0132413 A1 May 4, 2023

Related U.S. Application Data

(60) Continuation-in-part of application No. 17/536,273, filed on Nov. 29, 2021, and a continuation-in-part of (Continued)

(51) Int. Cl.
    *A46B 15/00* (2006.01)
    *A46B 9/04* (2006.01)
    *G09B 19/00* (2006.01)

(52) U.S. Cl.
    CPC ............ *A46B 15/0002* (2013.01); *A46B 9/04* (2013.01); *A46B 15/0004* (2013.01);
    (Continued)

(58) Field of Classification Search
    None
    See application file for complete search history.

(56) References Cited

U.S. PATENT DOCUMENTS

| | | | |
|---|---|---|---|
| 4,253,212 A | 3/1981 | Fujita | |
| 4,399,582 A | 8/1983 | Ernest et al. | |

(Continued)

FOREIGN PATENT DOCUMENTS

| | | | |
|---|---|---|---|
| AU | 2001252198 | 9/2002 | |
| CA | 2285781 | 4/2000 | |

(Continued)

OTHER PUBLICATIONS

International Search Report and Written Opinion of the International Searching Authority in International Application No. PCT/US2017/061285, mailed Feb. 27, 2018.

(Continued)

*Primary Examiner* — Xuan M Thai
*Assistant Examiner* — Sadaruz Zaman

(57) ABSTRACT

An oral care system including a toothbrush having a sensor that generates brushing data during a brushing session and a programmable processor. The programmable processor may be configured to receive the brushing data from the sensor, receive oral characteristic data indicative of an oral characteristic of the user, and determine at least one of a suggested brushing routine and a brushing evaluation for a brushing session based at least in part on the oral characteristic data and the brushing data. The oral characteristic may be present in or adjacent to a first portion of the denture. The brushing evaluation or brushing routine may be based on or includes at least one of: an altered target brushing time for the first portion of the denture; and a modified brushing motion expectation for the first portion of the denture.

14 Claims, 46 Drawing Sheets

Related U.S. Application Data application No. 17/302,326, filed on Apr. 30, 2021, and a continuation-in-part of application No. 16/949,630, filed on Nov. 9, 2020, now Pat. No. 11,602,216, said application No. 17/302,326 is a continuation of application No. 15/350,285, filed on Nov. 14, 2016, now Pat. No. 11,043,141, said application No. 17/536,273 is a continuation of application No. 15/350,266, filed on Nov. 14, 2016, now Pat. No. 11,213,120, said application No. 16/949,630 is a division of application No. 15/350,223, filed on Nov. 14, 2016, now Pat. No. 10,835,028, and a continuation-in-part of application No. 15/350,298, filed on Nov. 14, 2016, now Pat. No. 11,361,672.

(52) U.S. Cl.
CPC ...... *A46B 15/0006* (2013.01); *A46B 15/0008* (2013.01); *A46B 15/0012* (2013.01); *A46B 2200/1066* (2013.01); *G09B 19/0084* (2013.01)

(56) References Cited

U.S. PATENT DOCUMENTS

| | | | |
|---|---|---|---|
| 4,450,599 A | 5/1984 | Scheller et al. | |
| 5,383,244 A | 1/1995 | Ahrens et al. | |
| 5,561,881 A | 10/1996 | Klinger et al. | |
| 5,815,872 A | 10/1998 | Meginniss, III et al. | |
| 5,876,207 A | 3/1999 | Sundius et al. | |
| 5,894,620 A | 4/1999 | Polaert et al. | |
| 5,930,858 A | 8/1999 | Jung | |
| 5,944,531 A | 8/1999 | Foley et al. | |
| 6,029,303 A | 2/2000 | Dewan | |
| 6,314,907 B1 | 11/2001 | Harris et al. | |
| 6,326,884 B1 | 12/2001 | Wohlrabe | |
| 6,327,734 B1 | 12/2001 | Meginniss, III et al. | |
| 6,425,295 B1 | 7/2002 | Meginniss | |
| 6,453,497 B1 | 9/2002 | Chiang et al. | |
| 6,468,076 B2 | 10/2002 | Kawamura | |
| 6,536,068 B1 * | 3/2003 | Yang | A46B 15/0002 |
| | | | 15/105 |
| 6,611,780 B2 | 8/2003 | Lundell et al. | |
| 6,630,730 B2 | 10/2003 | Grigg | |
| 6,685,471 B1 | 2/2004 | Kawamura et al. | |
| 6,735,802 B1 | 5/2004 | Lundell et al. | |
| 6,739,012 B2 | 5/2004 | Grez et al. | |
| 6,786,732 B2 * | 9/2004 | Savill | A46B 15/0006 |
| | | | 434/263 |
| 6,923,409 B2 | 8/2005 | Strunk | |
| 7,120,960 B2 | 10/2006 | Hilscher et al. | |
| 7,163,847 B2 | 1/2007 | Antesberger et al. | |
| 7,207,080 B2 | 4/2007 | Hilscher et al. | |
| 7,249,952 B2 | 7/2007 | Ranta et al. | |
| 7,264,026 B2 | 9/2007 | Gruber et al. | |
| 7,411,511 B2 | 8/2008 | Kennish et al. | |
| 7,467,946 B2 | 12/2008 | Rizoiu et al. | |
| 7,682,153 B2 | 3/2010 | Hilfinger et al. | |
| 7,748,069 B2 | 7/2010 | Dawley | |
| 7,774,886 B2 | 8/2010 | Hilscher et al. | |
| 7,976,388 B2 | 7/2011 | Park et al. | |
| 8,065,164 B2 | 11/2011 | Hwang | |
| 8,075,316 B2 | 12/2011 | Krause et al. | |
| 8,161,792 B2 | 4/2012 | Schlueter et al. | |
| 8,171,591 B2 | 5/2012 | Hall et al. | |
| 8,172,574 B2 | 5/2012 | Hilfinger et al. | |
| 8,175,840 B2 | 5/2012 | Hwang et al. | |
| 8,201,295 B2 | 6/2012 | Gatzemeyer et al. | |
| 8,214,958 B2 | 7/2012 | Pinyayev et al. | |
| 8,218,711 B2 | 7/2012 | Neyer | |
| 8,256,979 B2 | 9/2012 | Hilscher et al. | |
| 8,272,091 B2 | 9/2012 | Hwang et al. | |
| 8,296,686 B1 | 10/2012 | Tedesco et al. | |
| 8,332,186 B2 | 12/2012 | Bates et al. | |
| 8,337,213 B2 | 12/2012 | Puurunen et al. | |
| 8,381,571 B2 | 2/2013 | Wilhelm et al. | |
| 8,393,037 B2 | 3/2013 | Wahori et al. | |
| 8,444,416 B2 | 5/2013 | Chenvainu et al. | |
| 8,533,892 B2 | 9/2013 | Dabrowski | |
| 8,544,131 B2 | 10/2013 | Braun et al. | |
| 8,595,882 B2 | 12/2013 | Bax et al. | |
| 8,690,579 B2 | 4/2014 | Ikkink et al. | |
| 8,744,192 B2 | 6/2014 | Ortins et al. | |
| 8,769,758 B2 * | 7/2014 | Jungnickel | A46B 15/0044 |
| | | | 433/141 |
| 8,789,227 B2 | 7/2014 | Cook et al. | |
| 8,801,763 B2 | 8/2014 | Fish et al. | |
| 8,832,895 B2 | 9/2014 | Jungnickel et al. | |
| 8,839,476 B2 | 9/2014 | Adachi | |
| 8,863,343 B2 | 10/2014 | Iwahori | |
| 8,938,839 B2 | 1/2015 | Kitagawa et al. | |
| 8,944,813 B2 | 2/2015 | Kotlarchik | |
| 8,947,358 B2 | 2/2015 | Vetter | |
| 8,966,696 B2 | 3/2015 | Hall | |
| 8,970,141 B2 | 3/2015 | Bax et al. | |
| 8,972,882 B2 | 3/2015 | Berry | |
| 9,009,901 B2 | 4/2015 | Doll et al. | |
| 9,049,920 B2 | 6/2015 | Bernhard et al. | |
| 9,072,370 B2 | 7/2015 | Gatzemeyer et al. | |
| 9,087,457 B2 * | 7/2015 | Drake | G09B 19/0084 |
| 9,105,197 B2 | 8/2015 | Meriheinae et al. | |
| 9,113,700 B2 | 8/2015 | Bates et al. | |
| 9,192,762 B2 | 11/2015 | Doll et al. | |
| 9,204,947 B2 | 12/2015 | Bovenkamp et al. | |
| 9,223,903 B2 | 12/2015 | Lamb et al. | |
| 9,259,302 B2 | 2/2016 | Miller | |
| 9,277,979 B2 * | 3/2016 | Ikkink | A46B 15/004 |
| 9,326,594 B2 | 5/2016 | De Vries et al. | |
| 9,333,048 B2 | 5/2016 | Li et al. | |
| 9,345,408 B2 | 5/2016 | Curry et al. | |
| 9,346,180 B2 | 5/2016 | Molema et al. | |
| 9,383,146 B2 | 7/2016 | Yang | |
| 9,402,463 B2 | 8/2016 | Schmalhurst et al. | |
| 9,408,681 B2 | 8/2016 | Bates et al. | |
| 9,427,078 B2 * | 8/2016 | Farrell | A46B 15/0002 |
| 9,498,053 B2 | 11/2016 | Patel | |
| 9,498,312 B2 | 11/2016 | Dykes et al. | |
| 9,517,015 B2 | 12/2016 | Deane et al. | |
| 9,566,225 B2 | 2/2017 | Sagel et al. | |
| 9,628,014 B2 | 4/2017 | Klemm et al. | |
| 9,642,684 B2 | 5/2017 | Yoshida et al. | |
| 9,648,945 B2 | 5/2017 | Cook et al. | |
| 9,700,129 B2 | 7/2017 | Follows et al. | |
| 9,700,211 B2 | 7/2017 | Simons et al. | |
| 9,723,993 B2 | 8/2017 | Vermeulen | |
| 9,724,001 B2 | 8/2017 | Dykes et al. | |
| 9,750,586 B2 | 9/2017 | Hwang et al. | |
| 9,762,437 B2 | 9/2017 | Apte et al. | |
| 9,811,636 B2 | 11/2017 | Dykes et al. | |
| 9,814,552 B2 | 11/2017 | Spruit et al. | |
| 9,888,763 B2 | 2/2018 | Doll et al. | |
| 9,901,430 B2 | 2/2018 | Boughorbel | |
| 9,927,422 B2 | 3/2018 | Drake et al. | |
| 10,034,730 B2 | 7/2018 | Skaanland et al. | |
| 10,080,633 B2 | 9/2018 | Meerbeek et al. | |
| 10,114,354 B2 | 10/2018 | Simeth | |
| 10,117,508 B2 | 11/2018 | Vetter et al. | |
| 10,172,443 B2 | 1/2019 | Wang et al. | |
| 10,172,552 B2 | 1/2019 | Ohmer et al. | |
| 10,188,203 B2 | 1/2019 | Van Gool et al. | |
| 10,226,314 B2 | 3/2019 | Meerbeek et al. | |
| 10,299,902 B2 | 5/2019 | Vetter et al. | |
| 10,314,387 B2 | 6/2019 | Jungnickel et al. | |
| 10,349,733 B2 | 7/2019 | Serval et al. | |
| 10,398,538 B2 | 9/2019 | Gatzemeyer et al. | |
| 10,441,393 B2 | 10/2019 | Miller | |
| 10,667,891 B2 | 6/2020 | Goddard et al. | |
| 10,813,731 B2 * | 10/2020 | Shreve | A46B 15/0004 |
| 10,835,028 B2 | 11/2020 | Gatzemeyer et al. | |
| 11,043,141 B2 | 6/2021 | Gatzemeyer | |
| 11,213,120 B2 | 1/2022 | Gatzemeyer | |
| 11,523,678 B2 * | 12/2022 | Yang | A46B 15/00 |
| 11,533,986 B2 * | 12/2022 | Pesach | A61C 1/088 |
| 11,602,216 B2 * | 3/2023 | Gatzemeyer | A46B 15/0002 |

(56) References Cited

U.S. PATENT DOCUMENTS

| | | | |
|---|---|---|---|
| 11,666,139 B2* | 6/2023 | Serval | A61B 5/0088 |
| | | | 15/167.1 |
| 2003/0115694 A1 | 6/2003 | Pace | |
| 2005/0136384 A1 | 6/2005 | Jarvis | |
| 2005/0272001 A1 | 12/2005 | Blain et al. | |
| 2006/0008787 A1 | 1/2006 | Hayman et al. | |
| 2006/0040246 A1* | 2/2006 | Ding | G09B 19/0084 |
| | | | 434/263 |
| 2006/0123570 A1 | 6/2006 | Pace et al. | |
| 2007/0027386 A1 | 2/2007 | Such et al. | |
| 2007/0065792 A1 | 3/2007 | Schubarth | |
| 2007/0105063 A1 | 5/2007 | Pinyayev et al. | |
| 2007/0209585 A1* | 9/2007 | Ebensberger | G09B 9/00 |
| | | | 118/682 |
| 2007/0209586 A1* | 9/2007 | Ebensberger | G09B 19/24 |
| | | | 118/682 |
| 2007/0261185 A1 | 11/2007 | Guney et al. | |
| 2008/0028553 A1 | 2/2008 | Batthauer | |
| 2008/0102953 A1 | 5/2008 | Schultz | |
| 2008/0109973 A1 | 5/2008 | Farrell et al. | |
| 2008/0256725 A1 | 10/2008 | Emge | |
| 2008/0295760 A1 | 12/2008 | Wielstra | |
| 2009/0007433 A1 | 1/2009 | Hawes et al. | |
| 2009/0038639 A1 | 2/2009 | Yetukuri et al. | |
| 2009/0070949 A1 | 3/2009 | Sagel et al. | |
| 2009/0092955 A1* | 4/2009 | Hwang | G16H 20/40 |
| | | | 434/263 |
| 2009/0215015 A1* | 8/2009 | Chu | G09B 19/0084 |
| | | | 434/238 |
| 2009/0241278 A1 | 10/2009 | Lemchen | |
| 2009/0271936 A1 | 11/2009 | Walanski et al. | |
| 2010/0024143 A1 | 2/2010 | Dickie | |
| 2010/0269276 A1 | 10/2010 | Faranda et al. | |
| 2010/0281636 A1* | 11/2010 | Ortins | A46B 9/04 |
| | | | 15/4 |
| 2010/0309302 A1 | 12/2010 | Yang | |
| 2010/0319145 A1 | 12/2010 | Neyer et al. | |
| 2011/0029409 A1* | 2/2011 | Ganz | G06Q 20/04 |
| | | | 705/27.1 |
| 2011/0045778 A1 | 2/2011 | Stratmann et al. | |
| 2011/0076638 A1 | 3/2011 | Gottenbos et al. | |
| 2011/0081628 A1 | 4/2011 | Alden, IV et al. | |
| 2011/0229842 A1 | 9/2011 | Bielfeldt et al. | |
| 2011/0247154 A1 | 10/2011 | Driesen et al. | |
| 2011/0275424 A1 | 11/2011 | Schmid et al. | |
| 2011/0294096 A1 | 12/2011 | deCastro et al. | |
| 2011/0297565 A1 | 12/2011 | Stratmann et al. | |
| 2012/0122062 A1* | 5/2012 | Yang | G09B 9/00 |
| | | | 434/219 |
| 2012/0151697 A1 | 6/2012 | Farrell et al. | |
| 2012/0171657 A1* | 7/2012 | Ortins | A61C 17/221 |
| | | | 434/365 |
| 2012/0291212 A1 | 11/2012 | Montagnino et al. | |
| 2012/0295216 A1 | 11/2012 | Dykes et al. | |
| 2013/0125326 A1 | 5/2013 | Schmid et al. | |
| 2013/0125327 A1 | 5/2013 | Schmid et al. | |
| 2013/0180061 A1 | 7/2013 | Simeth et al. | |
| 2013/0203008 A1 | 8/2013 | Kressman et al. | |
| 2013/0204597 A1 | 8/2013 | Depta et al. | |
| 2014/0022061 A1 | 1/2014 | Apte et al. | |
| 2014/0022917 A1 | 1/2014 | Apte et al. | |
| 2014/0022941 A1 | 1/2014 | Apte et al. | |
| 2014/0023060 A1 | 1/2014 | Apte et al. | |
| 2014/0065588 A1* | 3/2014 | Jacobson | A61C 17/225 |
| | | | 15/22.1 |
| 2014/0091001 A1 | 4/2014 | Chan et al. | |
| 2014/0162224 A1* | 6/2014 | Wallace | G09B 5/06 |
| | | | 434/219 |
| 2014/0250612 A1 | 9/2014 | Curry et al. | |
| 2014/0310900 A1 | 10/2014 | Curry et al. | |
| 2014/0359959 A1 | 12/2014 | Jungnickel et al. | |
| 2015/0113747 A1 | 4/2015 | May et al. | |
| 2015/0134369 A1 | 5/2015 | Sakata et al. | |
| 2015/0141774 A1 | 5/2015 | Ogawa et al. | |
| 2015/0157122 A1 | 6/2015 | Prescott | |
| 2015/0202030 A1 | 7/2015 | Miller | |
| 2015/0217465 A1* | 8/2015 | Krenik | B26B 19/388 |
| | | | 700/90 |
| 2015/0230899 A1 | 8/2015 | Vetter et al. | |
| 2015/0244773 A1 | 8/2015 | Wang et al. | |
| 2015/0305626 A1 | 10/2015 | Deane et al. | |
| 2015/0320531 A1 | 11/2015 | Van Gool et al. | |
| 2015/0381923 A1* | 12/2015 | Wickenkamp | H04N 5/783 |
| | | | 386/344 |
| 2016/0242652 A1 | 8/2016 | Van Putten et al. | |
| 2016/0296163 A1 | 10/2016 | Chaudhry et al. | |
| 2016/0338635 A1 | 11/2016 | Johnson et al. | |
| 2016/0343270 A1 | 11/2016 | Zheng et al. | |
| 2017/0116665 A1 | 4/2017 | Alzahrani | |
| 2017/0206804 A1 | 7/2017 | Roszyk et al. | |
| 2017/0280864 A1 | 10/2017 | Lolling | |
| 2017/0318954 A1 | 11/2017 | Nishiura et al. | |
| 2018/0020819 A1 | 1/2018 | Steckling | |
| 2018/0137774 A1 | 5/2018 | Gatzemeyer | |
| 2018/0184857 A1 | 7/2018 | Pai | |
| 2018/0236675 A1* | 8/2018 | Westerhof | G06F 16/9038 |
| 2019/0008270 A1 | 1/2019 | Hardeman et al. | |
| 2020/0253368 A1* | 8/2020 | Laurent | A61C 17/0211 |
| 2021/0256871 A1 | 8/2021 | Gatzemeyer | |
| 2021/0330067 A1 | 10/2021 | Gatzemeyer et al. | |
| 2022/0079329 A1 | 3/2022 | Gatzemeyer | |
| 2023/0240438 A1* | 8/2023 | Gerhardt | A46B 15/0012 |
| | | | 15/21.1 |

FOREIGN PATENT DOCUMENTS

| | | |
|---|---|---|
| CN | 101426450 | 5/2009 |
| CN | 101534745 | 9/2009 |
| CN | 102405029 | 4/2012 |
| CN | 202270341 | 6/2012 |
| CN | 103099423 | 5/2013 |
| CN | 103140189 | 6/2013 |
| CN | 204393684 | 6/2015 |
| CN | 204393685 | 6/2015 |
| CN | 104765952 | 7/2015 |
| CN | 105744911 | 7/2016 |
| DE | 10224043 | 12/2003 |
| DE | 10255722 | 6/2004 |
| DE | 102013015537 | 12/2014 |
| GB | 2097663 | 11/1982 |
| IN | 234961 | 1/2007 |
| IN | 200601965 | 8/2007 |
| IN | 200804686 | 8/2008 |
| IN | 201204976 | 10/2013 |
| IN | 201306137 | 12/2014 |
| JP | H10137040 | 5/1998 |
| JP | 2001-327331 | 11/2001 |
| JP | 2002-181812 | 6/2002 |
| JP | 2003-093416 | 4/2003 |
| JP | 2006-235809 | 9/2006 |
| JP | 2010-172384 | 8/2010 |
| JP | 04543663 | 9/2010 |
| JP | 2012-086022 | 5/2012 |
| JP | 2014-023796 | 2/2014 |
| KR | 20070103055 | 10/2007 |
| RU | 2388430 | 4/2009 |
| WO | 1999/047020 | 9/1999 |
| WO | 2006/098719 | 9/2006 |
| WO | 2007/032015 | 3/2007 |
| WO | 2007/122491 | 11/2007 |
| WO | 2008/058817 | 5/2008 |
| WO | 2008/060482 | 5/2008 |
| WO | 2008/147360 | 12/2008 |
| WO | 2009/001295 | 12/2008 |
| WO | 2010/129755 | 11/2010 |
| WO | 2010/134049 | 11/2010 |
| WO | 2010/134051 | 11/2010 |
| WO | 2012/042493 | 4/2012 |
| WO | 2013/084403 | 6/2013 |
| WO | 2014/016718 | 1/2014 |
| WO | 2014/097022 | 6/2014 |
| WO | 2014/097135 | 6/2014 |
| WO | 2014/097240 | 6/2014 |

(56) References Cited

FOREIGN PATENT DOCUMENTS

| | | |
|---|---|---|
| WO | 2015/003939 | 1/2015 |
| WO | 2015/092125 | 6/2015 |
| WO | 2015/092626 | 6/2015 |
| WO | 2015/140340 | 9/2015 |
| WO | 2015/177661 | 11/2015 |
| WO | 2016/016323 | 2/2016 |
| WO | 2016/020780 | 2/2016 |
| WO | 2016/020803 | 2/2016 |
| WO | 2016/046701 | 3/2016 |
| WO | 2016/047793 | 3/2016 |
| WO | 2016/097907 | 6/2016 |
| WO | 2018/089886 | 5/2018 |
| WO | 2018/089888 | 5/2018 |
| WO | 2018/089899 | 5/2018 |

OTHER PUBLICATIONS

International Search Report and Written Opinion of the International Searching Authority in International Application No. PCT/US2017/061291, mailed Feb. 27, 2018.

International Search Report and Written Opinion of the International Searching Authority in International Application No. PCT/US2017/061312, mailed Feb. 27, 2018.

International Search Report and Written Opinion of the International Searching Authority in International Application No. PCT/US2017/061321, mailed Feb. 27, 2018.

Philips FlexCare+ Sonic Electric Toothbrush HX6993_03 _ Sonicare, https://web.archive.org/web/20160313041800/https://www.philips.com.au/pp/HX6993_03/sonicare-flexcare-plus-sonic-electric-toothbrush; retrieved on Aug. 24, 2020, published Mar. 13, 2016 per Wayback Machine, pp. 1-5.

* cited by examiner

165

221

223

Receive physical property data associated with oral care device

225

Determine offset time using physical property data

227

Calculate brushing time

229

Display brushing time

231

Instruct user to start brushing routine

233

Display time remaining in brushing routine

251

255

259

257

253

1219

1225

1261

Initiate brushing routine —1263

Generate sensor data from toothbrush motion —1265

Determine brush stroke motion from sensor data —1267

Determine offset time from brush stroke motion —1269

Calculate brushing time / remaining brushing time —1271

Display brushing time / remaining brushing time —1273

No | Is brushing time expired? —1275

Yes

Indicate to user end of brushing routine —1277

3165

3200

3202

Receive Oral
Characteristic Data

3204

Determine Brushing
Routine

3206

Determine Brushing
Evaluation

3103B

3303B

3175B

ORAL CARE SYSTEM AND METHOD

CROSS-REFERENCE TO RELATED PATENT APPLICATIONS

The present application is a continuation-in-part of: (1) U.S. patent application Ser. No. 17/536,273, filed Nov. 29, 2021, which is a continuation of U.S. patent application Ser. No. 15/350,266, filed Nov. 14, 2016, now U.S. Pat. No. 11,213,120; (2) U.S. patent application Ser. No. 16/949,630, filed Nov. 9, 2020, which is a divisional of U.S. patent application Ser. No. 15/350,223, filed Nov. 14, 2016, now U.S. Pat. No. 10,835,028; (3) U.S. patent application Ser. No. 17/302,326, filed Apr. 30, 2021, which is a continuation of U.S. patent application Ser. No. 15/350,285, filed Nov. 14, 2016, now U.S. Pat. No. 11,043,141; and (4) U.S. patent application Ser. No. 15/350,298, filed Nov. 14, 2016. The aforementioned priority applications are incorporated herein by reference in their entireties.

BACKGROUND

In attempting to improve oral care routines, it is typical to focus on the oral care routine employed by an individual and how that oral care routine differs from an accepted standard. The individual is then guided on how to change their oral care routine to better conform with the accepted standard. By conforming to the standard, it is expected that the overall effectiveness of the individual's oral care routine will improve, thereby improving the oral health of the individual. Having everyone conform to an accepted standard is an ideal, and perhaps not one that everyone is capable of achieving. For those who cannot or do not conform to the accepted standard for an oral care routine, for whatever the reason, it is desirable to provide a system and method that can still aid them in maintaining an effective oral care routine.

Furthermore, an oral care system can utilize one or more sensors to evaluate the effectiveness of a brushing session. These approaches, however, do not consider that a user may have different goals for different brushing sessions or that different users may have different oral characteristics. For example, while an evening brushing session may be intended for a deep cleaning, an afternoon brushing session may be intended as a quick cleaning to remove noticeable food particles and freshen the breath. In addition, a user may have oral sensitivity in a certain area of the mouth that affects the user's ability to brush teeth in this area. Thus, there is need for a method of determining a brushing routine and/or evaluating a brushing session that considers the user's brushing goals and unique oral characteristics.

BRIEF SUMMARY

One aspect of the present disclosure may be directed to an oral care systems and methods which adapt a user's brushing routine and/or brushing evaluation to account for one or more physical properties of a selected toothbrush. The oral care system may include an oral care device and a data processing unit. In one embodiment, the data processing unit collects data concerning one or more physical properties of the toothbrush being used, and based on the collected data, the data processing unit determines a suggested brushing routine for the user and/or an evaluation of a brushing session of a user.

In one embodiment, the oral care system includes: a toothbrush having a physical property; and a programmable processor configured to: receive physical property data indicative of the physical property of the toothbrush; and determine a suggested brushing routine based at least in part upon the received physical property data.

In another embodiment, the invention can be an oral care system including: a toothbrush comprising a physical property; and a programmable processor configured to: receive physical property data indicative of the physical property of the toothbrush; and determine an evaluation of a brushing session based at least in part upon the physical property data.

In yet another embodiment, the invention may be a method for oral care including: receiving, by a programmable processor, physical property data indicative of a physical property of a toothbrush; and determining, by the programmable processor, a suggested brushing routine based at least in part upon the received physical property data.

In still another embodiment, the invention may be a method for oral care including: receiving, by a programmable processor, physical property data indicative of a physical property of a toothbrush; and determining, by the programmable processor, an evaluation of a brushing session based at least in part upon the physical property data.

Another aspect of the present disclosure may be directed to an oral care systems and methods which adapt to a user's brushing routine, taking into account the user's brushing habits, in order to improve the overall efficacy of the user's brushing routine. The oral care system includes an oral care device and a programmable processor. In one embodiment, the oral care device generates data concerning a user's brushing habits and the programmable processor analyzes the generated data. The programmable processor determines a target brushing time based upon the generated data and may communicate the target brushing time to the user during the brushing routine. The target brushing time may be determined section-by-section for the user's denture, thereby accounting for the user's different brushing habits for different sections of their denture. In addition, the target brushing time may be adjusted in real time to account for changes in the user's brushing habits. The oral care method includes steps of generating data concerning a user's brushing habits and determining appropriate target brushing time based upon the generated data. The target brushing time may also be communicated to the user during the brushing routine.

In another embodiment, the invention can be an oral care system including: an oral care device including: at least one teeth cleaning element; and at least one sensor configured to detect motion of the oral care device during a brushing routine of a user and to generate sensor data corresponding to the detected motion; and a programmable processor configured to: receive the sensor data generated by the at least one sensor; and determine a target brushing time based on the sensor data.

In yet another embodiment, the invention may be an oral care system including: an oral care device including: at least one teeth cleaning element; at least one sensor configured to detect a brushing intensity during a brushing routine of a user and to generate sensor data corresponding to the detected brushing intensity; and a programmable processor configured to: receive the sensor data generated by the at least one sensor; and determine a target brushing time based on the sensor data.

In another embodiment, the invention may be a method for oral care including: a) receiving sensor data from at least one sensor configured to detect motion of an oral care device during a brushing routine of a user, the sensor data corresponding to the detected motion; and b) determining a target brushing time based on the sensor data.

In still another embodiment, the invention may be a method for oral care including: a) receiving sensor data from at least one sensor configured to detect brushing intensity during a brushing routine of a user, the sensor data corresponding to the detected brushing intensity; and b) determining a target brushing time based on the sensor data.

Another aspect of the present disclosure may be directed to an oral care system including a toothbrush; a user interface configured to receive a brushing goal from a user; and a programmable processor operably coupled to the user interface, the programmable processor configured to receive brushing goal data indicative of the brushing goal received by the user interface; and determine, based at least in part on the brushing goal data, at least one of a suggested brushing routine and a brushing evaluation for a brushing session.

In another embodiment, an oral care method includes receiving, at a user interface, a brushing goal from a user; generating brushing goal data indicative of the brushing goal received by the user interface; and determining, at a programmable processor, at least one of a suggested brushing routine that is based at least in part on the brushing goal data; and a brushing evaluation for a brushing session that is based at least in part on the brushing goal data.

In yet another embodiment, an oral care system includes a toothbrush; and a data processing unit comprising a user interface configured to receive a brushing goal from a user; and a programmable processor operably coupled to the user interface, the programmable processor configured to receive brushing goal data indicative of the brushing goal received by the user interface; determine a suggested brushing routine based at least in part on the brushing goal data; and determine a brushing evaluation for a brushing session based at least in part on the brushing goal data and brushing data from the brushing session.

Another aspect of the present disclosure may be directed to an oral care system including a toothbrush; a programmable processor configured to receive oral characteristic data indicative of an oral characteristic of a user; and determine for the user, based at least in part on the oral characteristic data, at least one of a suggested brushing routine and a brushing evaluation for a brushing session.

In another embodiment, an oral care method includes receiving, by a programmable processor, oral characteristic data indicative of an oral characteristic of a user; and determining for the user, by the programmable processor, based at least in part on the oral characteristic data, at least one of a suggested brushing routine and a brushing evaluation for a brushing session.

In yet another embodiment, an oral care system includes a toothbrush; and a data processing unit comprising a user interface configured to receive an oral characteristic from a user; and a programmable processor configured to receive oral characteristic data indicative of the oral characteristic received by the user interface; determine for the user, based at least in part on the oral characteristic data, a suggested brushing routine; and determine for the user, based at least in part on the oral characteristic data, a brushing evaluation for a brushing session.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

4

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1A:
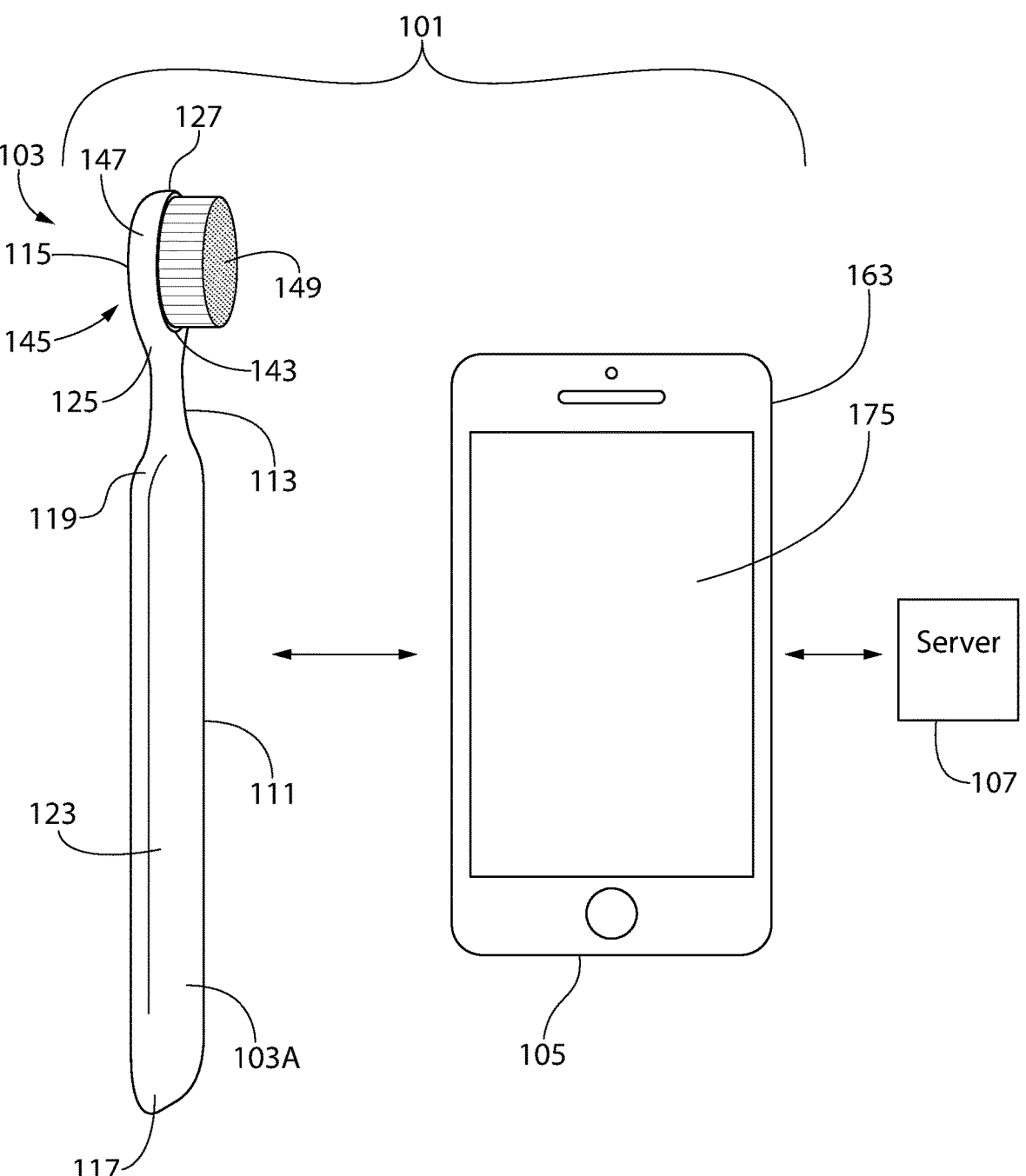
FIG. 1A illustrates an oral care system in accordance with an embodiment of the present invention, the oral care system being in communication with a server.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper." "horizontal," "vertical," "above." "below," "up." "down," "left," "right." "top" and "bottom" as well as derivatives thereof (e.g., "horizontally," "downwardly." "upwardly." etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Further, as used herein, the phrase "based on" is to be interpreted as meaning "based at least in part on," and therefore is not limited to an interpretation of "based entirely on." Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), microprocessor, micro-controller, computational, or programmable device or circuit configured for executing computer program instructions (e.g. code). As used herein, the terms "processor" and "programmable processor" are used interchangeably. Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1A illustrates an oral care system 101 in accordance with an embodiment of the present invention. The oral care system 101 includes a toothbrush 103 and a data processing unit 105. The data processing unit 105 may communicate with a server 107 for purposes of storing larger amounts of data or to provide server-side processing functionality. The presence of the server 107 and communication between the data processing unit 105 and the server 107, however, are not limiting of the present invention, unless specifically set forth in a claim.

The toothbrush 103 may be of any type which includes teeth cleaning elements suitable for cleaning teeth. The toothbrush 103 includes at least one physical property, which may be any feature of the toothbrush related to cleaning teeth or to oral care in general. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an oral care additive, whether the toothbrush is manual or electric, the presence of an electrically-powered vibratory element, the presence of an elastomeric element in the bristle field, the presence of a tongue cleaner, the mobility of a first portion of the toothbrush with respect to a second portion of the toothbrush, and the like, amongst many other types of physical properties. Certain physical properties of toothbrushes are discussed further below, and the invention is not limited to any particular physical property of a toothbrush unless specifically set forth in a claim. It is also to be understood, therefore, that the invention is not limited to the toothbrush 103 illustrated as part of the exemplary embodiment.

The toothbrush 103 shown in FIG. 1A generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing session. The handle 111 may be formed of many different shapes, sizes and materials and may be formed by a variety of manufacturing methods that are well-known to those skilled in the art. The handle 111 extends from a proximal end 117 to a distal end 119 to form an elongated gripping portion 123 therebetween. The handle 111 transitions into the neck 113 at the distal end 119. While the neck 113 generally has a smaller transverse cross-sectional area than the handle 111, the invention is not so limited. Broadly speaking, the neck 113 forms a transition region between the handle 111 and the head 115, with the head 115 extending from a proximal end 125 at the end of the neck 113 opposite the handle 111 to a distal end 127. While the head 115 is normally widened relative to the neck 113, in some embodiments the head 115 can simply be a continuous extension or narrowing of the neck 113 and/or handle 111.

The handle 111, the neck 113, and the head 115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 111, the neck 113, and the head 115 of the toothbrush 103 may be formed as a single unitary structure using a molding, milling, machining, or other suitable process. In certain embodiments, the neck 113 may be made from a material which is more flexible than the handle 111 or the head 115, and in such embodiments, the flexibility of the neck 113 provides the head 115 with mobility with respect to the handle 111. Whether the handle 111, the neck 113, and the head 115 are of a unitary or multi-piece construction (including connection techniques) is not limiting of the present invention, unless specifically set forth in a claim. In some embodiments of the invention, the head 115 can have a first portion that is flexibly attached to a second portion of the head 115. During brushing, the first portion can move with respect to the second portion to enhance the brush head's ability to reach certain portions of the denture. In some embodiments of the invention, the head 115 may be detachable (and replaceable) from the handle 111 and/or from the neck 113 using techniques known in the art.

The head 115 generally includes a front surface 143, a rear surface 145 and peripheral side surfaces 147 that extend between the front and rear surfaces 143, 145. The front surface 143 and the rear surface 145 of the head 115 can take on a wide variety of shapes and contours, none of which are limiting of the present invention. For example, the front and rear surfaces 143, 145 can be planar, contoured or combinations thereof.

The front surface 143 of the head 115 includes at least one teeth cleaning element, shown in the exemplary embodiment as a plurality of bristles 149, extending therefrom for cleaning teeth surfaces. As used herein, the term "teeth cleaning element" is used in a generic sense to refer to any structure that can be used to clean or polish the teeth through relative surface contact. In certain embodiments, the head 115 may include a single teeth cleaning element, and in other embodiments, the head 115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 149 of the toothbrush 111 can be connected to the head 115 in any manner known in the art. For example, staples/anchors, in-mold tufting (IMT) or anchor free tufting (AFT) could be used to mount the bristles 149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 1B:
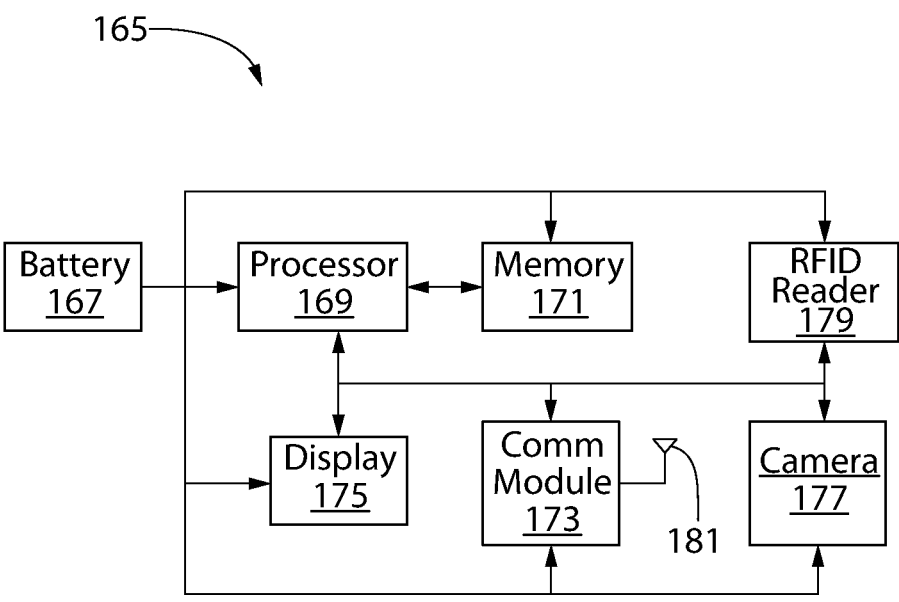
FIG. 1B schematically illustrates electronic components of the data processing unit shown in FIG. 1A.

Referring to both FIGS. 1A and 1B, the data processing unit 105 includes a housing 163 and electronic circuitry 165, with the housing 163 enclosing and/or supporting the various components of the electronic circuitry 165. The electronic circuitry 165 includes a power source, shown as a battery 167 in the exemplary embodiment. Of course, the invention is not so limited, and other types of power sources may be used. The electronic circuitry 165 also includes a processor 169 communicably coupled to a memory 171, a communication module 173, a display 175, an optical imaging subsystem which is shown as a camera 177, and a radio frequency identifier (RFID) tag reader 179.

In certain embodiments, one or both of the optical imaging subsystem 177 and the RFID tag reader 179 may be excluded as optional parts of the electronic circuitry 165. In certain embodiments, the electronic circuitry 165 may include other components, such as a speaker to provide audible feedback to the user, one or more buttons to receive input from the user, and one or more ports for making a wired connection between the electronic circuitry 165 and other circuitry external to the data processing unit 105. In certain other embodiments, the data processing unit 105 may be a smartphone, a tablet computer, a laptop computer, and the like, although the invention is not so limiting. In the exemplified embodiment, the electronic circuitry 165 is located within housing 163 of the data processing unit 105, this housing 163 being separate and distinct from the housing 103A of the toothbrush 103 In other embodiments, the electronic circuitry 165 or certain components thereof may be located within the housing 103A of the toothbrush 103.

The memory 171 may be any appropriate type of memory or storage which enables the processor 169 to perform the desired programming, such as volatile and/or non-volatile random access memory. The particular type of storage used for the memory 171 is not to be limiting of the invention.

The display 175 may be any type of light emitting display, and as shown in the exemplary embodiment, the display 175 may be an LED panel. In certain other embodiments, the display 175 may be an LCD panel, an OLED panel, or any other type of display which is electronically controllable by the programmable processor 169 to provide visual feedback to the user. In certain embodiments, the display 175 may be a touch sensitive display which accepts input from the user directly on the display surface. Such a touch sensitive display may therefore serve as a user interface for the data processing unit 105. The type and configuration of the display 175 is not limiting of the invention unless specifically set forth in a claim. Similarly, the type and configuration of the user interface is not limiting of the invention unless specifically set forth in a claim.

The communication module 173 may include an antenna 181 to enable wireless transmission of communication signals. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like.

The communication module 173 of the data processing unit 105 may be configured and/or programmed to communicate with the server 107. The communication module 173 may communicate with the server 107 over any combination of public and/or private network, and the communications may be wired, wireless, or a combination of the two. In certain embodiments, the communication module 173 may communicate with the server 107 over the Internet using one or more types of communication protocols. In certain embodiments, the server 107 may be programmed with one or more application programming interfaces (APIs) which provides server-side functionality to the data processing unit 105.

Figure 2:
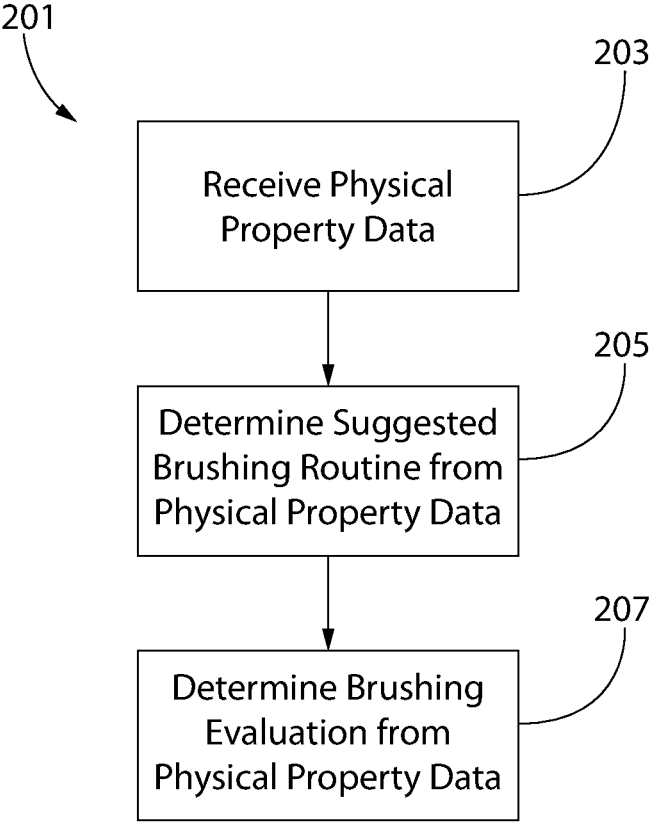
FIG. 2 is a flowchart showing a process for determining a brushing routine and a brushing evaluation from one or more physical properties of a toothbrush in accordance with an embodiment of the invention.

A flowchart 201 showing an exemplary process for determining a suggested brushing routine is shown in FIG. 2. The process of this flowchart 201 may be implemented as programming for the programmable processor 169 of the data processing unit 105. For convenience, as part of the description below, reference will also be made to the hardware components of the data processing unit 105 discussed above in FIG. 1B. While in the exemplified embodiment the processor 169 and other electronic circuitry 165 form part of the data processing unit, the disclosure is not so limited. For example, in other embodiments, a processor forming part of the toothbrush can carry out the steps carried out by processor 169 in the embodiments discussed herein.

The process starts out with a receiving step 203 in which the processor 169 receives physical property data associated with the toothbrush. The physical property data that is received is representative of one or more physical properties of the toothbrush. For purposes of the present disclosure, the term "physical property data" is any type of information indicative of a physical property of a toothbrush, including information extracted or derived from other information or data indicative of a physical property of a toothbrush, regardless of the form of the extracted information. The physical property data may be in the form of mathematical data, analog data, and/or digital data.

As is discussed below, receiving step 203 may be achieved in any number of ways. In certain embodiments, the user may input the physical property data through a user interface of the data processing unit 105. In such embodiments, the data processing unit 105 may use the display 175 to present to the user one or more questions concerning at least one physical property of the toothbrush and then receive the physical property data as answers to the one or more questions. In certain embodiments, the physical property data may be received by the data processing unit by imaging the toothbrush or indicia associated with the toothbrush using the camera 177. In certain embodiments, the physical property data may be received using the RFID tag reader 179. In certain embodiments, the physical property data may be received from the server 107 in response to a toothbrush identifier being transmitted to the server 107 by the data processing unit 105. The toothbrush identifier may be input using any one or more of the user interface, the camera 177, the RFID tag reader 179, and/or any other subsystem that may be included as part of the data processing unit 105. In still other embodiments, one or more of the aforementioned processes for receiving the physical property data may be used in combination.

Following the receiving step 203 is a determining step 205, and in this determining step 205 a suggested brushing routine is determined based upon the received physical property data. This determining step 205 may also be achieved in any number of ways. In certain embodiments, the suggested brushing routine may be determined by presenting the user with a list of potential brushing routines and having the user select the suggested brushing routine from among the list of potential brushing routines. In certain embodiments, the suggested brushing routine may be determined by making adjustments to a standardized brushing time based on the physical property data, as described below. In certain embodiments, the suggested brushing routine may be determined by selecting a predetermined brushing routine based on the physical property data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 171 of the data processing unit 105 or in a memory of the server 107. In still other embodiments, one or more of the aforementioned processes for determining the suggested brushing routine may be used in combination.

In the exemplified embodiment, after determining the suggested brushing routine, there is a determination of a brushing evaluation based on the physical property data (step 207). As will be discussed in further detail below, the oral care system 101 can be configured to perform a brushing evaluation of a brushing session of a user. For example, the toothbrush 103 can include sensors, and data derived from the sensors can be used to determine the motion and/or location of the toothbrush. From this determination, the system 101 can determine how well the user brushed his or her teeth. In the exemplified embodiment, this determination is based in part on the physical property data received in step 203. For example, if a user is using a soft-bristled toothbrush, an adequate cleaning of a region may require 20 seconds of brushing. But if a user is using a hard-bristled toothbrush, an adequate cleaning of a region may require only 10 seconds of brushing. In other embodiments, other physical properties and other bases of evaluation can be utilized. For example, a shape of a brush head can inform the system 101 whether a certain brushing motion is effective, and the evaluation can be generated accordingly.

In the foregoing method 201, the physical property data is used to both determine a suggested brushing routine and determine a brushing evaluation. In other embodiments, however, the physical property can be used to determine a suggested brushing routine but not to determine a brushing evaluation, or to determine a brushing evaluation but not to determine a suggested brushing routine.

Figure 3A:
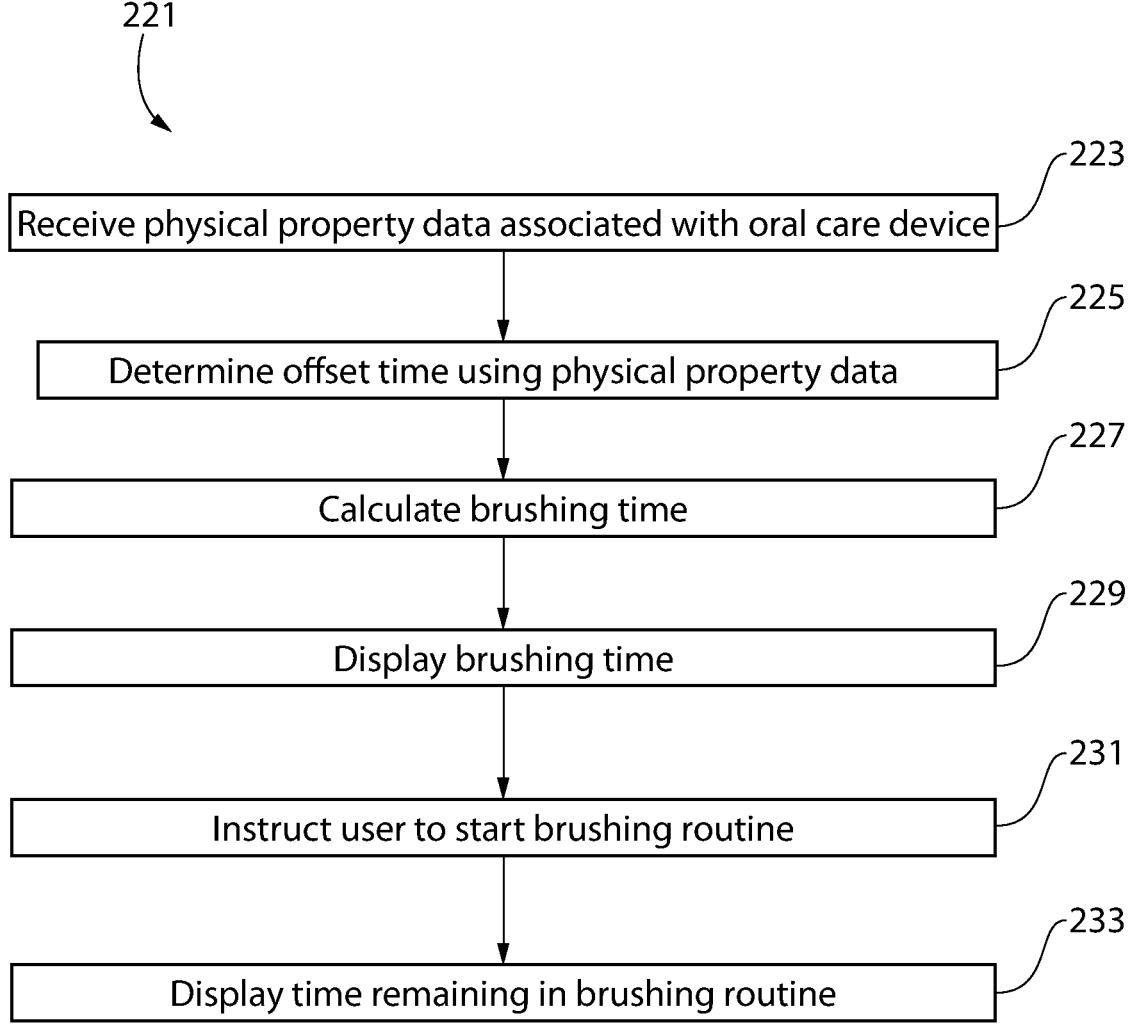
FIG. 3A is a flowchart showing a process for determining a brushing routine from one or more physical properties of a toothbrush in accordance with an embodiment of the invention.

FIG. 3A is a flowchart 221 showing a more detailed version of an embodiment for the process of determining a suggested brushing routine. In the process of this flowchart 221, the suggested brushing routine is determined by adjusting an optimum brushing time based on the received physical property data to determine the brushing time for the suggested brushing routine. The optimum brushing time is predetermined from a standardized brushing routine. In certain embodiments, the standardized brushing routine may be an industry standard brushing routine in which the optimum brushing time is 2 minutes. This process begins with an input step 223 in which the physical property data is received by the data processing unit 105. The physical property data may be received in any one or combination of several different ways as discussed herein. Following the input step 223 is an offset time determining step 225. In this step 225, the data processing unit 105 determines an offset time based on the input physical property data. For example, if the physical property data indicates that the bristles are extra soft, then the offset time may be a positive number. By way of another example, if the physical property data indicates that the bristles are firm, then the offset time may be a negative number. In certain embodiments, the data processing unit may communicate with a server to transmit an identifier for the toothbrush and receive in response the physical property data.

Following the offset time determining step 225 is a brushing time calculation step 227. In this step 227, the brushing time for the brushing routine is calculated. As part of this step 227, the programmable processor 169 of the data processing unit 105 calculates the brushing time by retrieving an optimum time which is stored in the memory 171 and adding the determined offset time to the optimum time. For purposes of the process shown in this flowchart 221, the optimum time represents an established industry standard for brushing effectiveness. As should be apparent, the offset time may increase the brushing time in excess of the optimum time, or the offset time may decrease the brushing time to be less than the optimum time.

After the brushing time calculation step 227 is a displaying step 229. During this step 229, the programmable processor 169 of the data processing unit 105 controls the display 175 to indicate to the user the determined brushing time for the suggested brushing routine. Next, the programmable processor 169 of the data processing unit 105 proceeds to an instruction step 231 in which the user is instructed to begin the suggested brushing routine. In certain embodiments, the processor 169 of the data processing unit 105 may provide other specific instructions for the brushing routine, such as the order for brushing different sections of the user's denture, the length of time to brush each section, which section to start with, and the like. When the brushing time has expired, the programmable processor 169 of the data processing unit 105 proceeds to an indication step 233, in which the user is instructed that the brushing routine is at an end.

Figure 3B:
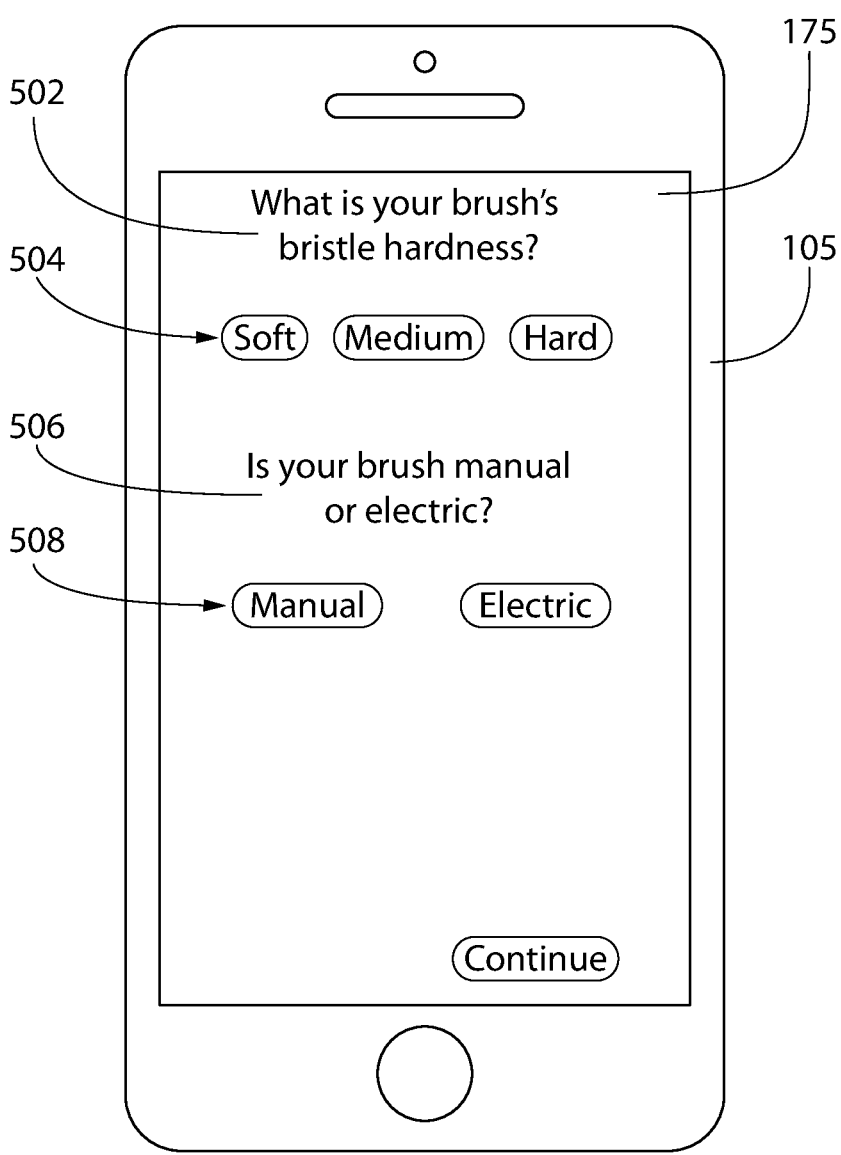
FIG. 3B is illustrates a data processing unit having a user interface whereby a user may input physical property data.

FIG. 3B illustrates a data processing unit 105 having a user interface 175 according to one embodiment. Here, the user may input the physical property data through the user interface 175. In such embodiments, the data processing unit 105 may present to the user using the user interface one or more questions 502, 506 concerning at least one physical property of the toothbrush, and then receive the physical property data as answers 504, 508 to the one or more questions, the answers being received by the user selecting the answers using the user interface. The questions and answers shown are merely exemplary in nature, and any of the physical properties discussed herein (as well as others) can be the subject of a question or answer on a user interface for the purposes of receiving physical property data.

Figure 3C:
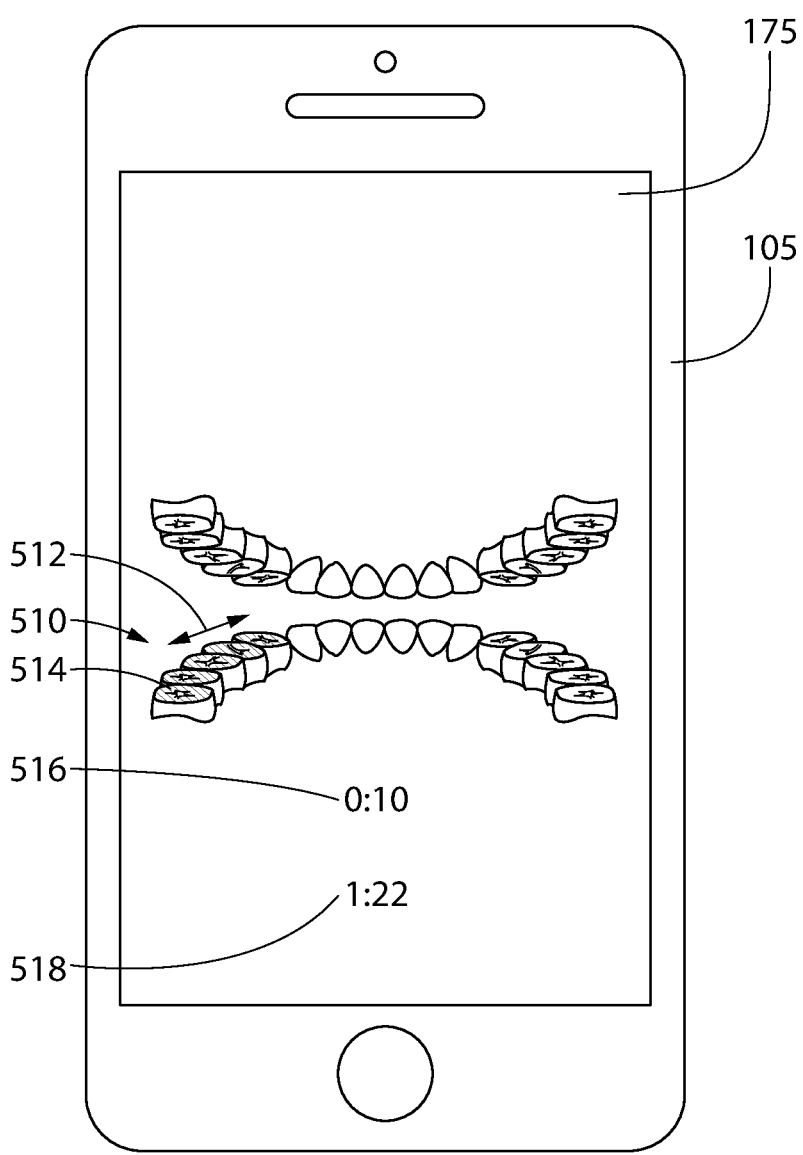
FIG. 3C is illustrates a data processing unit having a user interface providing brushing instructions for a brushing routine.

FIG. 3C illustrates a data processing unit 105 whose user interface 175 can provide brushing instructions 510 for a suggested brushing routine based at least in part on the physical property data received. In this embodiment, the brushing instructions 510 comprise real-time directions for a user to follow during a brushing session. The instructions comprise an indication 514 of a region of the denture to brush, an indication 512 of a brushing motion, and an indication 516 of a time remaining for brushing the specified region. In this embodiment, the user interface 175 also provides an indication 518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity.

The suggested brushing routine can be determined by adjusting a preexisting brushing routine, the adjustment based at least in part on the physical property data. In other embodiments, the suggested brushing routine need not rely on a preexisting brushing routine.

Figure 3D:
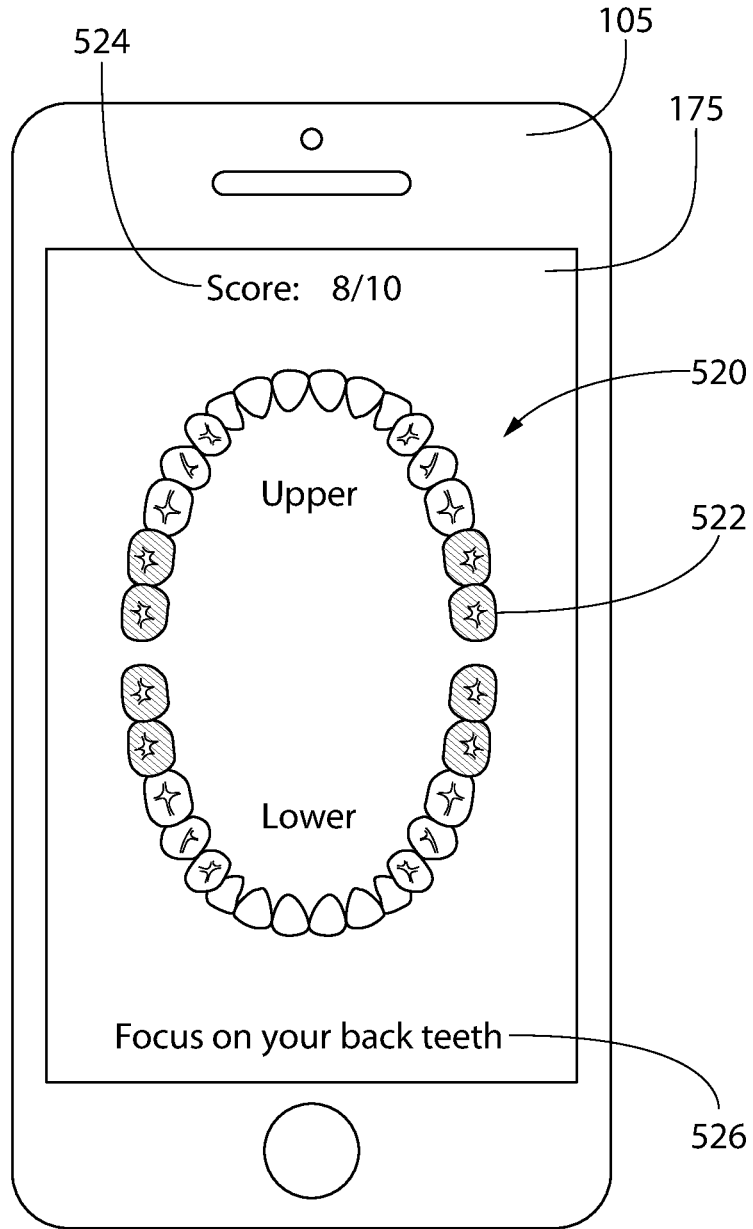
FIG. 3D is a data processing unit having a user interface providing an evaluation of a brushing session of a user.

FIG. 3D illustrates a data processing unit 105 whose user interface 175 can provide an evaluation of a brushing session of a user. In this embodiment, the user interface 175 provides a visualization 520 of the user's denture. The denture can be divided into different sections, each of which the user is expected to brush during the brushing session. Brushing session data may be collected and processed according to the different portions of the denture. The collection of such brushing session data is described in more detail below with respect to FIGS. 11-13.

In the exemplified embodiment, the visualization 520 includes an indication 522 of a region of the denture not properly brushed. Further a recommendation 526 provides the user advice on how to improve his or her brushing. The visualization 520 also includes a performance metric 524 that indicates how well the user performed in brushing his or her teeth during the brushing session. In other embodiments, other metrics or visualizations can be used to indicate brushing performance, such as a percentage, or a number of stars (for example, three stars out of five).

Figure 4:
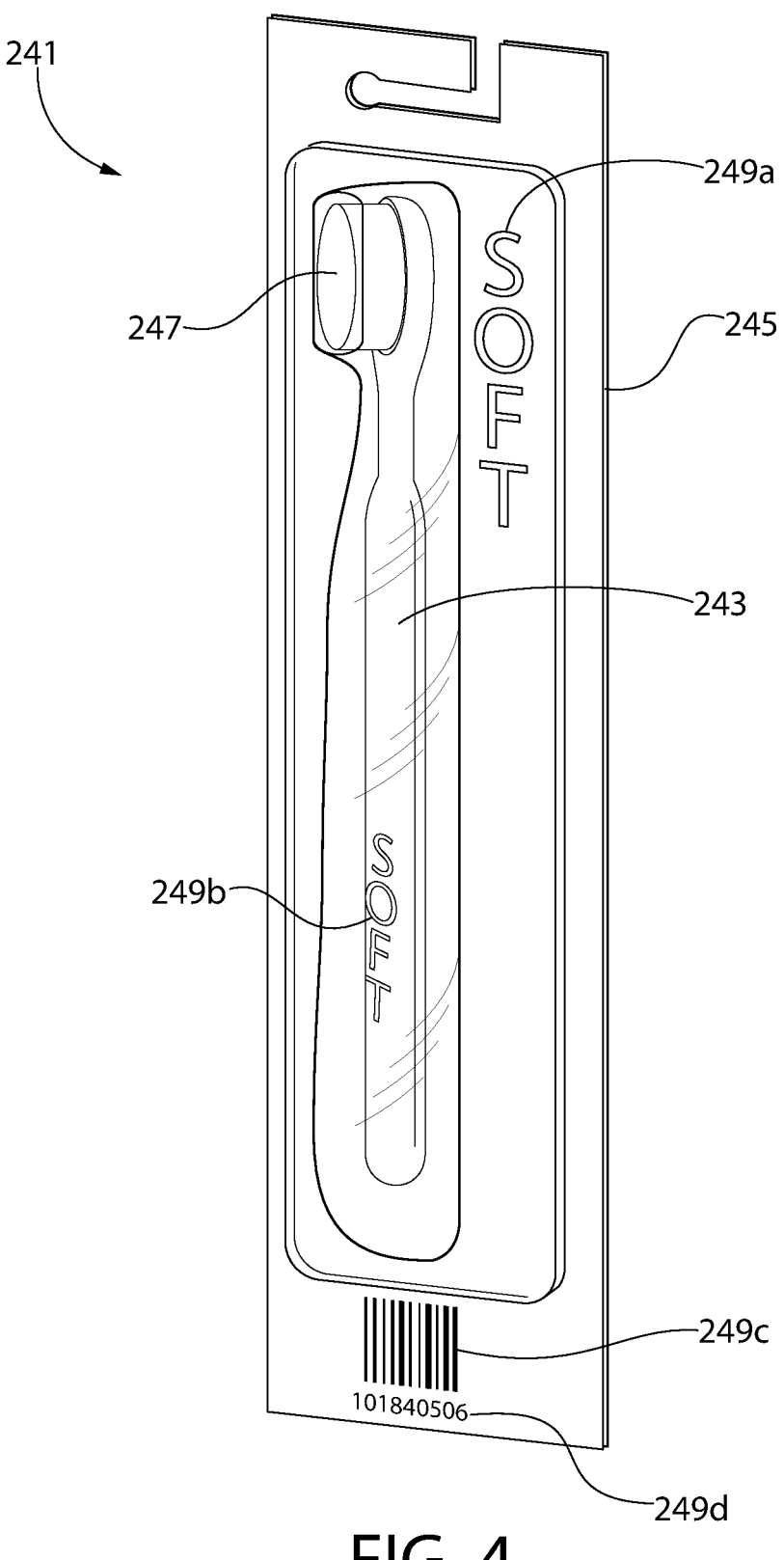
FIG. 4 illustrates a toothbrush in a packaging for use as part of an oral care system in accordance with another embodiment of the present invention.

FIG. 4 illustrates a commercial product 241 which includes a toothbrush 243 enclosed within a packaging 245. The toothbrush 243 may be any type or style of toothbrush, whether manual or electric, and the toothbrush 243 has at least one physical property which makes it suitable for cleaning teeth. Although the toothbrush 243 is shown in the packaging 245, the packaging 245 is not a required component for the invention.

The toothbrush 243 depicted includes at least one teeth cleaning element, shown in this embodiment as a plurality of bristles 247, and both the toothbrush 243 and the packaging 245 bear an indicia 249_a-b_ indicating a physical property associated with the bristles 247. Specifically, the indicia 249_a-b_ is a word descriptor indicating that the bristles 247 are 'SOFT'. As is typical in the oral care industry, toothbrush bristles are often categorized as 'extra soft', 'soft', 'medium', or 'firm', and these categorizations represent physical properties of the bristles. The categorization of the toothbrush may be input by the user into the data processing unit 105 as the physical property data for the toothbrush. The packaging 245 also bears other indicia 249_c-d_ which can be used to determine the physical property data associated with the toothbrush 247 or parts thereof. One of these indicia 249_c_ is a coded image, which in this embodiment is shown as a barcode. Such a coded image may be imaged by the camera 177 of the data processing unit 105. The coded image may provide the physical property data directly, or it may provide information about a manufacturer and/or model number to enable determination of the physical property data. In certain embodiments, the coded image may be a quick response (QR) code. The other of these indicia 249_d_ is an alphanumeric product identifier, which may also provide information about a manufacturer and/or model number.

The indicia 249_a-d_ may be any type of identifying mark which directly or indirectly represent the at least one physical property of the toothbrush 243 and from which the physical property data may be determined. For indirect representation, the indicia 249_a-d_ may enable the physical property data to be obtained by reference to information stored in the memory 171, from the server 107, or from any public source or database. In certain embodiments, the indicia 249_a-d_ may represent a plurality of physical properties of the toothbrush 243, and the physical properties may be any associated with the toothbrush 243.

Figure 5:
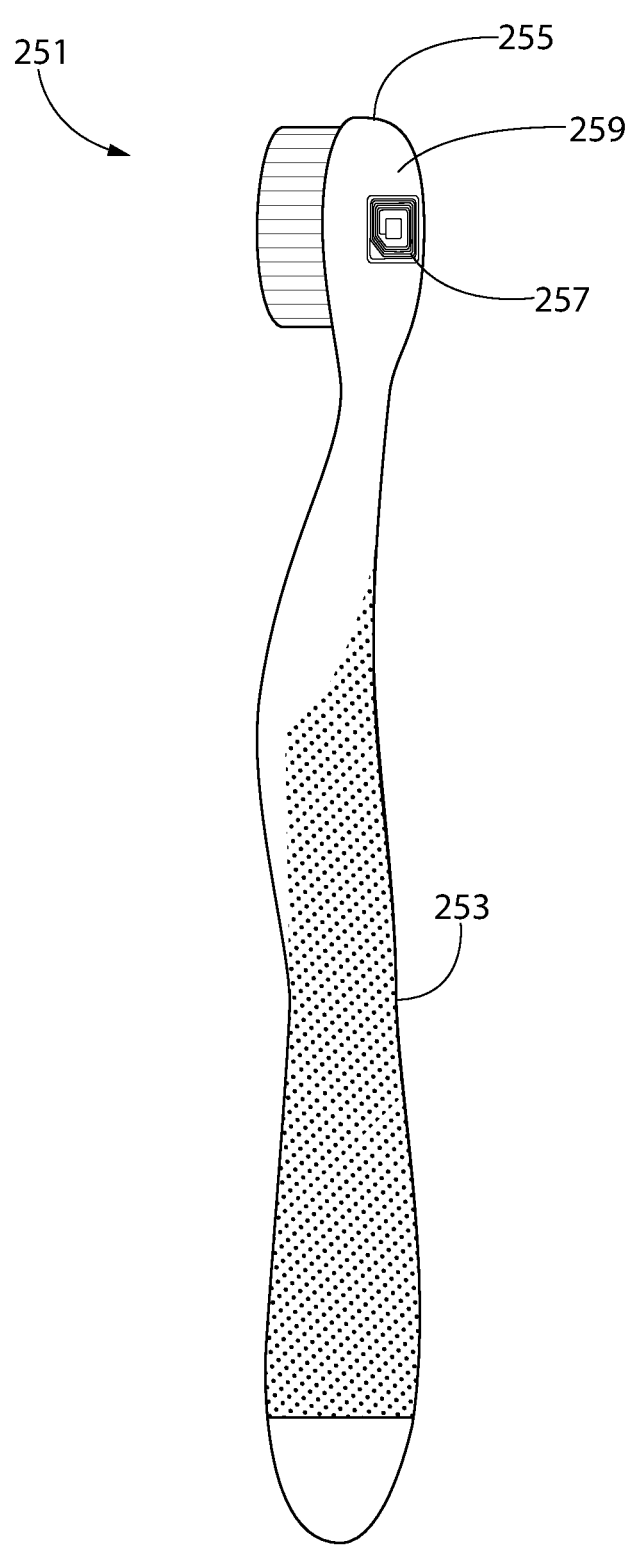
FIG. 5 illustrates a toothbrush having a radio frequency identification (RFID) tag.

A toothbrush 251 having at least one physical property is illustrated in FIG. 5. The at least one physical property may be, for example, the bristle hardness, the bristle pattern, the bristle profile, the type of teeth cleaning element or elements, the angle of the head with respect to the handle, the flexibility of the material from which the toothbrush is constructed, the head size, the size of the handle, the presence of an elastomeric element in the bristle field, the mobility of the head of the toothbrush with respect to the handle of the toothbrush, the mobility of a first portion of the head with respect to a second, different portion of the head, and the like. This toothbrush 251 includes a handle 253 coupled to a head 255 and a radio frequency identifier (RFID) tag 257 positioned on the back side 259 of the head 255. The RFID tag 257 may be detected and by an RFID tag reader 179 included as part of the data processing device 105. In certain embodiments, the RFID tag 257 may store the physical property data and transfer the physical property data to the data processing device 105 when communicating with the RFID tag reader 179. In other embodiments, the RFID tag 257 may communicate an identifier for the toothbrush 251 from which the data processing unit 105 may obtain the physical property data. In such embodiments, the physical processing data may be retrieved from the memory 171, the server 107, or any public source or database using the identifier for the toothbrush 251. Through such processes, the physical property data will be indicative of the at least one physical property of the toothbrush 251.

Figure 6:
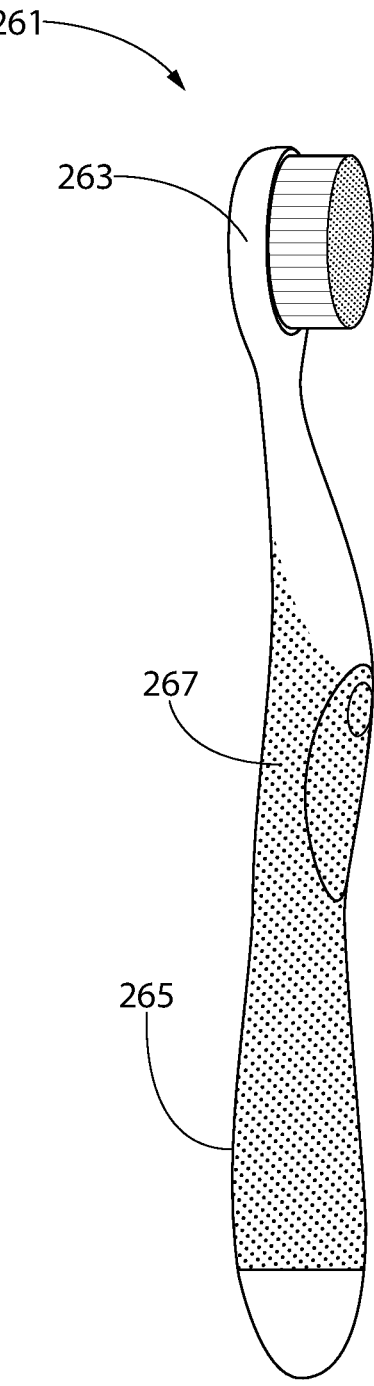
FIG. 6 illustrates a toothbrush having an appearance which may be identified by the data processing unit of FIG. 1B.

A toothbrush 261 having at least one physical property is illustrated in FIG. 6. The at least one physical property may be, for example, the bristle hardness, the bristle pattern, the bristle profile, the type of teeth cleaning element or elements, the angle of the head with respect to the handle, the flexibility of the material from which the toothbrush is constructed, the head size, the size of the handle, the presence of an elastomeric element in the bristle field, the mobility of the head of the toothbrush with respect to the handle of the toothbrush, and the like. This toothbrush 261 includes a head 263 coupled to a handle 265, and the handle 265 includes at least one identifying feature 267. In certain embodiments, the at least one identifying feature 267 may be a decorative feature formed as a pattern, one or more different colors, a profile shape of the toothbrush, and the like. In certain embodiments, the at least one identifying feature 267 may be a distinct look resulting from implementation of a functional feature, such as the bristle pattern, the bristle profile, the presence of a textured grip on the handle 265, and the like. In still other embodiments, the at least one identifying feature 267 may be a combination of a decorative feature and distinct look resulting from implementation of a functional feature. In addition, the at least one identifying feature 267 may be formed on any separate part of the toothbrush 261, or it may extend across multiple parts of the toothbrush 261. In certain embodiments, the identifying feature may be identified by imaging part or all of the toothbrush 261 with the camera 177 of the data processing unit 105 and processing the image with image recognition software on the programmable processor 169 to identify the identifying feature 267. Once the identifying feature 267 is identified, then the programmable processor 169 may use the identification to retrieve the physical property data from the memory 171 or to obtain the physical property data from the server 107. The physical property data will therefore be indicative of the at least one physical property of the toothbrush 261.

Figure 7:
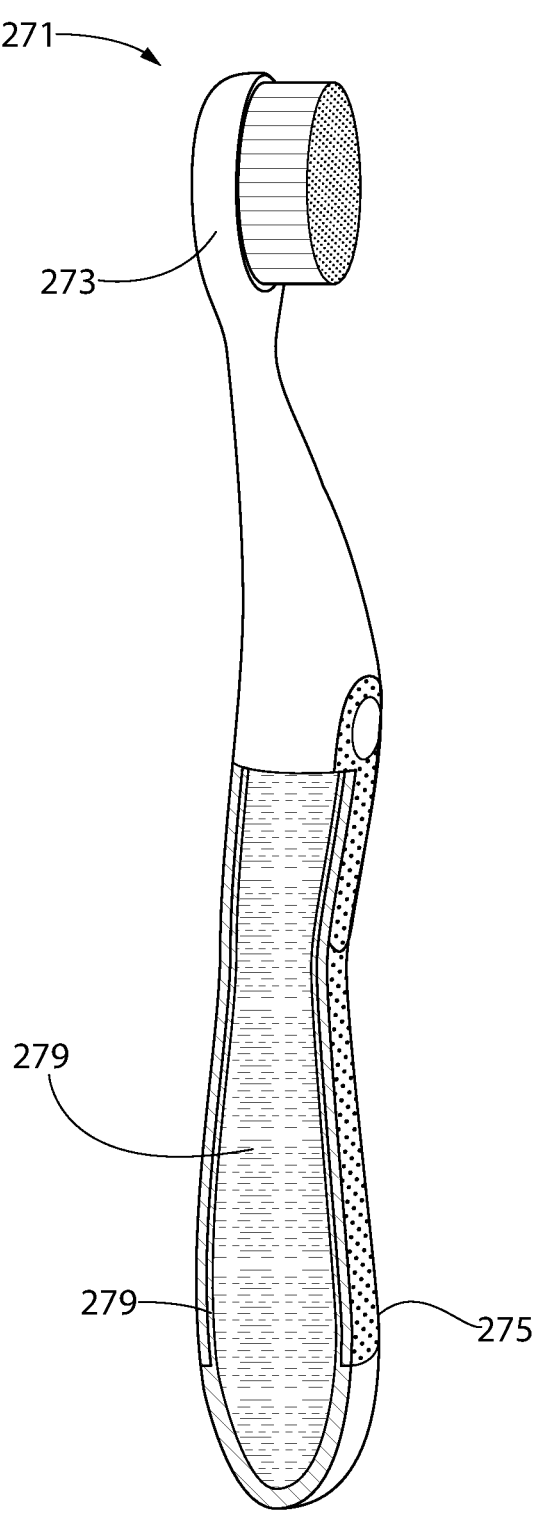
FIG. 7 illustrates a toothbrush having a chamber containing an oral care additive.

A toothbrush 271 having at least one physical property is illustrated in FIG. 7. This toothbrush 271 includes a head 273 coupled to a handle 275, and the handle 275 includes cavity 277 from which an oral care additive 279 may be dispensed for use during a brushing session. The manner in which the oral care additive 279 is dispensed is not limiting of the invention. The toothbrush 271 may include indicia, an RFID tag, an identifying feature, or the like, which is indicative of the presence of the oral care additive 279. When the user prepares to perform a brushing routine, the data processing unit 105 may receive the physical property data as input from the user, using the camera 177, using the RFID tag reader 179, or any other input method, such that the physical property data reflects the presence of the oral care additive 279.

Figure 8:
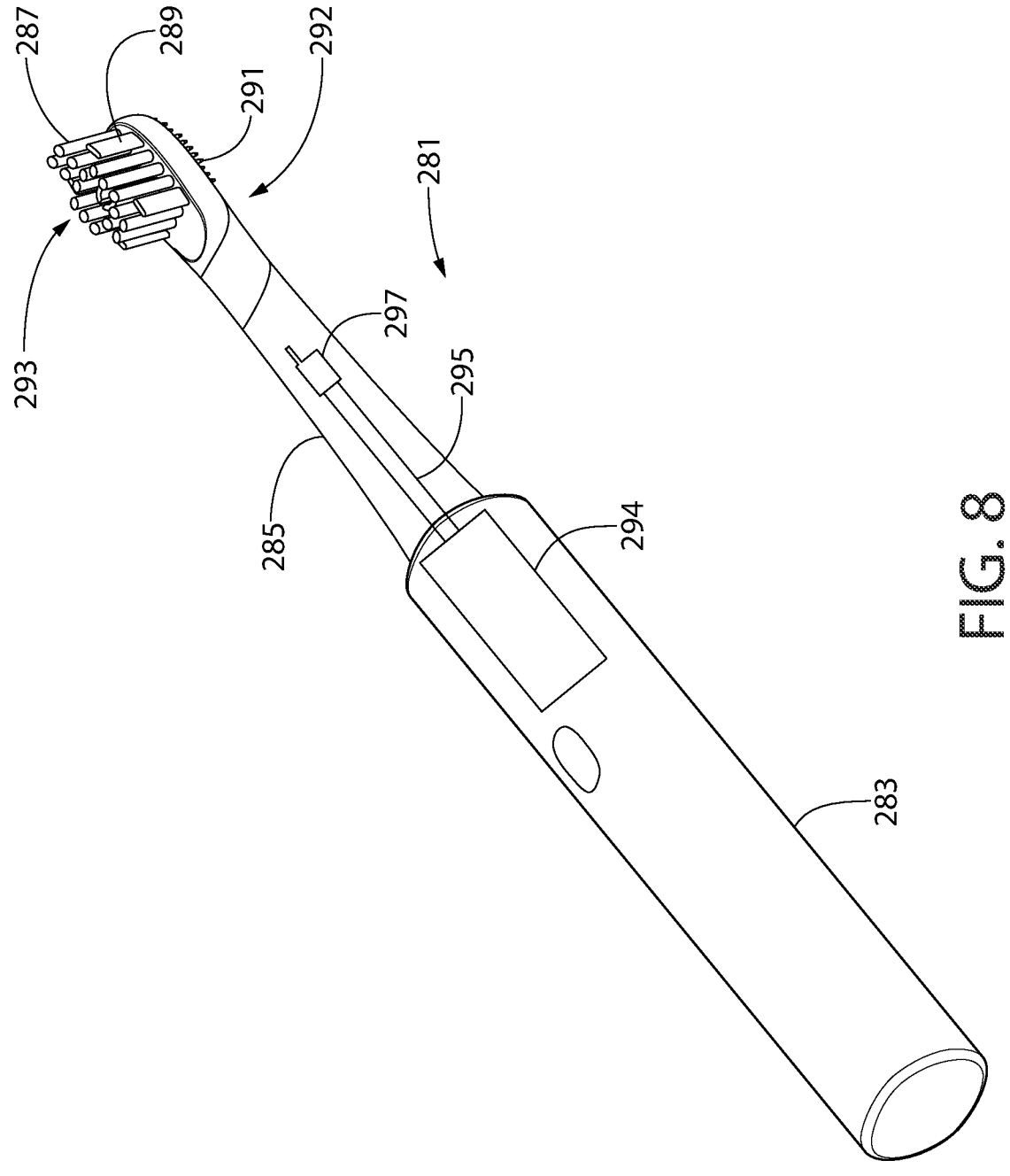
FIG. 8 illustrates an electronic toothbrush having a detachable head.

An electric toothbrush 281 is illustrated in FIG. 8. The electric toothbrush 281 includes a handle 283 and a refill head 285. In certain embodiments, the handle 283 and the refill head 285 are removably coupled to each other. In certain embodiments, the at least one physical property is associated with the refill head 285. The at least one physical property associated with the refill head 285 may be, for example, the bristle hardness, the bristle pattern, the bristle profile, the type of teeth cleaning element or elements, the head size, the presence of an elastomeric element in the bristle field, the presence of a tongue cleaner, and the like. In certain embodiments, the at least one physical property is associated with the handle 283, such as the presence of an electrically-powered vibratory element. In certain embodiments of electric toothbrushes, the control circuit 165 of the data processing unit 105 may reside at least partially within the handle 283. Alternatively, the handle 283 may include a separate toothbrush control circuit which controls the electric toothbrush and communicates with the data processing unit 105.

In this embodiment of electric toothbrush, the refill head 285 includes a bristle field 287 which includes at least one elastomeric element 289 and a tongue cleaner 291 on the back side 292 of the refill head 285. In addition, the bristle field 287 has a bristle profile 293 formed by having bristles of differing lengths. Any one or more of the presence of the at least one elastomeric element 289 in the bristle field 287, the presence of the tongue cleaner 291, and the bristle profile 293 may be reflected in the physical property data. Also in this embodiment, shown schematically, the handle includes a motor 294 operably coupled to a shaft 295, with an eccentric mass 297 positioned at the distal end of the shaft 295. In combination, the motor 294, the shaft 295, and the eccentric mass 297 form an electrically-powered vibratory element, the presence of which may be reflected in the physical property data. In addition, the physical property data associated with the electric toothbrush 281 may reflect any one or more physical properties of one or both of the handle 283 and the head 285.

Figure 9:
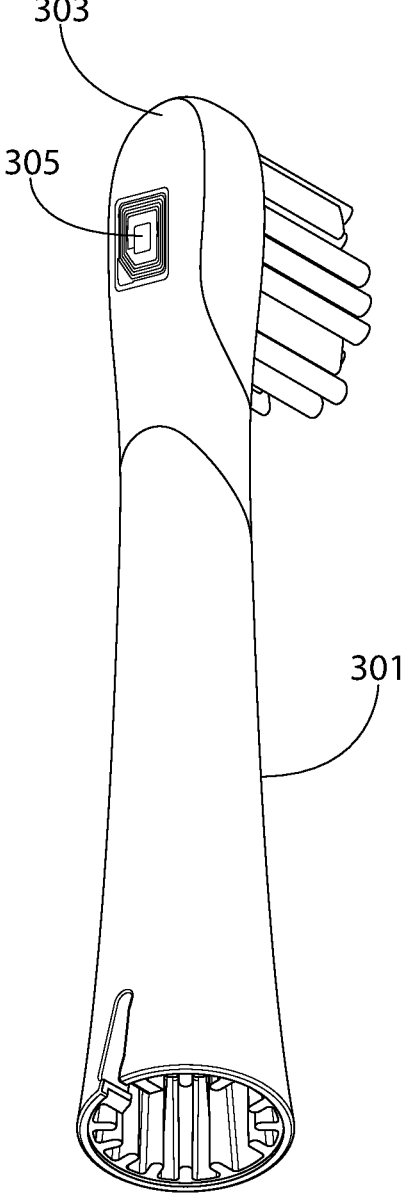
FIG. 9 illustrates a detachable head for an electronic toothbrush including an RFID tag.

A refill head 301 having at least one physical property is illustrated in FIG. 9. The refill head 301 may be removably coupled to a handle as shown in FIG. 8. The at least one physical property may be, for example, the bristle hardness, the bristle pattern, the bristle profile, the type of teeth cleaning element or elements, the head size of the toothbrush, and the like. As shown, the refill head 301 includes an RFID tag 305 positioned on the back side 303 of the head 301. In the same manner discussed above, the RFID tag 305 may be detected and by an RFID tag reader 179 included as part of the data processing device 105 so that the physical property data will be indicative of the at least one physical property of the refill head 301.

Figure 10:
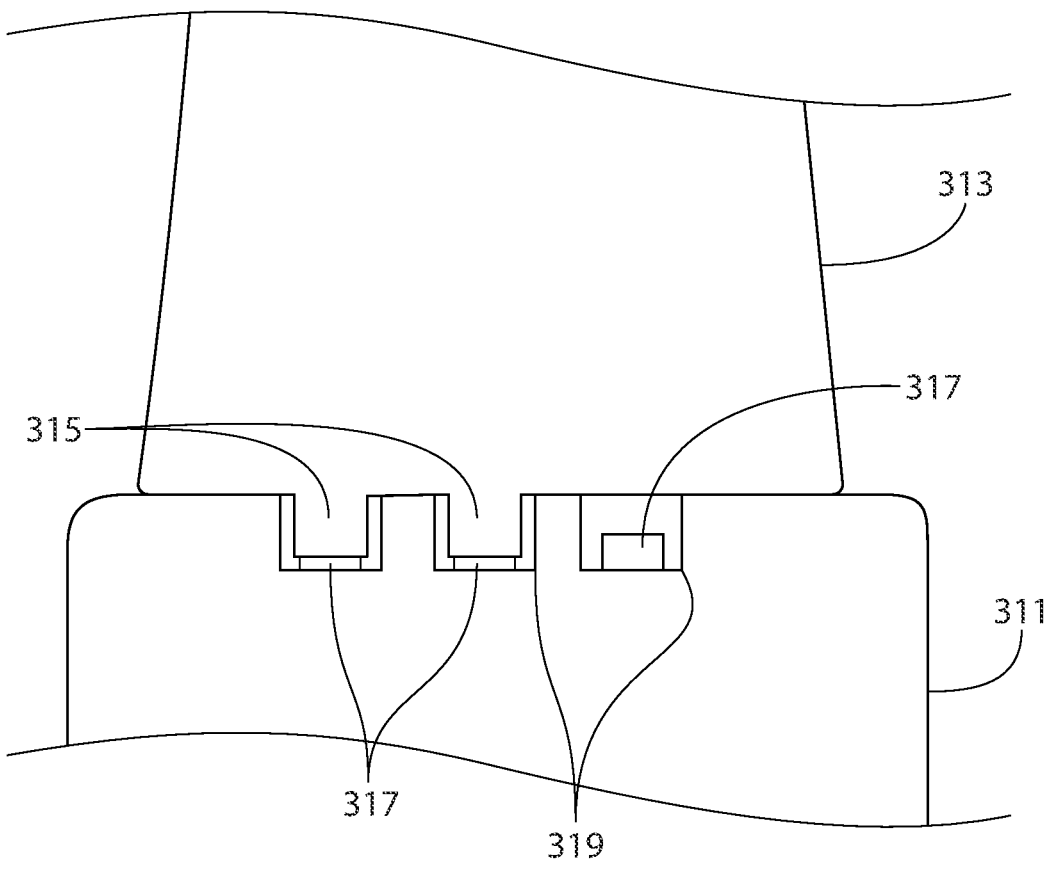
FIG. 10 illustrates an interface between the head and the handle of an electronic toothbrush.

Portions of a handle 311 coupled to a refill head 313 for an electric toothbrush are illustrated in FIG. 10. The handle 311 and the refill head 313 include a physical interface which is used to help generate the physical property data. The refill head 313 includes at least one physical property which may have an impact on the effectiveness of a brushing routine. In this embodiment of electric toothbrush, the control circuit 165 of the data processing unit 105 may reside at least partially within the handle 311. Alternatively, the handle 311 may include a separate toothbrush control circuit which controls the electric toothbrush and communicates with the data processing unit 105. The combination of the refill head 313 coupled to the handle 311 provides a selection mechanism which may be used to identify the refill head 313, and from this identification the data processing unit 105 may obtain the physical property data. In certain embodiments, the selection mechanism may directly identify the at least one physical property of the refill head 313. In other embodiments, the selection mechanism may identify the refill head 313, and from identification of the refill head 313, the data processing unit 105 may obtain the physical property data. In both types of embodiments, the physical property data will be indicative of the at least one physical property of the refill head 313.

As part of the selection mechanism, the refill head 313 includes a plurality of selection indicator features 315, which are shown as a plurality of teeth, and the handle 311 includes a plurality of selection identifiers 317, which are shown as a plurality of switches. Each selection identifier 317 is located within one of a plurality of receptacles 319, each of which is formed to receive one of the selection indicator features 315. Each selection identifier 317 helps the data processing unit 105 determine which, if any, of the selection identifiers 317 of the handle 311 are interacting with one of the selection indicator features 315 of the refill head 313 when the refill head 313 is coupled to the handle 311. By identifying which of the selection identifiers 317 are interacting with the selection indicator features 315, the data processing unit 105 can either identify the refill head 313, and with identification of the refill head obtain the physical property data, or directly receive the physical property data of the refill head 313.

Figures 11, 12:
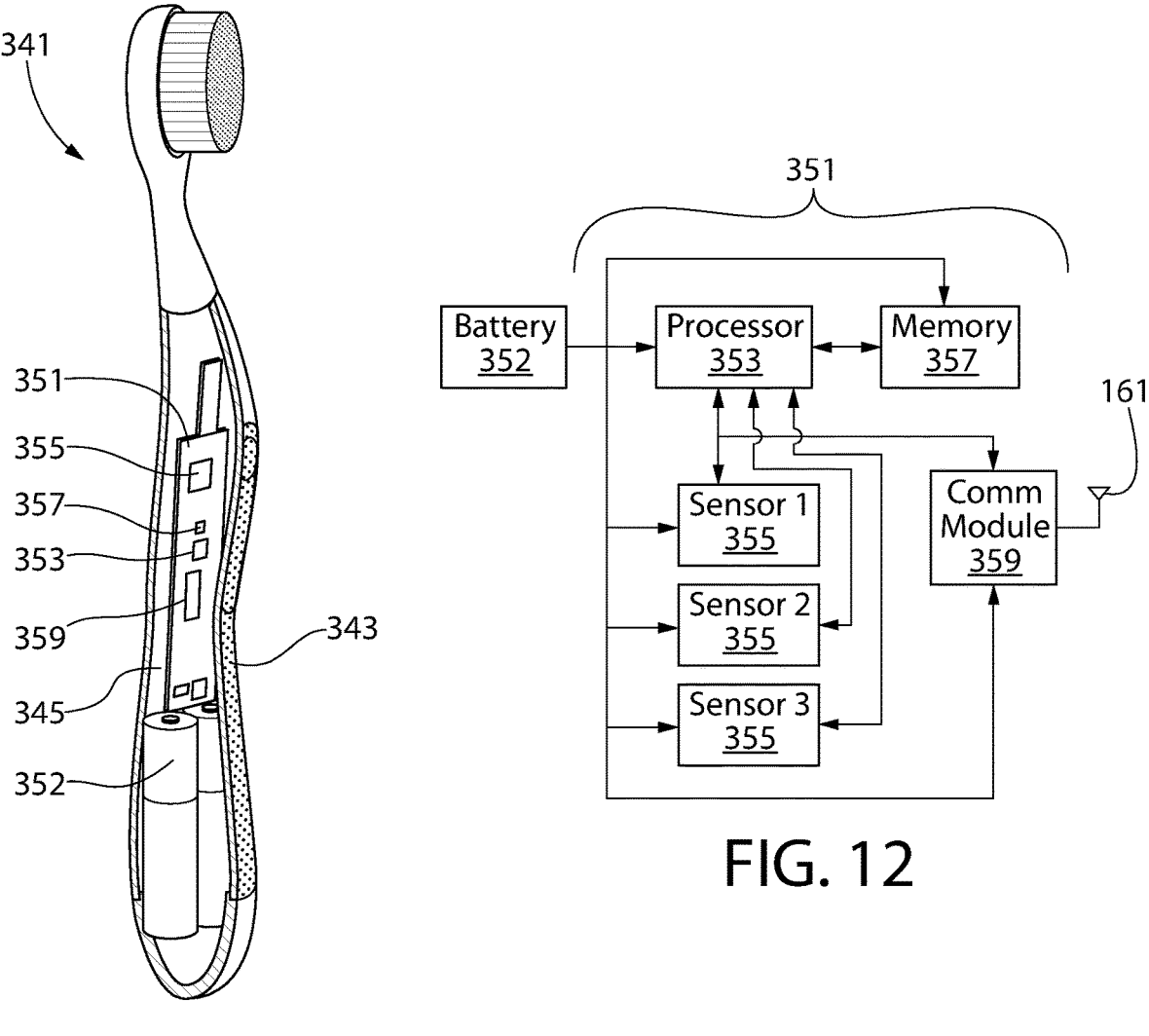
FIG. 11 illustrates a partial sectional view of a toothbrush having electronic circuitry for collecting brushing session data.
FIG. 12 schematically illustrates electronic components of the toothbrush of FIG. 11.

FIG. 11 illustrates a toothbrush 341 which includes at least one physical property which may have an impact on the effectiveness of a brushing routine. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an elastomeric element in the bristle field, the presence of a tongue cleaner, the mobility of the head of the toothbrush with respect to a handle of the toothbrush, the mobility of a first portion of the head with respect to a second, different portion of the head, and the like. The handle 343 of the toothbrush 341 forms a housing for containing electronic circuitry 351 for collecting brushing session data. The handle 343 is a hollow structure in which a cavity 345 is formed. The electronic circuitry 351, which includes a power source 352, is located within the cavity. The electronic circuitry 351 may be used to collect and analyze brushing session data from which an evaluation of the brushing session may be made. In certain embodiments, the evaluation of the brushing session may be based at least in part upon the physical property data.

A schematic version of the electronic circuitry 351 is shown in FIG. 12. The electronic circuitry 351 includes a processor 353 communicably coupled to sensors 355, a memory 357, and a communication module 359. The number of sensors 355 included as part of the electronic circuitry 351 depends upon the type of brushing session data to be detected and the functionality of each type of sensor employed. The brushing session data that is detected and collected may include position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 355 may be included as part of the electronic circuitry 351, and in other embodiments, two or more sensors 355 may be included. By way of example, the at least one sensor 355 may be any one or more of the following: a 3-axis accelerometer, a 6-axis accelerometer, a gyroscope, a magnetometer, a pressure sensor, among other types of sensors. In general, each sensor 355 included as part of the electronic circuitry 351 generates at least part of the brushing session data. For purposes of the present disclosure, the term "brushing session data" is any type of information which may be extracted or derived from a sensor or sensor signal, regardless of the form of the extracted information. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 353 and the memory 357 may be omitted from the electronic circuitry 351 of the toothbrush 341. In such embodiments, the sensors 355 may communicate brushing session data directly to the communication module for transmission.

The memory 357 may be any appropriate type of memory or storage which enables the processor 353 to perform the desired programming, such as volatile and/or non-volatile random access memory, or any other type of storage. The particular type of storage used for the memory 357 is not to be limiting of the invention. The communication module 359 in the exemplary embodiment includes an antenna 361 to enable wireless communication. The communication module 359 may be configured and/or programmed to communicate using a wireless technology standard such as Wi-Fi, Bluetooth®, and the like, or it may communicate using any type of proprietary wireless transmission protocol. In certain embodiments, the communication module 359 may include a port to enable communications using wires and wired protocols, such as USB and the like. The particular mode of communication used by the communication module is not limiting of the invention unless specifically set forth in a claim.

Figure 13:
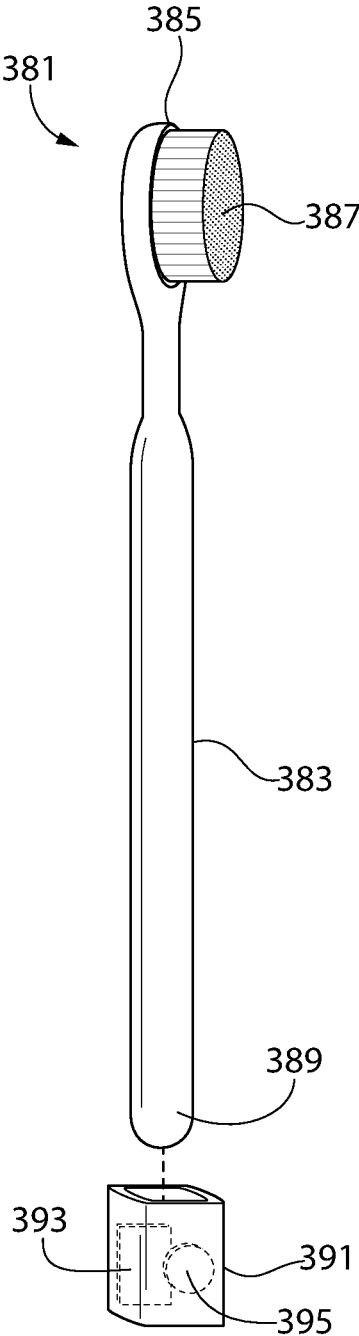
FIG. 13 illustrates a toothbrush and a dongle, the dongle having electronic circuitry for collecting brushing session data.

FIG. 13 illustrates another toothbrush 381 which may be used with a dongle 391 to detect and collect brushing session data. The toothbrush 381 also includes at least one physical property which may have an impact on the effectiveness of a brushing routine. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an elastomeric element in the bristle field, the presence of a tongue cleaner, the mobility of the head of the toothbrush with respect to a handle of the toothbrush, and the like. Generally, the toothbrush 381 includes a handle 383 and a head 385 to which a plurality of teeth cleaning elements 387 are affixed. The dongle 391 may be removably affixed to the proximal end 389 of the handle 383. The dongle 391 comprises a housing for containing electronic circuitry 393 and an associated a power source 395, which may be similar to that described above in connection with FIG. 12.

The brushing session data which is detected and collected by the toothbrush embodiments shown in FIGS. 11 and 13 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 171 of the data processing unit 105 for later use. In certain embodiments, the data processing device 105 may transmit the calculated performance metrics to the server 107 for storage and or additional analysis. In certain embodiments, a base performance metric may be weighted, using one or more of the physical properties of the toothbrush used during the brushing session from which the data underlying the performance metric was obtained, to calculate a weighted performance metric. For example, when a user brushes their teeth using a toothbrush with a large head, the performance metric may be given a greater weight as compared to when a toothbrush with a smaller head is used. Similarly, when a user brushes their teeth using a toothbrush which dispenses an oral care additive, the performance metric may be given a greater weight as compared to when a toothbrush is used that does not dispense an oral care additive. The weights given to the different physical properties may vary by the type of physical property and the amount it is determined that physical property improves or decreases the efficacy of a user's brushing routine.

In certain embodiments, the performance metrics which are stored in the memory 171 of the data processing unit 105 or on the server 107 may be used during future brushing sessions to aid in determining what brushing routine to suggest to the user. For example, in the context of the process shown in the flowchart 221 of FIG. 3A, performance metrics may be used in combination with the physical property data to help determine the target brushing time for a brushing routine. Also, in embodiments in which performance metrics are stored, the performance metrics may be analyzed by machine learning processes, and the machine learning may be used to enhance future brushing routines.

Figure 14A:
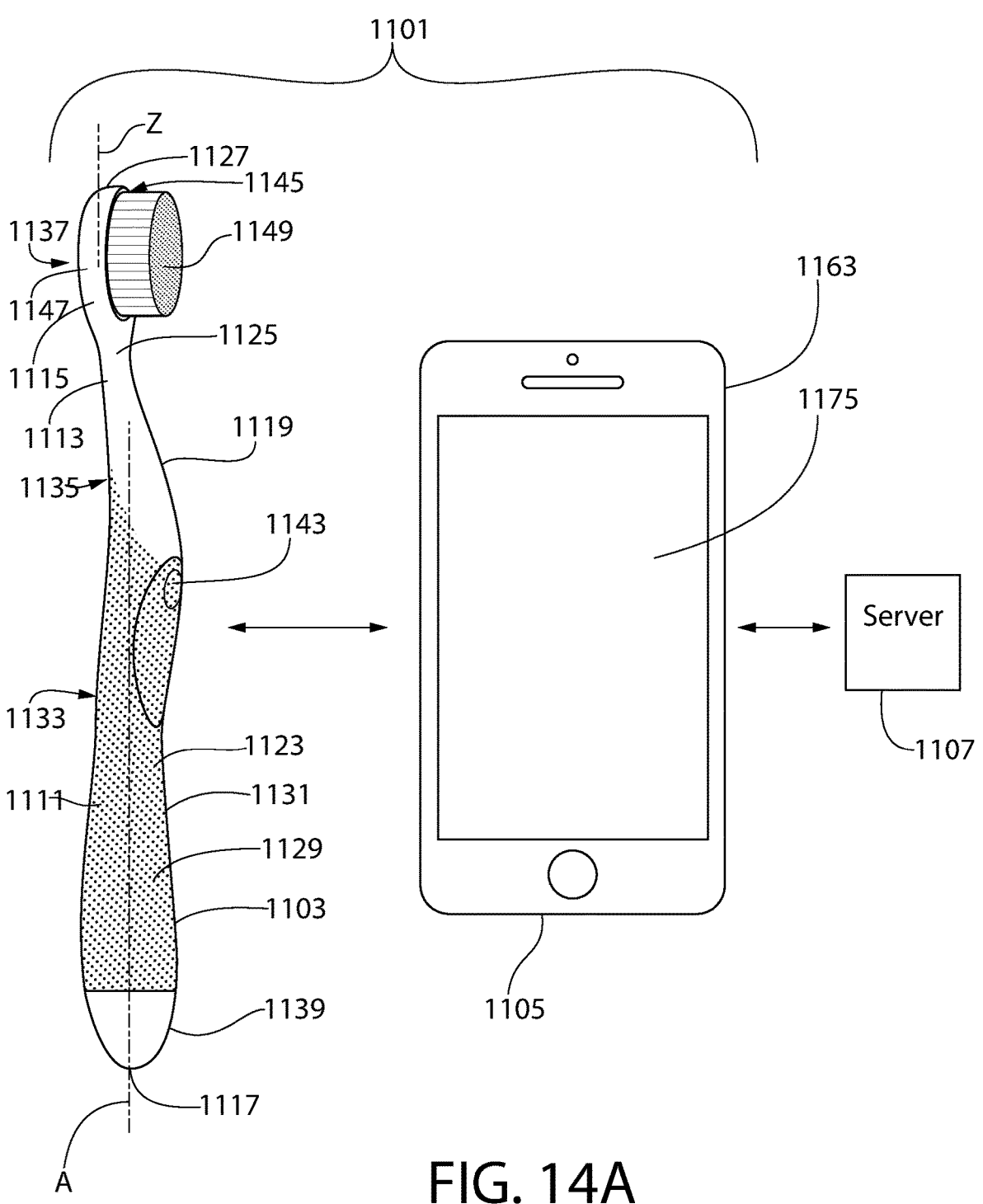
FIG. 14A illustrates an oral care system in accordance with another embodiment of the present invention, the oral care system being in communication with a server.

FIG. 14A illustrates an oral care system 1101 in accordance with an embodiment of the present invention. The oral care system 1101 includes a toothbrush 1103 and a data processing unit 1105. The data processing unit 1105 may communicate with a server 1107 for purposes of storing larger amounts of data or to provide server-side processing functionality. The presence of the server 1107 and communication between the data processing unit 1105 and the server 1107, however, are not limiting of the present invention, unless specifically set forth in a claim.

The toothbrush 1103 generally includes a handle 1111, a neck 1113, and a head 1115. The neck 1113 extends between the handle 1111 and the head 1115 and connects the head 1115 to the handle 1111. The handle 1111 provides the user with a mechanism by which the toothbrush 1103 can be readily gripped and manipulated during a brushing routine. The handle 1111 may be formed of many different shapes, sizes and materials and may be formed by a variety of manufacturing methods that are well-known to those skilled in the art. The handle 1111 extends from a proximal end 1117 to a distal end 1119 along a longitudinal axis A to form an elongated gripping portion 1123 therebetween. The handle 1111 transitions into the neck 1113 at the distal end 1119. While the neck 1113 generally has a smaller transverse cross-sectional area than the handle 1111, the invention is not so limited. Broadly speaking, the neck 1113 forms a transition region between the handle 1111 and the head 1115, with the head 1115 extending from an end of the neck 1113 opposite the handle 1111. While the head 1115 is normally widened relative to the neck 11113, in some embodiments the head 1115 can simply be a continuous extension or narrowing of the neck 1113 and/or handle 1111. The head 1115 extends from a proximal end 1125 to a distal end 1127 along a z-axis. In the exemplary embodiment, the z-axis is parallel to the longitudinal axis A. In certain embodiments, the z-axis may be placed at an angle to the longitudinal axis A.

In the exemplary embodiment, the handle 1111 includes a suitable textured grip 1129 made of a soft elastomeric material. The textured grip 1129 may cover or form at least a portion of a front surface 1131 and a rear surface 1133 of the handle 1111. The textured grip 1129 may also extend to a rear surface 1135 of the neck 1113 and to a rear surface 1137 of the head 1115. The handle also includes a removable end cap 1139 which enables access into a cavity 1141 formed within the handle 1111.

In embodiments in which a portion of the front surface 1131 of the handle 1111 is also covered by or formed from the material of the textured grip 1129, the textured grip 1129 may form part of or cover an electrical switch 1143, which is operable between an open state and a closed state. The open and closed states of the electrical switch 1143 serve to disconnect and connect, respectively, electric power to electronic circuitry (described below) within the cavity 1141 of the handle 1111. In certain embodiments, the electrical switch 1143 may be a single button which alternates between the open and closed states. In alternative embodiments, the electrical switch 1143 may include multiple buttons which serve to control the switch between the open and closed states. Of course, other types of switches may be used in conjunction with the toothbrush 1103 for activating and deactivating the electronic circuitry within the cavity 1141 of the handle 1111, including without limitation slide switches, toggle switches, motion activated switches, photosensitive switches, sound-activated switches, electronic switches, and/or combinations thereof.

The electrical switch 1143 may form one or more minor protrusions in the front surface 1131 of the handle 1111 for easy manipulation by a user. Specifically, when a user holds the toothbrush 1103 in a normal fashion, the user's thumb will be positioned adjacent the electrical switch 1143 to easily enable the user to actuate the electrical switch 1143 between the open and closed states as desired. Of course, the invention is not so limited and the electrical switch 1143 may be otherwise located on the handle 1111, the neck 1113 or elsewhere on the toothbrush 1103.

The handle 1111, the neck 1113, and the head 1115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 1111, the neck 1113, and the head 1115 of the toothbrush 1103 may be formed as a single unitary structure using a molding, milling, machining or other suitable process. Whether the handle 1111, the neck 1113, and the head 1115 are of a unitary or multi-piece construction (including connection techniques) is not limiting of the present invention, unless specifically set forth in a claim. In some embodiments of the invention, the head 115 may be detachable (and replaceable) from the handle 1111 and/or from the neck 1113 using techniques known in the art.

The head 1115 generally includes a front surface 1145, the rear surface 1137 and peripheral side surfaces 1147 that extend between the front and rear surfaces 1145, 1137. The front surface 1145 and the rear surface 1137 of the head 1115 can take on a wide variety of shapes and contours, none of which are limiting of the present invention. For example, the front and rear surfaces 1145, 1137 can be planar, contoured or combinations thereof.

The front surface 1145 of the head 1115 includes a collection of at least one teeth cleaning element, shown in the exemplary embodiment as a plurality of bristles 1149, extending therefrom for cleaning teeth surfaces. As used herein, the term "teeth cleaning element" is used in a generic sense to refer to any structure that can be used to clean or polish the teeth through relative surface contact. In certain embodiments, the head 1115 may include a single teeth cleaning element, and in other embodiments, the head 1115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 1149 of the present invention can be connected to the head 1115 in any manner known in the art. For example, staples/anchors, in-mold tufting (IMT) or anchor free tufting (AFT) could be used to mount the bristles 1149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figures 14B, 14C, 14D:
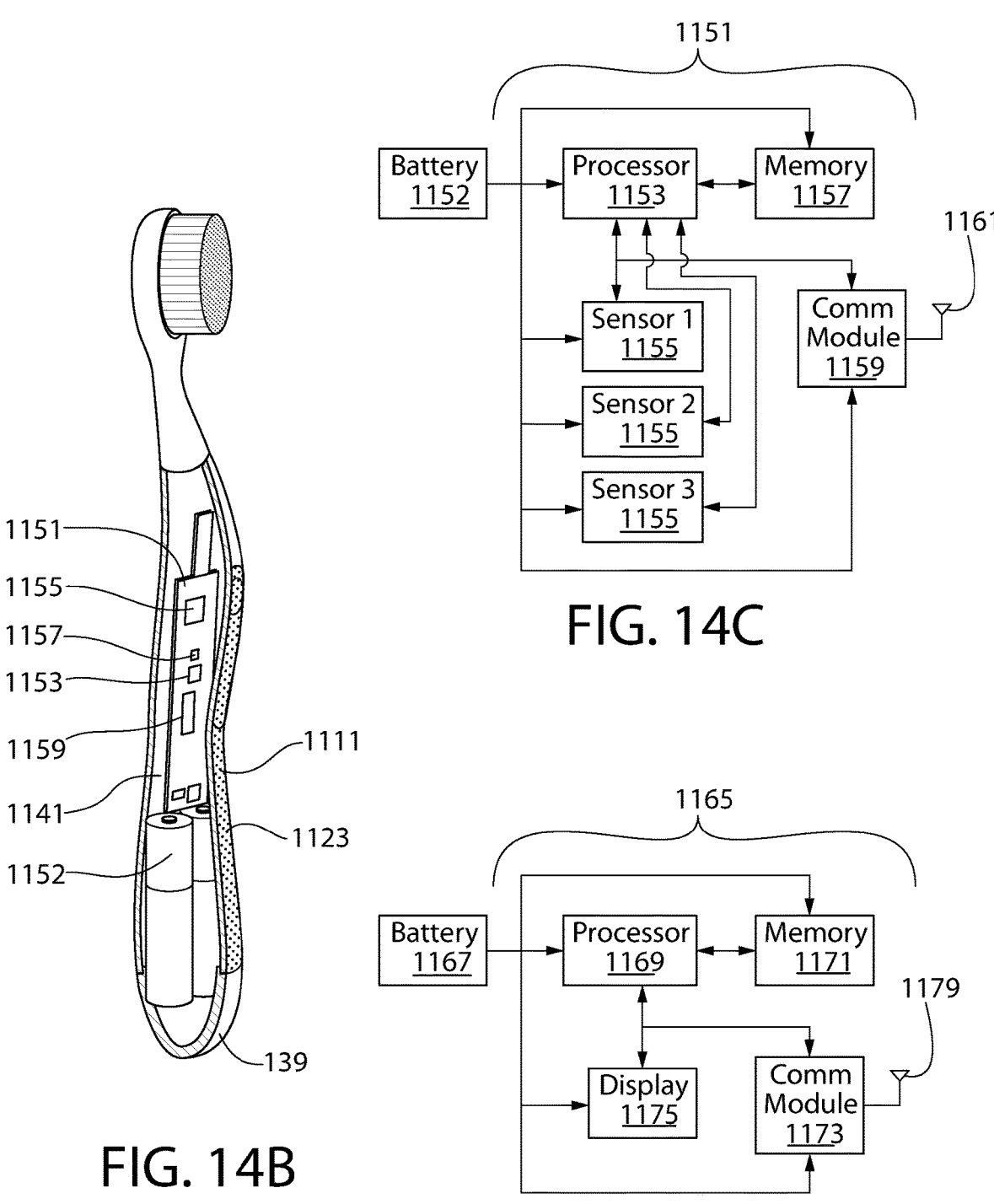
FIG. 14B illustrates a partial sectional view of a toothbrush of the oral care system of FIG. 14A.
FIG. 14C schematically illustrates electronic components of the toothbrush of FIG. 14B.
FIG. 14D schematically illustrates electronic components of a data processing unit shown in FIG. 14A.

Referring to FIG. 14B, the handle 1111 is a housing for containing electronic circuitry 1151 and a power source 1152. The handle 1111 is a hollow structure in which the cavity 1141 is formed. More specifically, in the exemplified embodiment, the cavity 1141 is formed in the elongated gripping portion 1123 of the handle 1111. In the exemplary embodiment, the power source 1152 is shown as two batteries located within the cavity 1141. Of course, the invention is not so limited and more or fewer than two batteries may be used, or alternatively, other types of power sources may be used. A removable end cap 1139 forms the proximal end 1117 of the handle 1111 by engagement with the gripping portion 1123 of the handle 1111. In the exemplary embodiment, the end cap 1139 may threadably engage the gripping portion 1123 of the handle 1111. In other embodiments, the end cap 1139 may engage the gripping portion 1123 of the handle 1111 by snap engagement or by any other mechanical locking engagement. Removal of the end cap 1139 exposes an opening 1159 which forms a passageway into the cavity 1141 through which the power source 1152 can be inserted into and removed from the cavity 1141. Access to the cavity may be formed in other ways in other embodiments. For example, the handle 1111 may include a sliding panel which is removable to form an elongated opening along the longitudinal axis A of the handle 1111 (e.g., the front surface, the rear surface and/or the side surfaces) to provide access to the cavity 1141. Prior to use, a user may insert the power source 1152 through the opening 1159 and into the cavity 1141 in the elongated gripping portion 1123 of the handle 1111, and the cavity 1141 is enclosed by replacing the end cap 1139.

The electronic circuitry 1151 which may be included in an exemplary toothbrush 1103 is shown in FIG. 14C. The electronic circuitry 1151 includes a processor 1153 communicably coupled to sensors 1155, a memory 1157, and a communication module 1159. The number of sensors 1155 included as part of the electronic circuitry 1151 depends upon the types of physical properties to be detected and the functionality of each type of sensor employed. Physical properties may include position, motion, acceleration, frequency, and pressure against the surface of the teeth. Other types of physical properties associated with a brushing routine may also be detected, and those listed herein are not to be limiting of the invention unless otherwise indicated in the claims. In certain embodiments, only one sensor 1155 may be included as part of the electronic circuitry 1151, and in other embodiments, two or more sensors 1155 may be included. By way of example, the at least one sensor 1155 may be any one or more of the following: an accelerometer, a gyroscope, a magnetometer, a pressure sensor, among other types of sensors. While the functionality of certain types of sensors will be discussed in greater detail below, in general each sensor 1155 included as part of the electronic circuitry 1151 generates a sensor signal which includes sensor data that corresponds to the physical property detected by the sensor. For purposes of the present disclosure, the term "sensor data" is any type of information which may be extracted or derived from the sensor or sensor signal, regardless of the form of the extracted information. By way of example, sensor data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 1153 and the memory 1157 may be omitted from the electronic circuitry 1151 of the toothbrush 1103. In such embodiments, the sensors 1155 may communicate sensor data directly to the communication module for transmission.

The memory 1157 may be any appropriate type of memory or storage which enables the processor 1153 to perform the desired programming, such as volatile and/or non-volatile random access memory, or any other type of storage. The particular type of storage used for the memory 1157 is not to be limiting of the invention. The communication module 1159 in the exemplary embodiment includes an antenna 1161 to enable wireless communication. The communication module 1159 may be configured and/or programmed to communicate using a wireless technology standard such as Wi-Fi, Bluetooth®, and the like, or it may communicate using any type of proprietary wireless transmission protocol. In certain embodiments, the communication module 1159 may include a port to enable communications using wires and wired protocols, such as USB and the like. The particular mode of communication used by the communication module is not limiting of the invention unless specifically set forth in a claim.

Referring to both FIGS. 14A and 1D, the data processing unit 1105 includes a housing 1163 and electronic circuitry 1165, with the housing enclosing and/or supporting the various components of the electronic circuitry 1165. The electronic circuitry 1165 is coupled to a power source 1167, shown as a battery in the exemplary embodiment. Of course, the invention is not so limited, and other types of power sources may be used. The electronic circuitry 1165 includes a processor 1169 communicably coupled to a memory 1171, a communication module 1173, and a display 1175. In certain embodiments, the electronic circuitry 1165 may include other components, such as a speaker to provide audible feedback to the user, one or more buttons to receive input from the user, and one or more ports for making a wired connection between the electronic circuitry 1165 and other circuitry external to the data processing unit 1105. In certain other embodiments, the data processing unit 1105 may be a smartphone, a tablet computer, a laptop computer, and the like, although the invention is not so limiting.

The memory 1171 may be any appropriate type of memory or storage which enables the processor 1169 to perform the desired programming, such as volatile and/or non-volatile random access memory. The particular type of storage used for the memory 1171 is not to be limiting of the invention.

The display 1175 may be any type of light emitting display, and as shown in the exemplary embodiment, the display 1175 may be an LED panel. In certain other embodiments, the display 1175 may be an LCD panel, an OLED panel, or any other type of display which is electronically controllable by the processor 1169 to provide visual feedback to the user. In certain embodiments, the display 1175 may be a touch sensitive display which accepts input from the user directly on the display surface. The type and configuration of the display 1175 is not limiting of the invention unless specifically set forth in a claim.

The communication module 1173 includes an antenna 1179 to enable wireless transmission. The communication module 1173 may be configured and/or programmed to communicate using a wireless technology standard such as Wi-Fi, Bluetooth®, and the like, or it may communicate using any type of proprietary wireless transmission protocol. The mode of communication for which the communication module 1173 is configured is not limiting of the invention unless specifically set forth in a claim. In certain embodiments, the communication module 1173 may include a port to enable communications using wires and wired protocols, such as USB and the like. For proper functioning of the exemplary embodiment, the communication module 1159 of the toothbrush 1103 and the communication module 1173 of the data processing unit 1105 communicate with each other, whether such communications are wireless or wired, using the same communication protocol.

The communication module 1173 of the data processing unit 1105 may also be configured and/or programmed to communicate with the server 1107. The communication module 1173 may communicate with the server 1107 over any combination of public and/or private network, and the communications may be wired, wireless, or a combination of the two. In certain embodiments, the communication module 1173 may communicate with the server 1107 over the Internet using one or more types of communication protocols. In certain embodiments, the server 1107 may be programmed with an application programming interface (API) which provides server-side functionality to the data processing unit 1105.

In the exemplary embodiment, the processor 1153 of the toothbrush 1103 may be programmed with functionality to analyze the sensor data generated by the sensors 1155. Similarly, the processor 1169 of the data processing unit 1105 may be programmed with functionality to analyze the sensor data generated by the sensors 1155. In the ensuing description, the disclosed processes may be partially or wholly performed by one or both of the processor 1153 of the toothbrush 1103 and the processor 1169 of the data processing unit 11105 through programming provided to each respective processor 1154, 1169. In certain instances, where expressly indicated, the disclosed processes may be limited to programming on one of the processor 1153 of the toothbrush 1103 or the processor 1169 of the data processing unit 1105.

Figures 15, 16A, 16B, 16C, 16D:
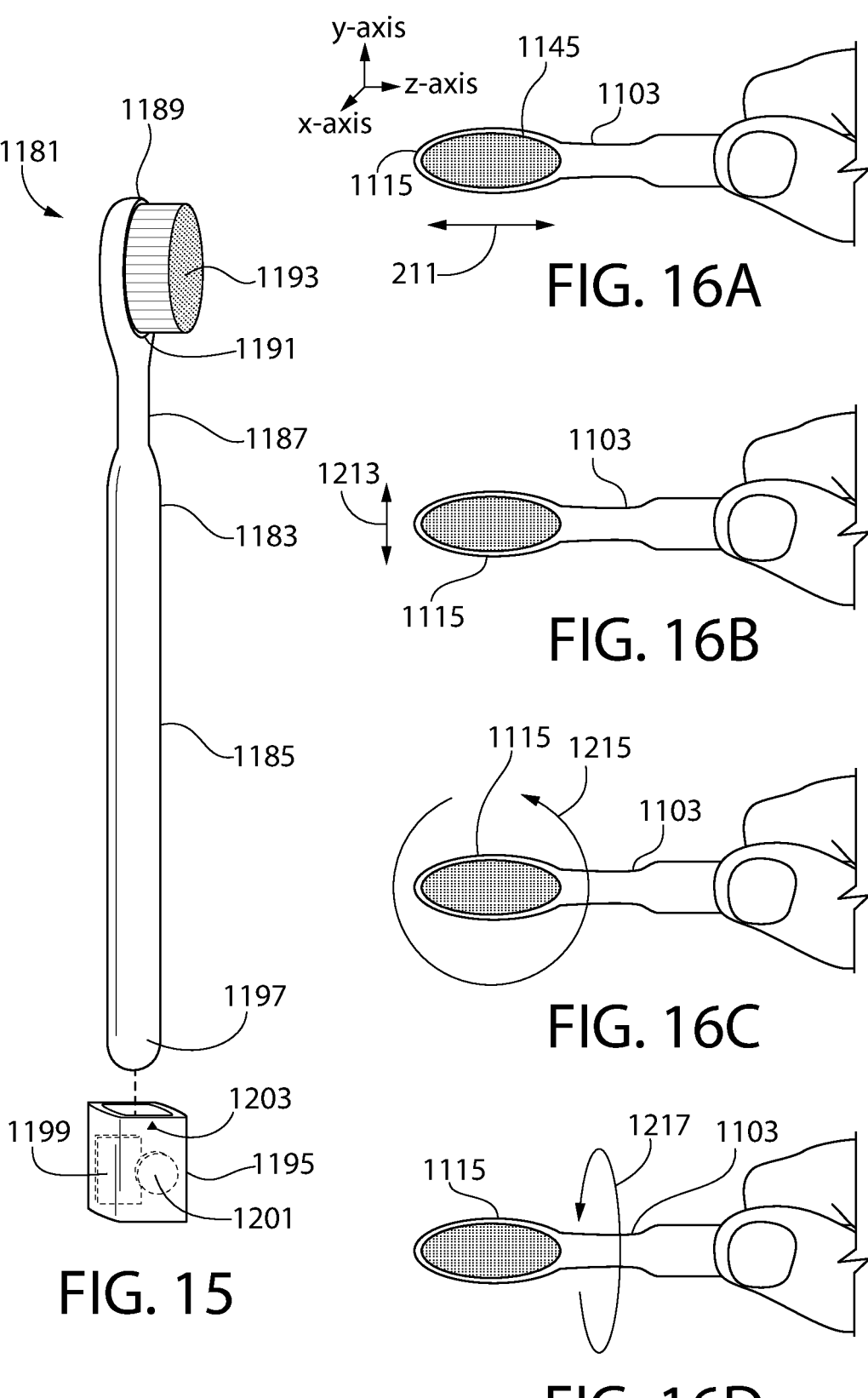
FIG. 15 illustrates a toothbrush and a dongle useable with an oral care system in accordance with another embodiment of the present invention.
FIGS. 16A-D graphically illustrate four different types of motion for an oral care device.

An alternative embodiment for an oral care device 1181 which may be incorporated into the oral care system 1101 is shown in FIG. 15. In this alternative embodiment, the oral care device 1181 includes a toothbrush 1183 which is generally formed by a handle 1185, a neck 1187, and a head 1189. The front surface 1191 of the head 1189 includes at least one teeth cleaning element, shown as a plurality of bristles 1193, extending therefrom for cleaning teeth surfaces. The oral care device 1181 also includes a dongle 1195 which may be removably coupled to the proximal end 1197 of the handle 1185. The dongle 195 is a housing for containing electronic circuitry 1199 and an associated a power source 1201, which may be the same as described above in connection with FIG. 14C. In the exemplary embodiment, the dongle 1195 includes indicia 1203 on one side thereof to indicate to the user the orientation of the dongle with respect to the bristles 1193. Since the dongle 1195 is removable from the handle 1185, the analysis of sensor data and feedback to the user during a brushing routine, which are described in greater detail below, are facilitated by having the dongle 1195 coupled to the handle 1185 in a predetermined orientation.

FIGS. 16A-D illustrate four different types of brush stroke motions for the head 1115 of the toothbrush 1103 which may be detected during a brushing routine. In certain embodiments, each of these brush stroke motions may be detected through use of an accelerometer. In certain embodiments, brush stroke motions may be detected through use of a 3-axis accelerometer used in combination with a 3-axis gyroscope. The first brush stroke motion, illustrated by the arrow 1211 in FIG. 16A, is a side-to-side linear brush stroke motion that is aligned parallel to the z-axis of the head 1115 of the toothbrush 1103. Using an accelerometer, this brush stroke motion may be detected as a linear acceleration along the z-axis. As indicated above, the z-axis in the exemplary embodiment is parallel to the longitudinal axis A of the handle (see FIG. 14A). The y-axis, for purposes of this disclosure, is defined as being perpendicular to the z-axis and parallel with at least a portion of the front surface 1145 of the head 1115. The x-axis, for purposes of this disclosure, is defined as being orthogonal to the plane formed by the y- and z-axes. Generally speaking, the at least one teeth cleaning element may extend from the front surface 1145 of the head 1115 substantially in the direction the x-axis, although the at least one teeth cleaning element need not be parallel to the x-axis. Of course, any coordinate system may be used to define the brush stroke motions of the head 1115 of the toothbrush 1103 while still staying within the spirit and scope of the invention.

The second brush stroke motion, illustrated by the arrow 1213 in FIG. 16B, is an up and down linear brush stroke motion that is aligned parallel to the y-axis of the head 1115 of the toothbrush 1103. Using an accelerometer, this brush stroke motion may be detected as a linear acceleration along the y-axis. The third brush stroke motion, which is illustrated by the arrow 1215 in FIG. 16C, is a quasi-circular brush stroke motion that moves within a plane parallel to both y-axis and the z-axis. Using an accelerometer, this brush stroke motion is detected as a linear acceleration along the z-axis simultaneous with a linear acceleration along the y-axis with a phase shift between the y and z motions. In certain embodiments, quasi-circular brush stroke motion may be defined as having linear accelerations along both the y- and z-axes which exceeds a predetermined acceleration threshold or which differ by less than a predetermined amount. By way of example, a quasi-circular brush stroke motion may be defined as any simultaneous linear acceleration over 1 m/s2 along each of the y- and z-axes. By way of another example, a quasi-circular brush stroke motion may be defined as any simultaneous linear acceleration along both the y- and z-axes which differs by less than 0.5 m/s2. By way of a third example, a quasi-circular brush stroke motion may be defined in terms of the eccentricity of the ellipse described by the brushing motion, where an eccentricity of 0 corresponds to a perfect circle. In all cases, a linear brush stroke motion along either axis which falls outside of the predefined bounds of quasi-circular brush stroke motion may be identified as linear acceleration along the respective y- or z-axis. The fourth brush stroke motion, which is illustrated by the arrow 1217 in FIG. 16D, is a flicking brush stroke motion which is rotation about the z-axis. This brush stroke motion may be detected using a gyroscope as a rotational acceleration about the z-axis.

Figure 17:
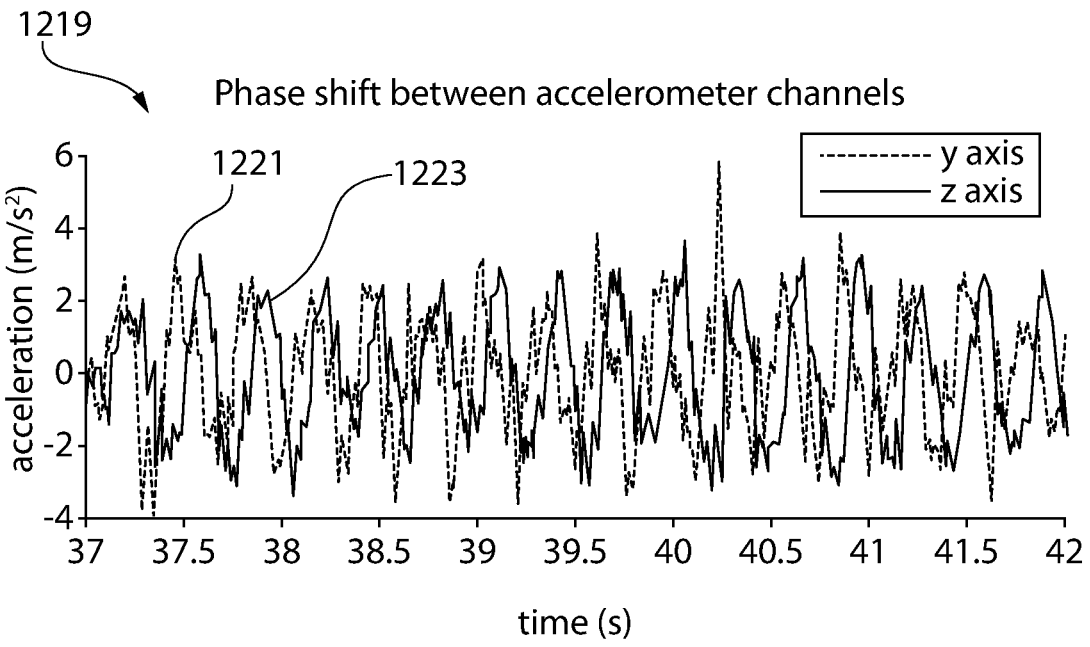
FIG. 17 is a graph illustrating a comparison between y-axis acceleration and z-axis acceleration versus time for an oral care device.
Figure 18:
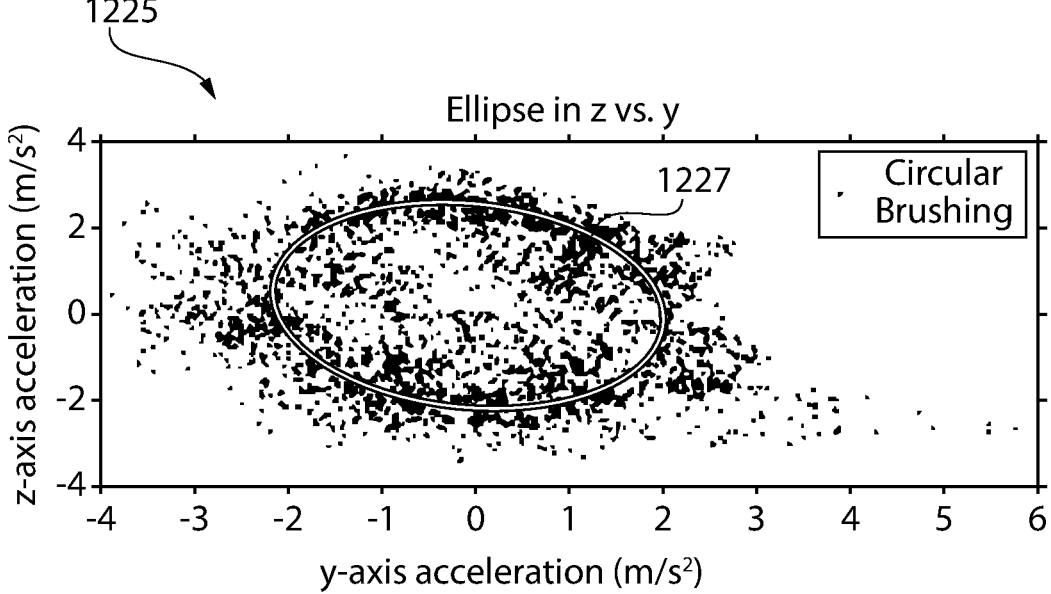
FIG. 18 is a graph illustrating z-axis acceleration versus y-axis acceleration for an oral care device.
Figure 19:
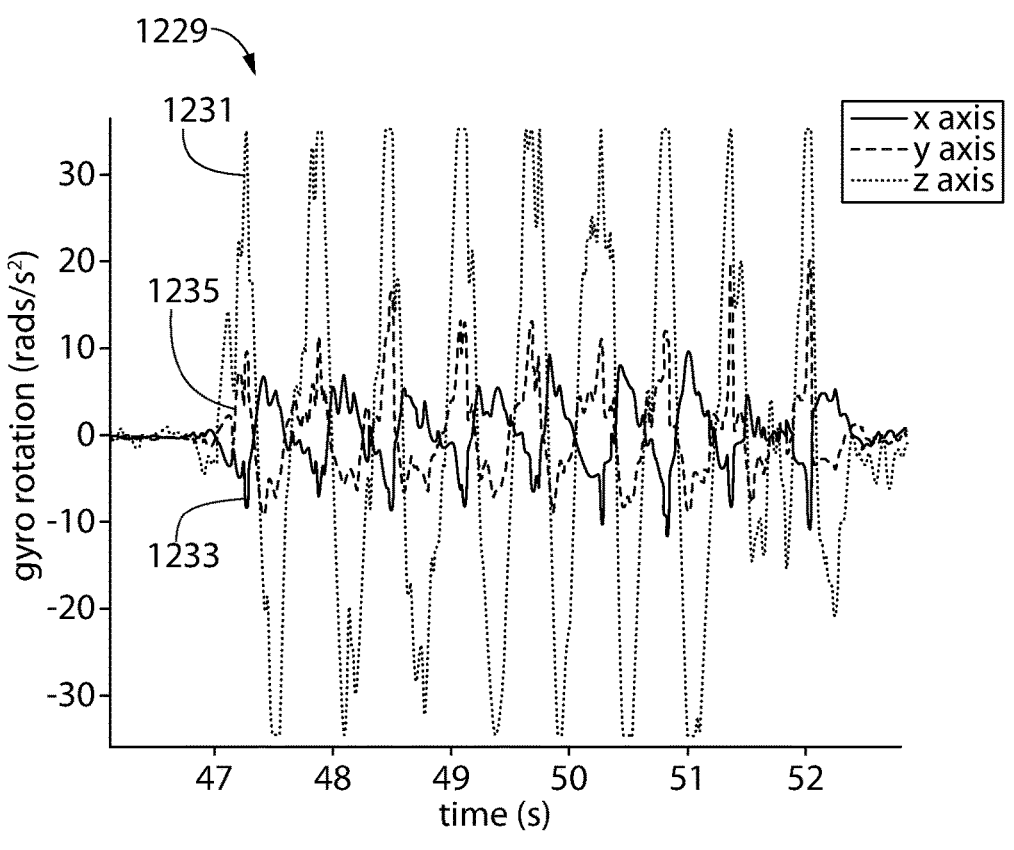
FIG. 19 is a graph illustrating rotational accelerations about three axes for an oral care device.

FIGS. 17-19 illustrate examples of sensor signals from which sensor data may be extracted and used to identify certain different types of brush stroke motion. FIG. 17 illustrates a graph 1219 showing a sensor signal from an accelerometer as a combination of a y-axis acceleration signal 1221 and a z-axis acceleration signal 1223 over time. As can be seen from the overlaid y- and z-axis acceleration signals, the two acceleration signals exhibit a relative phase shift as compared to one another, and this relative phase shift may form sensor data used to identify brush stroke motion. Each acceleration signal indicates a linear brush stroke motion along the respective y- and z-axes. The amount of the phase shift between two respective acceleration signals may be used to determine whether a particular brush stroke motion is interpreted to be a quasi-circular brush stroke motion. Although whether a particular phase shift present in a brush stroke motion is interpreted as quasi-circular motion may also depend upon any established thresholds for the amount of phase shift. For example, a perfectly circular brushing motion exhibits a 90° phase shift between the two acceleration signals. In certain embodiments, it may be desirable or convenient to define a quasi-circular brushing motion as 90°±φ, where φ represents the predetermined threshold. In such embodiments, φ may be 1°-45°, and in still other embodiments, φ may be greater than 45°. In addition to phase, in certain embodiments, the amplitudes of the two acceleration signals may be used as a factor when determining whether a particular brush stroke is interpreted to have a quasi-circular brush stroke motion. For example, if the differences between amplitudes of the two acceleration signals is greater than a predetermined threshold value, then it may be desirable to determine that the underlying brush stroke motion does not qualify as a quasi-circular brush stroke motion, whereas acceleration signals which have differences between amplitudes less than the predetermined threshold are determined to represent a quasi-circular brush stroke motion. Alternatively, or in addition, in certain other embodiments, if one or both of the acceleration signals falls below a predetermined threshold, then it may be desirable to determine that the underlying brush stroke motion does not qualify as a quasi-circular brush stroke motion, whereas acceleration signals which extend above the predetermined threshold are determined to represent a quasi-circular brush stroke motion.

FIG. 18 illustrates a graph 1225 which shows a plot of a y-axis acceleration signal against a z-axis acceleration signal. This graph 1225 is an example of how the acceleration signals along the y- and z-axes may be interpreted as sensor data showing a quasi-circular brush stroke motion even though the actual motion is in fact not perfectly circular. The roughly elliptical brush stroke motion 1227 in the graph 1225 may be interpreted as a quasi-circular brush stroke motion because the overall phase shift between the two acceleration signals is greater than a predetermined threshold. As indicated above, other factors could be applied to the data shown in the graph 1225 to determine which data should be included or excluded from the determination of whether a particular brush stroke motion qualifies as a quasi-circular brush stroke motion.

FIG. 19 illustrates a graph 1229 showing a sensor signal from a gyroscope as a combination of acceleration signals generated from rotation about x-, y- and z-axes. This graph 1229 shows an acceleration signal 1231 resulting from rotation about the z-axis that is greater than the acceleration signals 1233, 1235 resulting from rotation about the x- and y-axes. The z-axis acceleration signal 1231 may form sensor data used to identify a flicking brush stroke motion. While all of the x-, y-, and z-axis acceleration signals 1231, 1233, 1235 are indicative of rotation about the respective axis, the acceleration signal 1231 resulting from rotation about the z-axis is indicative of a flicking motion.

Figure 20:
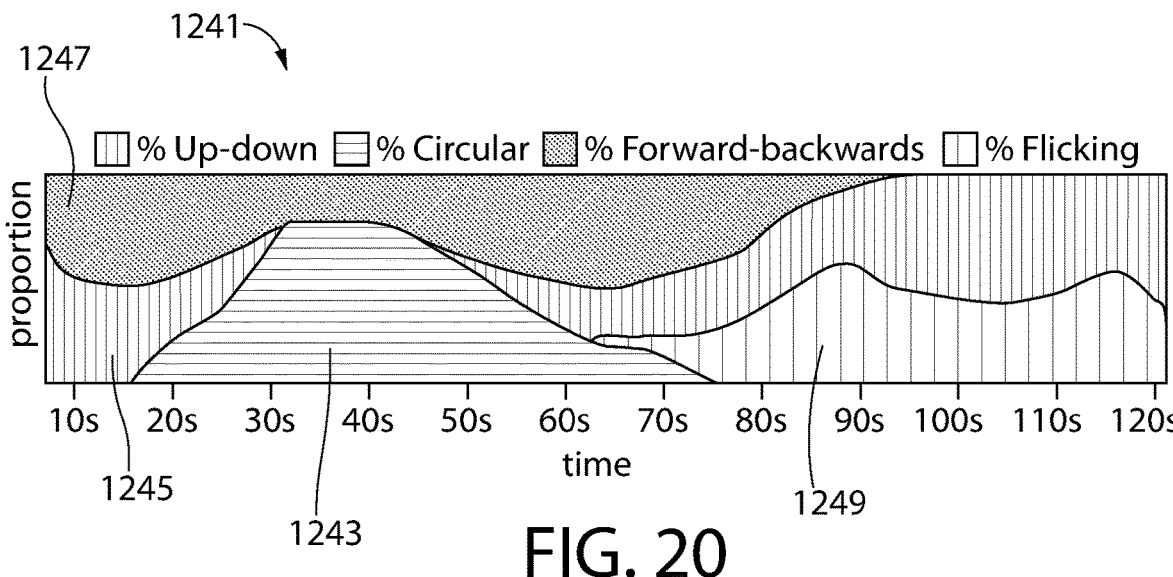
FIG. 20 is a chart showing a brushing profile with the proportion of each of the four brush stroke motions of FIGS. 16A-D over time.

A brushing profile graph 1241 illustrating the proportion of different types of brush stroke motion over time during a brushing routine is shown in FIG. 20. An entire brushing routine is shown in the brushing profile graph 1241, and in this instance the brushing routine lasted for 1120 sec. In practice, a brushing routine may be longer or shorter than 1120 sec, as each brushing routine has a time length, as explained in greater detail below, which is adjusted to account for the user's brushing habits. This brushing profile graph 1241 shows how the brushing profile of a brushing routine may be viewed as a composite of different types of brush stroke motions. The different types of brush stroke motions shown are a quasi-circular brush stroke motion 1243 (in the plane of the y- and z-axes), an up and down brush stroke motion 1245 (in the direction of the y-axis), a forward and backward brush stroke motion 1247 (in the direction of the z-axis), and a flicking brush stroke motion 1249 (rotation about the z-axis). In the brushing profile graph 1241, the up and down brush stroke motion 1245 and the forward and backward brush stroke motion 1247 are those parts of the acceleration signal during a brushing routine in which one and/or the other falls below the threshold for the brush stroke motion to be identified as a quasi-circular brush stroke motion. One technique that may be used to generate the brushing profile graph 1241 is, after the brush stroke motions have been identified, integrate the portion of the sensor signal from which each particular brush stroke motion was identified to generate sensor data, apply a normalization factor to the sensor data, and then use the resulting normalized sensor data to determine the proportion of each brush stroke motion over time during the brushing routine. The normalization factors may vary based on the implementation and brushing philosophy. For example, according to the traditional brushing philosophy that circular brush strokes are best, quasi-circular brush strokes may be normalized to have a greater weight as a percentage of the brushing profile.

Figure 21:
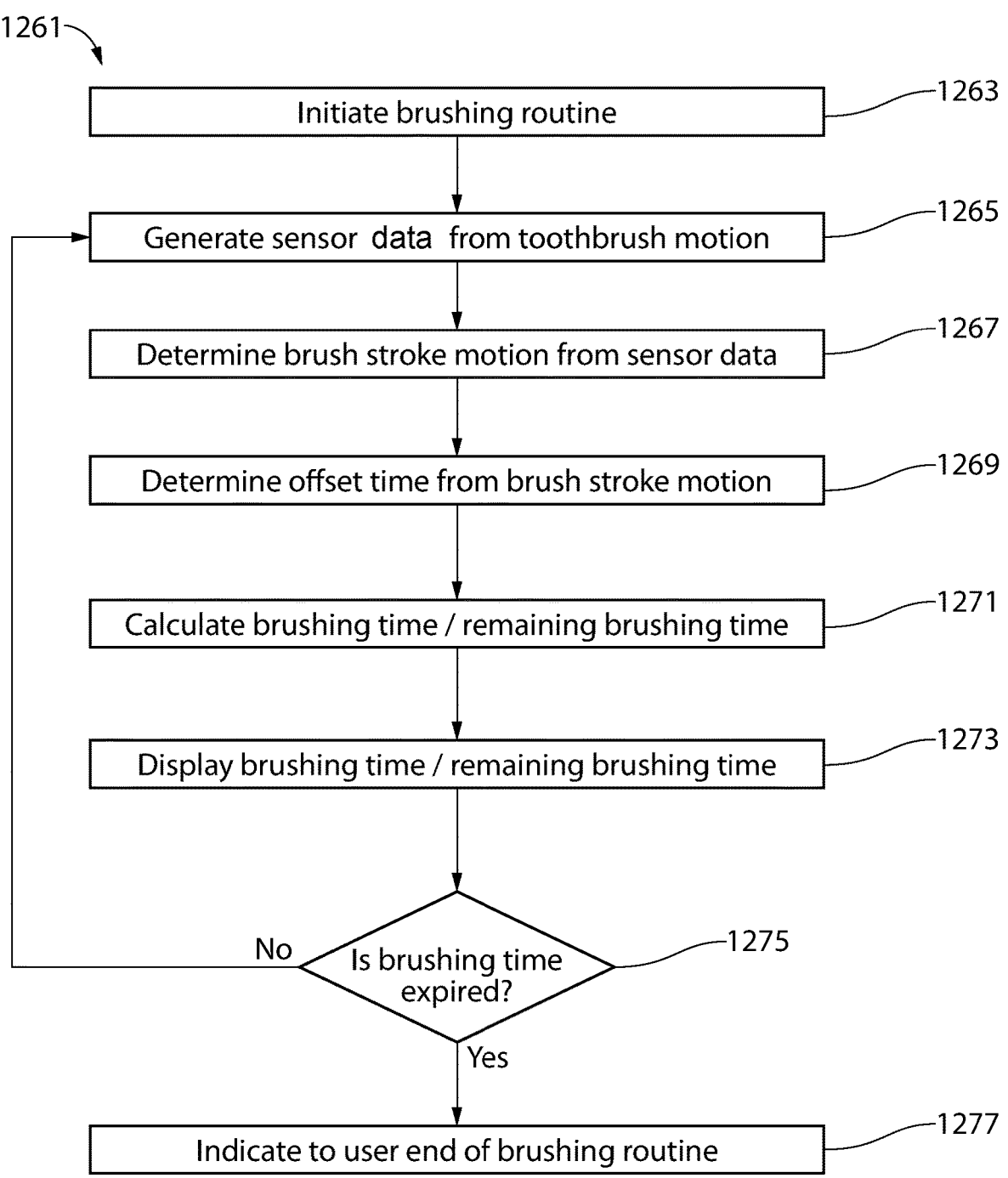
FIG. 21 is a flowchart showing a process for determining the target brushing time of a brushing routine, based on brush style motion, to achieve more efficient oral care using the oral care system of FIG. 14A.

A flowchart 1261 showing an exemplary process for at least a portion of brushing routine is shown in FIG. 21. The process of this flowchart 1261 serves to determine and adjust a target brushing time of a brushing routine based upon a determined brush stroke motion during the brushing routine, and the process may be implemented as programming for one or more processors. As should be appreciated, the target brushing time may be determined by processes different or varying from this exemplary process, such that the invention is not to be limited by the exemplary process. For convenience, as part of the description below, reference will also be made to the hardware components discussed above in FIGS. 14A-D. An initiation step 1263 starts off the brushing routine, and this initiation step 1263 may be achieved by the user pressing a button on one of the toothbrush 1103 or on the data processing unit 1105. Using the toothbrush 1103, in certain embodiments, the initiation step 1263 may be achieved by the user actuating the electrical switch 1143. On the data processing unit 1105, in certain embodiments, the initiation step may be achieved by first pressing the electrical switch 1143 on the toothbrush 1103 to power the electrical circuitry 1151 of the toothbrush 1103 and then pressing a button on the data processing unit 1105, or if the data processing unit 1105 includes a touch sensitive display, pressing a virtual button shown on touching the display 1175.

As part of the initiation step 1263, the user begins the brushing routine. In certain embodiments, the data processing unit 1105 may direct the user to follow a predetermined sequence for the brushing routine, starting the brushing routine by brushing a predetermined section of the denture of the user and then continuing to other sections of the denture according to the predetermined sequence. In other embodiments, in which the toothbrush 1103 has appropriate tracking sensors and the data processing unit 1105 is able to determine which sections of the denture are being brushed, regardless of sequence, the data processing unit may direct the user to start the brushing routine by first brushing a predetermined section of the denture and then tracking which sections are being brushed and for how long each is brushed during the brushing routine. In still other embodiments, the user may provide input to the data processing unit to indicate the section of the denture that will be brushed during the first portion of the brushing routine and during each subsequent portion of the brushing routine.

Following the initiation step 1263 is a sensor data generating step 1265 which is performed by the electronic circuitry 1151 of the toothbrush 1103. During this step 1265, the sensors 1155 included in the toothbrush 1103 sense the physical properties each is configured to detect and generate sensor data accordingly as the brushing routine begins and continues. Next is the brush stroke motion determination step 1267. In this step 1267, the sensor data is analyzed to determine the type or types of brush stroke motion for the first and/or current portion of the brushing routine. In other words, the sensor data may be analyzed in real time. In the exemplary embodiment, the sensor data is analyzed at least for a quasi-circular brush stroke motion. In certain embodiments, the sensor data may be a composite of different motions and is analyzed for two or more of a y-axis brush stroke motion, a z-axis brush stroke motion, a quasi-circular brush stroke motion, and a flicking brush stroke motion. The sensor data may be analyzed by the processor 1153 of the toothbrush 1103, or the sensor data may be transmitted by the communication module 1159 of the toothbrush 1103 to the communication module 1173 of the data processing unit 1105 to be analyzed by the processor 1169 of the data processing unit 1105. In certain embodiments, the sensor data may be analyzed in part by both the processor 1153 of the toothbrush 1103 and the processor 1169 of the data processing unit 1105.

Once the sensor data has been analyzed to determine one or more brush stroke motions present in the motion of the toothbrush, an offset time determining step 1269 is performed. In the exemplary embodiment, this step 1269 is performed by the processor 1169 of the data processing unit 105, although in other embodiments the offset time may be determined by the processor 1153 of the toothbrush 1103. In this step 1269, the offset time is determined using the determined brush stroke motions based on at least the start of the first or current portion of the brushing routine. The offset time is a reflection of the effectiveness of the user's brushing routine during a particular portion of the brushing routine. In certain embodiments, the offset time may be a reflection of the effectiveness of the user's brushing routine during two or more portions of the brushing routine, or even during the entire brushing routine. Specifically, if a portion of the brushing routine is determined to be less effective than an established standard, then the offset time is a positive number that may be used to increase the overall time length of the brushing routine. Generally, since the established standard calls for entirely circular brush strokes during a brushing routine, the offset time determined exclusively in terms of brush stroke motion will only be a positive number. However, as is discussed below, the offset time may be a negative number when brushing aggressiveness is taken into consideration.

The offset time may be determined by calculation, based on the percentages of different types of brush stroke motions that make up the determined brush stroke motion. Alternatively, the offset time may be determined using a lookup table, which may be a multi-dimensional matrix, each dimension representing one of the types of brush stroke motions, and each dimension divided into a plurality of values or value ranges. For example, in an embodiment in which the sensor data is analyzed for four different types of brush stroke motion, the lookup table is a four dimensional matrix. In such an embodiment, the matrix is based on calculations performed in advance, and comparison of the types of determined brush stroke motion with the matrix may yield the offset time faster than real-time calculations.

Following the offset time determining step 1269 is a target brushing time calculation step 1271. In this step 1271, the target brushing time or remaining brushing time for the brushing routine is calculated. In the exemplary embodiment, this step 1271 is also performed by the processor 1169 of the data processing unit 1105, although in other embodiments the offset time may be determined by the processor 1153 of the toothbrush 103. During the initial part of the brushing routine, the processor 1169 calculates the target brushing time by retrieving an optimum time which is stored in the memory 1171 and adding the determined offset time to the optimum time. For purposes of the process shown in this flowchart 1261, the optimum time represents the established standard for brushing effectiveness. As should be apparent, the offset time may increase the target brushing time in excess of the optimum time when the offset time is determined exclusively in terms of brush stroke motion. Also, when the brush stroke motion is determined to be primarily a quasi-circular brush stroke motion, then the determined offset time is zero and the target brushing time may then be the same as the optimum time.

Following the initial part of the brushing routine, the processor 1169 (or alternatively, the processor 1153) calculates the target brushing time again in the same manner, by re-determining the offset time, and then adjusting the target brushing time accordingly. This adjustment may be accounted for by determining the ratio of the brushing time remaining to the most recently calculated target brushing time, and then applying that same ratio to a newly calculated target brushing time, based on adding the re-determined offset time to the optimum time, to determine a new value for the brushing time remaining.

After the target brushing time calculation step 1271 is a displaying step 1273. During this step 1273, the processor 1169 controls the display 1175 to indicate to the user the target brushing time and/or the brushing time remaining. While displaying the target brushing time and/or brushing time remaining, a step 1275 is performed in which the processor 1169 determines if the target brushing time has expired. When the target brushing time has expired, the processor 1169 proceeds to an indication step 1277, in which the processor 1169 controls the display 1175 to inform the user that the brushing routine is at an end. When the target brushing time has not expired, the process returns to the sensor data generating step 1265 to continue determining the effectiveness of the user's brushing routine.

In certain embodiments, the displaying step 1273 may be replaced with a more generalized feedback step, in which one of the processor 1153 of the toothbrush 1103 or the processor 1169 of the data processing unit 1105 provides feedback to the user when the target brushing time and/or the brushing time remaining has expired. Such feedback may be provided to the user, for example, as audio feedback through a speaker or visual feedback by one or more LED indicators.

As should be apparent from the above description of FIG. 21, in certain embodiments, the sensor data analysis and feedback of the target brushing time to the user may be entirely performed by the processor 1153 of the toothbrush 1103. In certain other embodiments, the processes for the sensor data analysis and feedback may be performed partially by the processor 1153 of the toothbrush 1103 and partially by the processor 1169 of the data processing unit 1105. In still other embodiments, the processes for the sensor data analysis and feedback may be entirely performed by the processor 1169 of the data processing unit 1105.

In certain embodiments, the user may use the toothbrush 1103 without being within communication range of the data processing unit 1105 so that there is no active communication link between the toothbrush 1103 and the data processing unit 1105. In such embodiments, the toothbrush 1103 may perform the brush stroke determining step 1267 and store a brushing profile, of the type shown in FIG. 20, in the memory 1157. The next time the toothbrush 1103 is within communication range of the data processing unit 1105 and a communication link is established, the processor 1153 of the toothbrush 1103 may transmit any brushing profiles stored in memory to the data processing unit 1105.

In certain embodiments, the processor 1153 of the toothbrush 1103 and/or the processor 1169 of the data processing unit 1105 may be programmed to calculate a performance metric using the determined brush stroke motion. Such a performance metric may express the brushing profile for each portion of the brushing routine, or even for the entire brushing routine, as a number. In embodiments in which the processor 1153 of the toothbrush 1103 performs the brush stroke determining step 1267, the amount of resulting data stored in the memory may be significantly reduced for purposes of storage and later transmission to the data processing unit 105. In still other embodiments, the processor 1169 of the data processing unit 1105 may be configured to transmit to the server 1107 any performance metrics calculated for a brushing routine. This includes performance metrics calculated by the processor 1153 of the toothbrush 103 and those calculated by the processor 1169 of the data processing unit 1105. Calculation of performance metrics may reduce the amount of data stored in the memory 1171 of the data processing unit 1105 and/or transmitted to the server 1107 for storage.

In certain embodiments, brushing profiles and/or performance metrics which are stored in the memory 1171 of the data processing unit 1105 or on the server 1107 may be used during future brushing routines to aid in determining the offset time for a brushing routine. In particular, brushing profiles and/or performance metrics may be used to determine the target brushing time for a brushing routine prior to any sensor data being generated in step 1265. In such embodiments, the calculating brushing time step 1271 is performed to adjust the target brushing time determined from the brushing profiles and/or performance metrics. Also, in embodiments in which brushing profiles and/or performance metrics are stored, the brushing profiles and/or performance metrics may be analyzed by machine learning processes, and the machine learning may be used to enhance future brushing routines. Such machine learning may be performed by any one or more processors of the oral care system 101, and/or it may also be performed by an associated server 1107.

Figure 22:
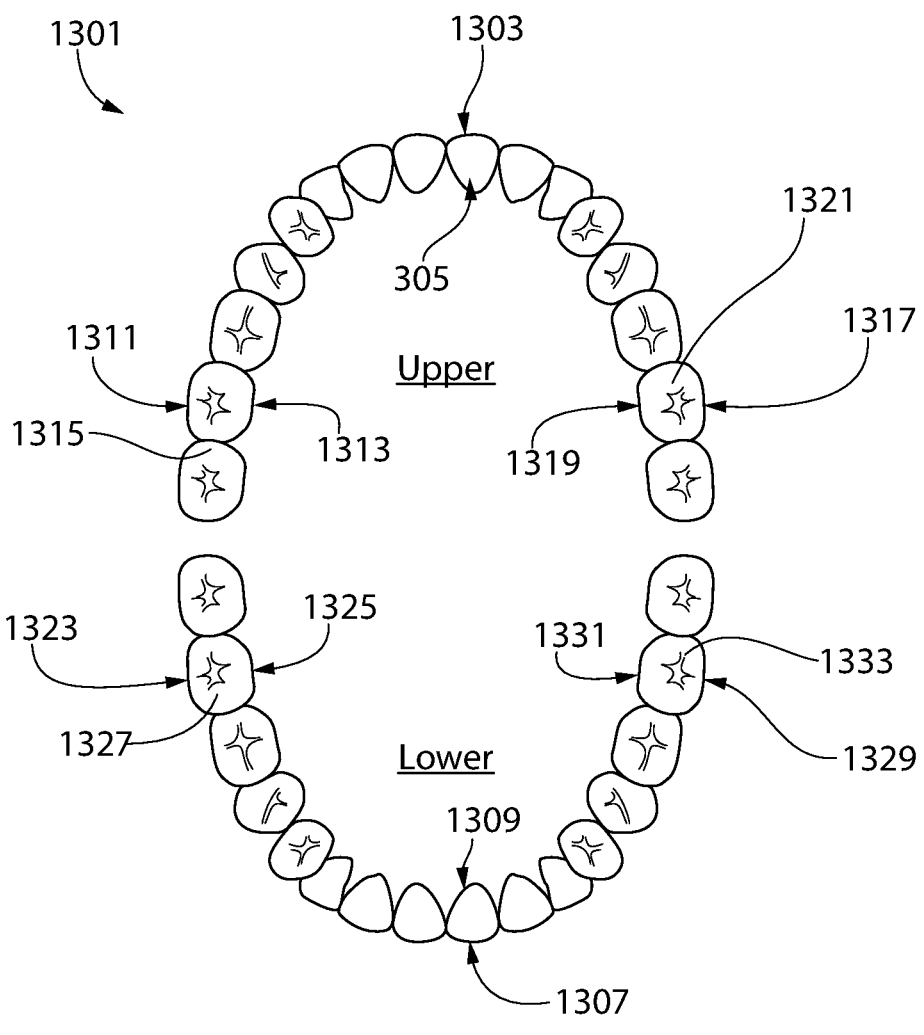
FIG. 22 illustrates different portions of the denture of a user for which the brushing routine may be independently analyzed and brushing times varied by the oral care system of FIG. 14A.

FIG. 22 illustrates the denture 1301 of a user and the sixteen different sections thereof which may be brushed by different portions of the brushing routine. In certain embodiments, a one-to-one correspondence exists between each denture section and each portion of the brushing routine. By having such a one-to-one correspondence, in embodiments in which performance metrics are calculated, the efficiency of a user's brushing routine for the entire denture may be more efficiently stored in memory for later use or reference. In certain other embodiments, any one portion of the brushing routine may correspond to multiple denture sections. In still other embodiments, the entire brushing routine has a single portion corresponding to all sections of the denture. The sections of the denture shown in FIG. 22 are: upper mesial buccal section 1303; upper mesial lingual section 1305; lower mesial buccal section 1307; lower mesial lingual section 1309; upper right buccal section 1311; upper right lingual section 1313; upper right occlusal section 1315; upper left buccal section 1317; upper left lingual section 1319; upper left occlusal section 1321; lower right buccal section 1323; lower right lingual section 1325; lower right occlusal section 1327; lower left buccal section 1329; lower left lingual section 1331; and lower left occlusal section 1333.

Figure 23A:
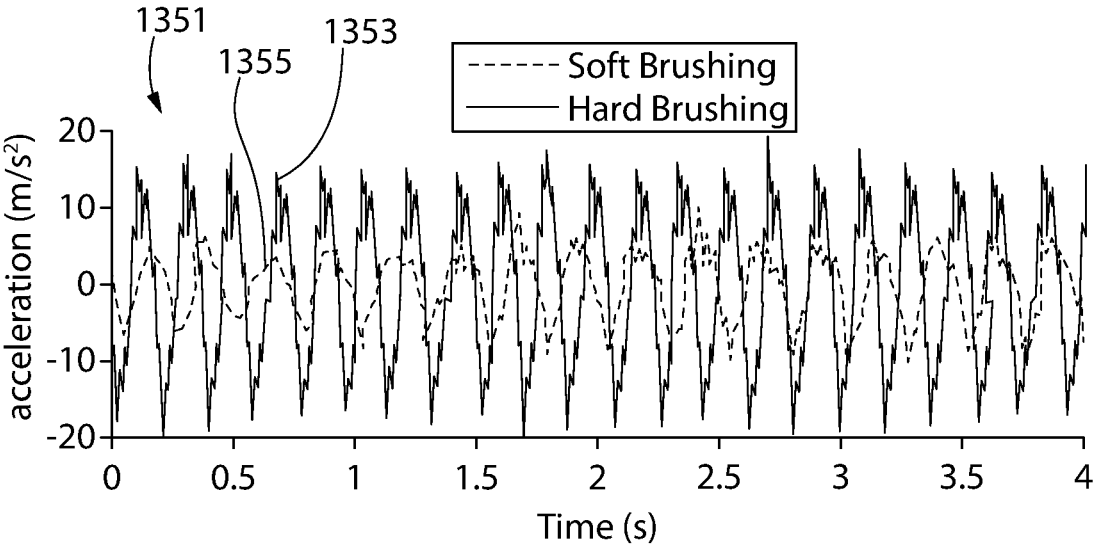
FIG. 23A is a first chart showing a comparison between two different stroke rates for an oral care device.

Another physical property which may be monitored during a brushing routine is brushing intensity, which is a measure of brushing aggressiveness during a brushing routine. Brushing aggressiveness during a brushing routine is characterized by over-brushing and/or under-brushing. Similar to how the target brushing time based on brush stroke motion is determined during a brushing routine, the target brushing time of a brushing routine based on brushing aggressiveness may also be determined. In certain embodiments, brushing aggressiveness may be used on its own to determine the target brushing time. In certain other embodiments, brushing aggressiveness may be combined with brush stroke motion to determine the target brushing time. FIG. 23A illustrates a graph 1351 which shows a plot of two z-axis acceleration signals 1353, 1355 taken from two different brushing routines. These two acceleration signals 1353, 1255, show the difference in the stroke rates used for the respective brushing routines. The stroke rate is the frequency of linear motion along the z-axis of the oral care device. The first acceleration signal 1353 is illustrative of over-brushing, while the second acceleration signal 1355 is illustrative of under-brushing. In the process described below, compensation for any over- or under-brushing may be achieved by adding a negative or positive offset time, respectively, to an optimum brushing time. As can be seen in the graph 1351, the first acceleration signal 1353 exhibits a larger amplitude as compared to the second acceleration signal 1355. The larger amplitude of the first acceleration signal 1353 indicate that the user is moving the head 1115 of the toothbrush 1103 in quick motions along the z-axis. In comparison, the smaller amplitude of the second acceleration signal 1355 indicate that the user is moving the head 1115 of the toothbrush 1103 in slower motions along the z-axis.

Figure 23B:
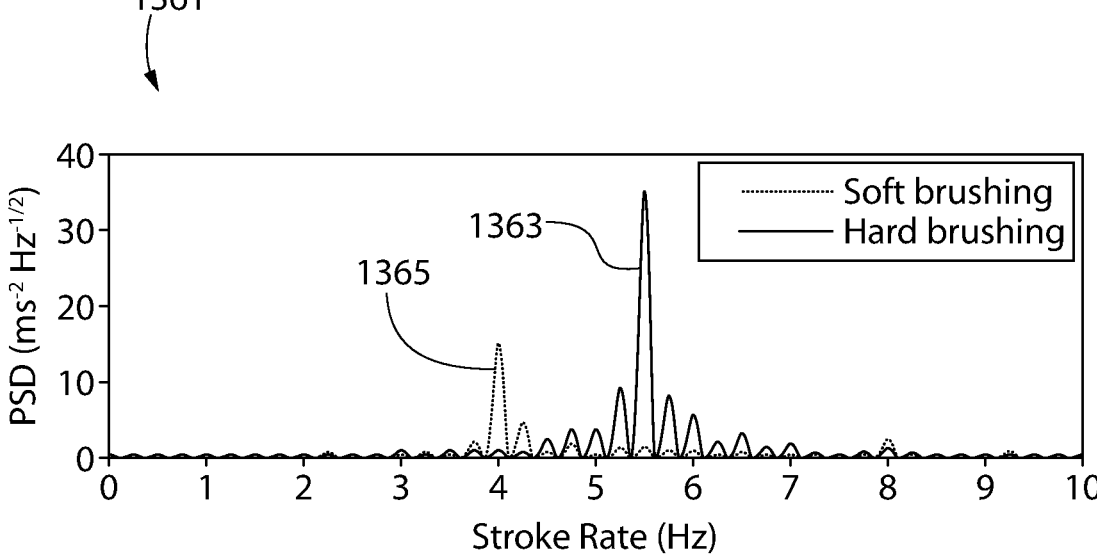
FIG. 23B is a second chart showing a comparison of power spectral density between two different stroke rates for an oral care device.

FIG. 23B illustrates the stroke intensity in a graph 1361 which shows power spectral density versus stroke rate derived from two z-axis acceleration signals 1363, 1365. This graph 1361 shows the number of discrete frequencies that are present in the each of the acceleration signals 1363, 1365. The first acceleration signal 1363 is illustrative of over-brushing, while the second acceleration signal 1365 is illustrative of under-brushing. As can be seen, the first acceleration signal 1363 includes a dominant peak at a higher frequency as compared to the second acceleration signal 1365. The higher frequency of the dominant peak in the first acceleration signal 1363 is another indication that the user is moving the head 1115 of the toothbrush 1103 at a faster rate along the z-axis. In comparison, the lower frequency of the dominant peak of the second acceleration signal 1355 indicate that the user is moving the head 1115 of the toothbrush 1103 at a slower rate along the z-axis.

Another indication of over- or under-brushing may be obtained by a force sensor placed in the toothbrush 1103. The force sensor may be positioned within the handle 1111 of the toothbrush 1103 so that as teeth are brushed, the force sensor generates sensor data which is indicative of the amount of pressure placed on the teeth by the bristles 1149.

Figure 24:
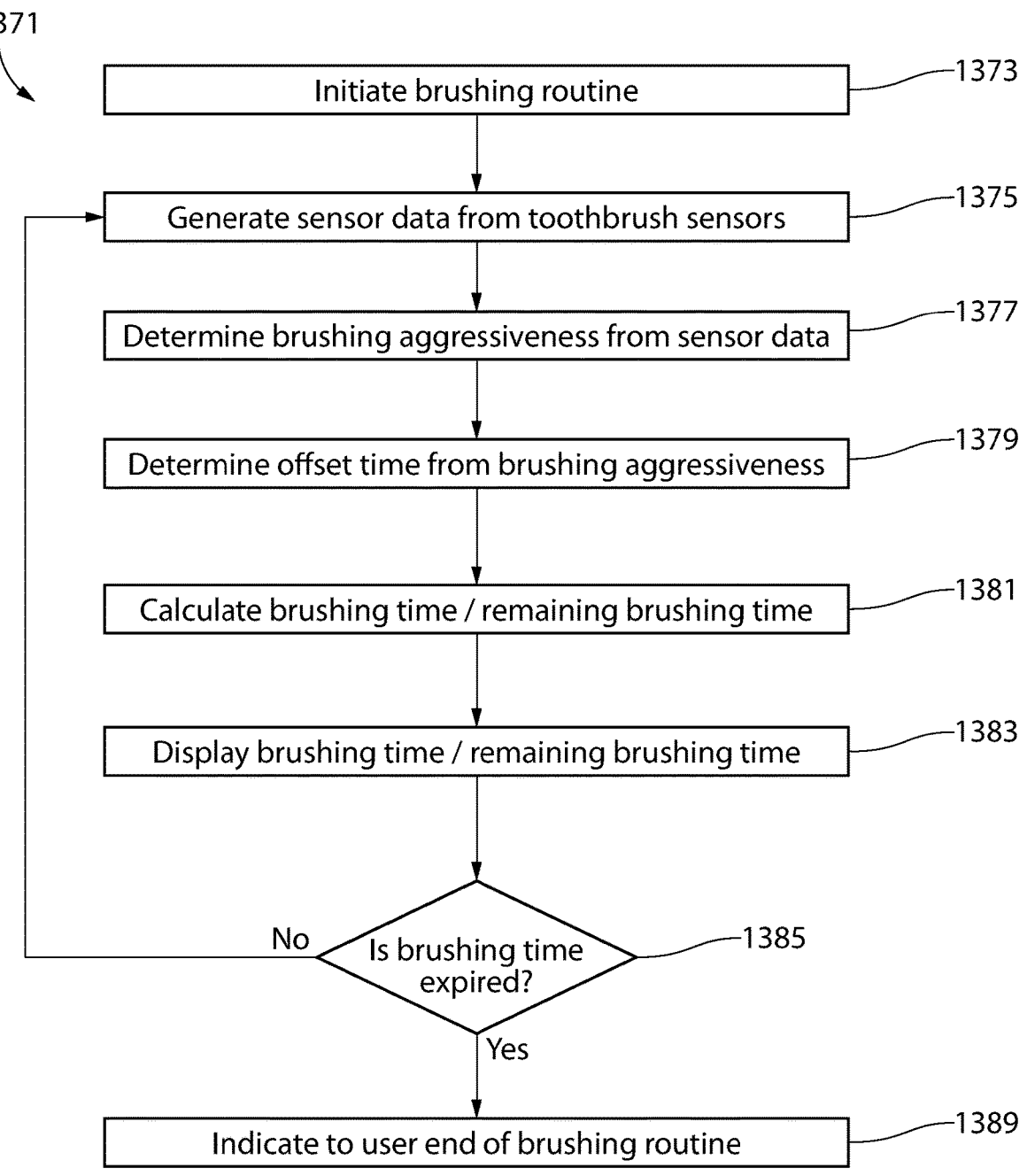
FIG. 24 is a flowchart showing a process for determining the target brushing time of a brushing routine, based on brushing aggressiveness, to achieve better oral care using the oral care system of FIG. 14A.

A flowchart 1371 showing an exemplary process for at least a portion of brushing routine is shown in FIG. 24. The process of this flowchart 1371 serves to determine and/or adjust a target brushing time of a brushing routine based upon a determined brushing aggressiveness during the brushing routine. As should be appreciated, the target brushing time may be determined by processes different or varying from this exemplary process, such that the invention is not to be limited to the exemplary process. An initiation step 1373 starts off the brushing routine. This initiation step 1373 may be achieved by the user pressing a button on one of the toothbrush 1103 or on the data processing unit 1105. Using the toothbrush 1103, in certain embodiments, the initiation step 1373 may be achieved by the user actuating the electrical switch 1143. On the data processing unit 1105, in certain embodiments, the initiation step 1373 may be achieved by first pressing the electrical switch 1143 on the toothbrush 1103 to power the electrical circuitry 1151 of the toothbrush 1103 and then pressing a button on the data processing unit 1105, or if the data processing unit 1105 includes a touch sensitive display, touching a virtual button shown on the display 1175.

As part of the initiation step 1373, the user begins the brushing routine. In certain embodiments, the data processing unit 1105 may direct the user to follow a predetermined sequence for the brushing routine, starting the brushing routine by brushing a predetermined section of the denture of the user and then continuing to other sections of the denture according to the predetermined sequence. In other embodiments, in which the toothbrush 1103 has appropriate tracking sensors and the data processing unit 1105 is able to determine which sections of the denture are being brushed, regardless of sequence, the data processing unit 1105 may direct the user to start the brushing routine by first brushing a predetermined section of the denture and then tracking which sections are brushed and for how long each is brushed during the brushing routine. In still other embodiments, the user may provide input to the data processing unit to indicate the section of the denture that will be brushed during the first portion of the brushing routine and during each subsequent portion of the brushing routine.

Following the initiation step 1373 is a sensor data generating step 1375 which is performed by the electronic circuitry 1151 of the toothbrush 1103. During this step 1375, the sensors 1155 included in the toothbrush sense the physical properties each is configured to monitor and generate signals accordingly as the brushing routine begins and continues. For determining brushing aggressiveness, the sensors may include at least one of an accelerometer and a force sensor. Next is the brushing aggressiveness determination step 1377. In this step 1377, the sensor data is analyzed to determine the brushing aggressiveness for the first and/or current portion of the brushing routine. In other words, the sensor data may be analyzed in real time. As indicated above, brushing aggressiveness may be determined by analyzing one or more of an acceleration signal, a power spectral density of an acceleration signal, and a force signal. The sensor data may be analyzed by the processor 1153 of the toothbrush 1103, or the sensor data may be transmitted by the communication module 1159 of the toothbrush 1103 to the communication module 1173 of the data processing unit 1105 to be analyzed by the processor 1169 of the data processing unit 1105. In certain embodiments, the sensor data may be analyzed in part by both the processor 1153 of the toothbrush 1103 and the processor 1169 of the data processing unit 1105.

Once the sensor data has been analyzed to determine the brushing aggressiveness, an offset time determining step 1379 is performed. In the exemplary embodiment, this step 1379 is performed by the processor 1169 of the data processing unit 1105. In this step 1379, the offset time is determined using the determined brushing aggressiveness based on at least the start of the first portion of the brushing routine. The offset time is a reflection of the over- or under-brushing of the user's brushing routine during a particular portion of the brushing routine. In certain embodiments, the offset time may be a reflection of the over- or under-brushing of the user's brushing routine during two or more portions of the brushing routine, or even during the entire brushing routine. Specifically, if a portion of the brushing routine is determined to include under-brushing as compared to an established standard, then the offset time may be a positive number that may be used to increase the time of the brushing routine. Alternatively, if a portion of the brushing routine is determined to include over-brushing as compared to the established standard, then the offset time is a negative number that may be used to decrease the time of the brushing routine.

The offset time may be determined by calculation, based on the amount of over- or under-brushing, or alternatively, the offset time may be determined through use of a lookup table. In embodiments which use a lookup table, all potential offset times included in the lookup table are calculated in advance.

Following the offset time determining step 1379 is a target brushing time calculation step 1381. In this step 1381, the target brushing time or remaining brushing time for the brushing routine is calculated. In the exemplary embodiment, this step 1381 is also performed by the processor 1169 of the data processing unit 105. During the initial part of the brushing routine, the processor 1169 calculates the target brushing time by retrieving an optimum time which is stored in the memory 1171 and adding the determined offset time to the optimum time. For purposes of the process shown in this flowchart 1371, the optimum time represents the established standard based on a generally neutral brushing aggressiveness.

Following the initial part of the brushing routine, the processor 1169 calculates the target brushing time in the same manner, by re-determining the offset time, and then adjusting the target brushing time accordingly. This adjustment may be accounted for by determining the ratio of the brushing time remaining to the most recently calculated target brushing time, and then applying that same ratio to a newly calculated target brushing time, based on adding the re-determined offset time to the optimum time, to determine a new value for the brushing time remaining.

After the target brushing time calculation step 1381 is a displaying step 1383. During this step 1383, the processor 1169 controls the display 1175 to indicate to the user the target brushing time and/or the brushing time remaining. During the displaying step 1383 is a step 1385 in which the processor 1169 determines if the target brushing time has expired. When the target brushing time has expired, the processor 1169 proceeds to an indication step 1387, in which the processor 1169 controls the display 1175 to inform the user that the brushing routine is at an end. When the target brushing time has not expired, the process returns to the sensor data generating step 1375 to continue determining the brushing aggressiveness of the user's brushing routine.

In certain embodiments, the displaying step 1383 may be replaced with a more generalized feedback step, in which one of the processor 1153 of the toothbrush 1103 or the processor 1169 of the data processing unit 1105 provides feedback to the user when the target brushing time and/or the brushing time remaining has expired. Such feedback may be provided to the user, for example, as audio feedback through a speaker or visual feedback by one or more LED indicators.

As should be apparent from the above description of FIG. 24, in certain embodiments, the entirety of the sensor data analysis and feedback of the target brushing time to the user may be entirely performed by the processor 1153 of the toothbrush 1103. In certain other embodiments, the processes for the sensor data analysis and feedback may be performed partially by the processor 1153 of the toothbrush 1103 and partially by the processor 1169 of the data processing unit 1105. In still other embodiments, the processes for the sensor data analysis and feedback may be entirely performed by the processor 1169 of the data processing unit 1105.

In certain embodiments, the processor 1153 of the toothbrush 1103 and/or the processor 1169 of the data processing unit 1105 may be programmed to calculate a performance metric using the determined brushing aggressiveness. Such a performance metric may express the brushing aggressiveness for each portion of the brushing routine, or even for the entire brushing routine, as a number. In embodiments in which the processor 1153 of the toothbrush 1103 performs the brushing aggressiveness determining step 1377, the amount of resulting data stored in the memory may be significantly reduced for purposes of storage and later transmission to the data processing unit 1105. In still other embodiments, the processor 1169 of the data processing unit 105 may be configured to transmit to the server 1107 any performance metrics calculated for a brushing routine. This includes performance metrics calculated by the processor 1153 of the toothbrush 1103 and those calculated by the processor 1169 of the data processing unit 1105. Calculation of performance metrics may reduce the amount of data stored in the memory 1171 of the data processing unit 1105 and/or transmitted to the server 1107 for storage.

In certain embodiments, brushing profiles and/or performance metrics which are stored in the memory 1171 of the data processing unit 1105 or on the server 1107 may be used during future brushing routines to aid in determining the offset time for a brushing routine. In particular, brushing profiles and/or performance metrics may be used to determine the target brushing time for a brushing routine prior to any sensor data being generated in step 1375. In such embodiments, the calculating the target brushing time step 1381 is performed to adjust the target brushing time determined from the brushing profiles and/or performance metrics. Also, in embodiments in which brushing profiles and/or performance metrics are stored, the brushing profiles and/or performance metrics may be analyzed by machine learning processes, and the machine learning may be used to enhance future brushing routines. Such machine learning may be performed by any one or more processors of the oral care system 1101, and/or it may also be performed by an associated server 1107.

Figure 25A:
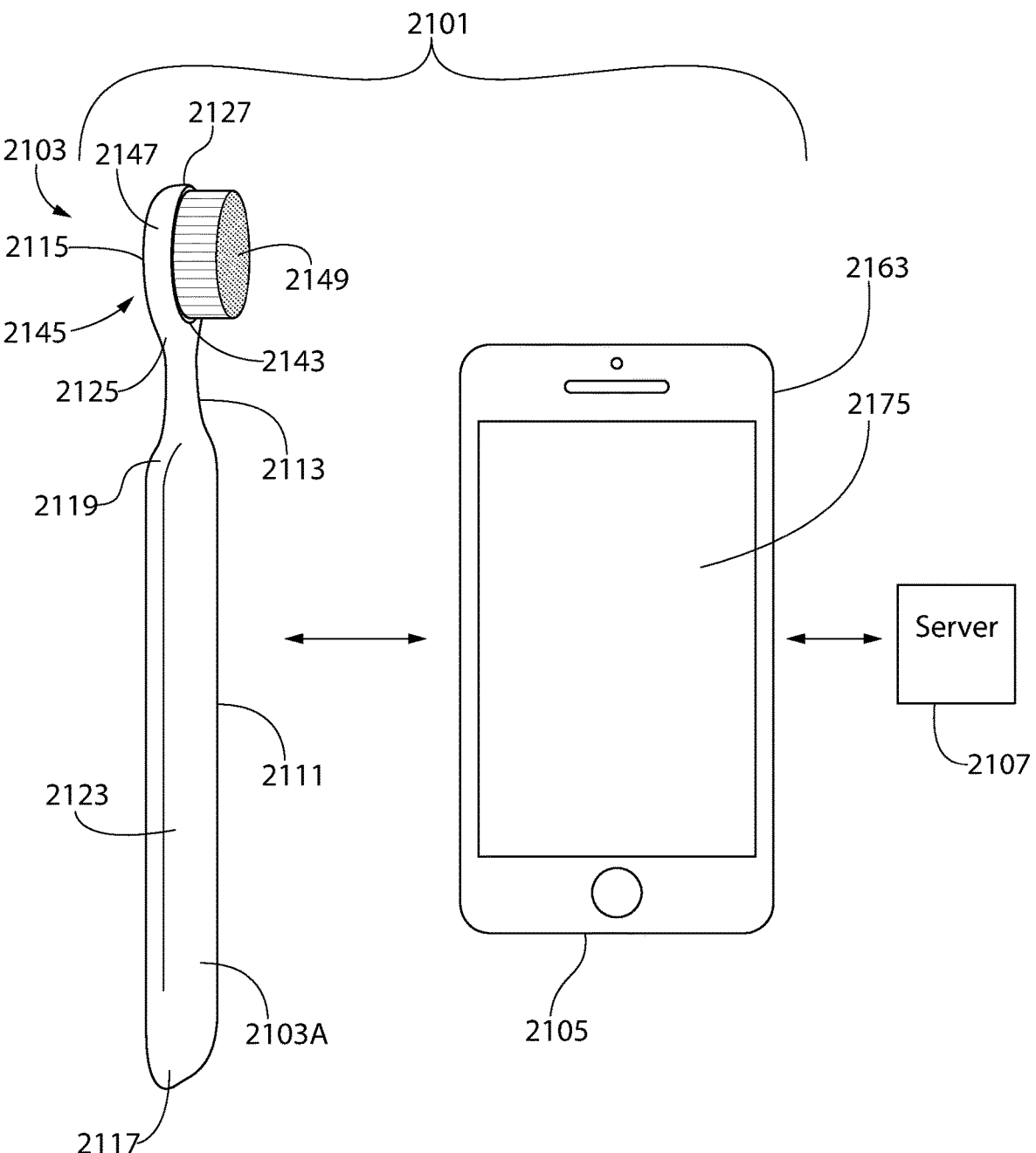
FIG. 25A illustrates an oral care system according to another embodiment of the present invention.

FIG. 25A illustrates an oral care system 2101 in accordance with an embodiment of the present invention. The oral care system 2101 includes a toothbrush 2103 and a data processing unit 2105. The data processing unit 2105 may communicate with a server 2107 for purposes of storing larger amounts of data or to provide server-side processing functionality. The presence of the server 2107 and communication between the data processing unit 2105 and the server 2107, however, are not limiting of the present invention, unless specifically set forth in a claim.

The toothbrush 2103 may be of any type that includes teeth cleaning elements suitable for cleaning teeth, and therefore is not limited to the toothbrush 2103 illustrated as part of the exemplary embodiment. The toothbrush 2103 shown in FIG. 25A generally includes a handle 2111, a neck 2113, and a head 2115. The neck 2113 extends between the handle 2111 and the head 2115 and connects the head 2115 to the handle 2111. The handle 2111 provides the user with a mechanism by which the toothbrush 2103 can be readily gripped and manipulated during a brushing session. The handle 2111 may be formed of many different shapes, sizes and materials and may be formed by a variety of manufacturing methods that are well-known to those skilled in the art. The handle 2111 extends from a proximal end 2117 to a distal end 2119 to form an elongated gripping portion 2123 therebetween. The handle 2111 transitions into the neck 2113 at the distal end 2119. While the neck 2113 generally has a smaller transverse cross-sectional area than the handle 2111, the invention is not so limited. Broadly speaking, the neck 2113 forms a transition region between the handle 2111 and the head 2115, with the head 2115 extending from a proximal end 2125 at the end of the neck 2113 opposite the handle 2111 to a distal end 2127. While the head 2115 is normally widened relative to the neck 2113, in some embodiments the head 2115 can simply be a continuous extension or narrowing of the neck 2113 and/or handle 2111.

The handle 2111, the neck 2113, and the head 2115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 2111, the neck 2113, and the head 2115 of the toothbrush 2103 may be formed as a single unitary structure using a molding, milling, machining, or other suitable process. In certain embodiments, the neck 2113 may be made from a material which is more flexible than the handle 2111 or the head 2115, and in such embodiments, the flexibility of the neck 2113 provides the head 2115 with mobility with respect to the handle 2111. Whether the handle 2111, the neck 2113, and the head 2115 are of a unitary or multi-piece construction (including connection techniques) is not limiting of the present invention, unless specifically set forth in a claim. In some embodiments of the invention, the head 2115 can have a first portion that is flexibly attached to a second portion of the head 2115. During brushing, the first portion can move with respect to the second portion to enhance the brush head's ability to reach certain portions of the denture. In some embodiments of the invention, the head 2115 may be detachable (and replaceable) from the handle 2111 and/or from the neck 2113 using techniques known in the art.

The head 2115 generally includes a front surface 2143, a rear surface 2145 and peripheral side surfaces 2147 that extend between the front and rear surfaces 2143, 2145. The front surface 2143 and the rear surface 2145 of the head 2115 can take on a wide variety of shapes and contours, none of which are limiting of the present invention. For example, the front and rear surfaces 2143, 2145 can be planar, contoured or combinations thereof.

The front surface 2143 of the head 2115 includes at least one teeth cleaning element, shown in the exemplary embodiment as a plurality of bristles 2149, extending therefrom for cleaning teeth surfaces. As used herein, the term "teeth cleaning element" is used in a generic sense to refer to any structure that can be used to clean or polish the teeth through relative surface contact. In certain embodiments, the head 2115 may include a single teeth cleaning element, and in other embodiments, the head 2115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 2149 of the toothbrush 2111 can be connected to the head 2115 in any manner known in the art. For example, staples/anchors, in-mold tufting (IMT) or anchor free tufting (AFT) could be used to mount the bristles 2149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 25B:
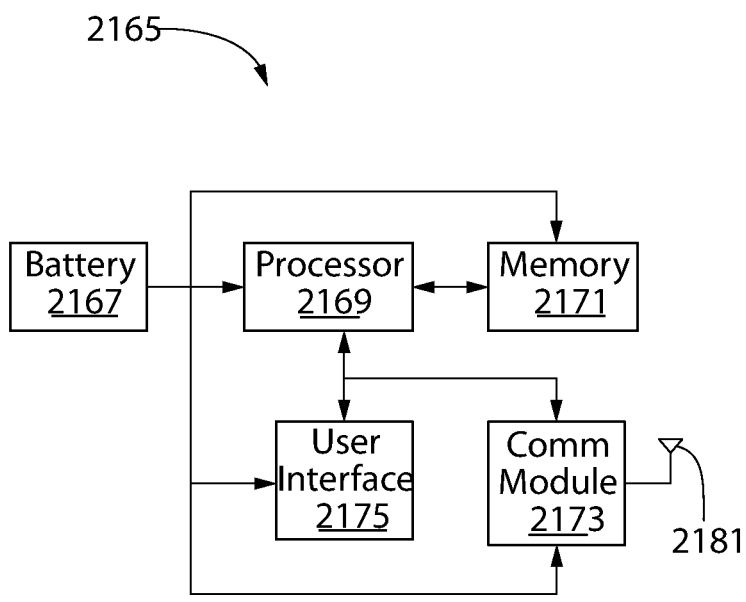
FIG. 25B is a schematic of the electronic circuitry of the data processing unit of FIG. 25A.

Referring to both FIGS. 25A and 25B, the data processing unit 2105 includes a housing 2163 and electronic circuitry 2165, with the housing 2163 enclosing and/or supporting the various components of the electronic circuitry 2165. The electronic circuitry 2165 includes a power source, shown as a battery 2167 in the exemplary embodiment. Of course, the invention is not so limited, and other types of power sources may be used. The electronic circuitry 2165 of the data processing unit 2105 also includes a processor 2169 communicably coupled to a memory 2171, a communication module 2173, and a user interface 2175.

In certain embodiments, the electronic circuitry 2165 may include other components, such as a speaker to provide audible feedback to the user, one or more buttons to receive input from the user, and one or more ports for making a wired connection between the electronic circuitry 2165 and other circuitry external to the data processing unit 2105. In certain other embodiments, the data processing unit 2105 may be a smartphone, a tablet computer, a laptop computer, and the like, although the invention is not so limiting. In the exemplified embodiment, the electronic circuitry 2165 is located within housing 2163 of the data processing unit 2105, this housing 2163 being separate and distinct from the housing 2103A of the toothbrush 2103 In other embodiments, such as that discussed below with respect to FIG. 28, the electronic circuitry 2165 or certain components thereof may be located within the housing 2103A of the toothbrush 2103.

The memory 2171 may be any appropriate type of memory or storage which enables the processor 2169 to perform the desired programming, such as volatile and/or non-volatile random access memory. The particular type of storage used for the memory 2171 is not to be limiting of the invention.

In the exemplified embodiment, the user interface 2175 is a touch-sensitive display which accepts input from the user directly on the display surface. The display may be any type of light emitting display, and as shown in the exemplary embodiment, the display may be an LED panel. In certain other embodiments, the display may be an LCD panel, an OLED panel, or any other type of display which is electronically controllable by the programmable processor 2169 to provide visual feedback to the user. As will be discussed below, the user interface is not limited to the exemplary embodiment, but can comprise any device or method by which a user interacts with the data processing unit or a programmable processor. For example, in other embodiments the user interface can utilize a non-touch-sensitive graphical user interface, buttons, a dial, a keyboard, and/or a mouse.

The communication module 2173 may include an antenna 2181 to enable wireless transmission of communication signals. The communication module 2173 may be configured and/or programmed to communicate using a wireless technology standard such as Wi-Fi, Bluetooth®, and the like, or it may communicate using any type of proprietary wireless transmission protocol. The mode of communication for which the communication module 2173 is configured is not limiting of the invention unless specifically set forth in a claim. In certain embodiments, the communication module 2173 may include a port to enable communications using wires and wired protocols, such as USB and the like.

The communication module 2173 of the data processing unit 2105 may be configured and/or programmed to communicate with the server 2107. The communication module 2173 may communicate with the server 2107 over any combination of public and/or private network, and the communications may be wired, wireless, or a combination of the two. In certain embodiments, the communication module 2173 may communicate with the server 2107 over the Internet using one or more types of communication protocols. In certain embodiments, the server 2107 may be programmed with one or more application programming interfaces (APIs) which provides server-side functionality to the data processing unit 2105.

Figure 26:
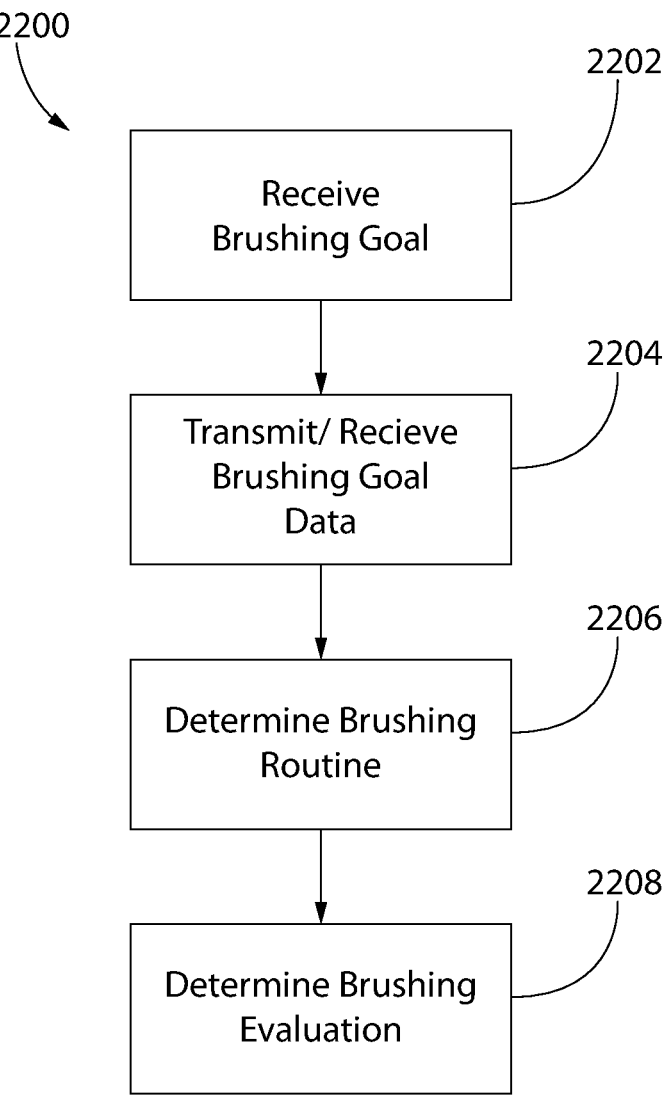
FIG. 26 is a flowchart showing a process for determining a brushing routine and a brushing evaluation from a brushing goal according to an embodiment of the invention.

FIG. 26 is a flowchart showing a process 2200 for determining a brushing routine and a brushing evaluation from a brushing goal according to an embodiment of the invention. The exemplified process 2200 may be implemented as programming for the programmable processor 2169 of the data processing unit 2105. For convenience, as part of the description below, reference will also be made to the hardware components of the data processing unit 2105 discussed above in FIG. 25B. While in the exemplified embodiment the processor 2169 and other electronic circuitry 2165 form part of the data processing unit, the disclosure is not so limited. For example, in other embodiments, a processor forming part of the toothbrush can carry out the steps carried out by processor 2169 in the embodiments discussed herein.

In a first operation, the user interface 2175 receives a brushing goal (operation 2202). In the exemplified embodiment, the brushing goal is received by the user through a touch-sensitive display, though the brushing goal can be received through any user interface. The brushing goal can be any objective for a brushing session. In one embodiment, the brushing goal can be chosen from two options: a standard deep cleaning and a quick refreshing cleaning. In other embodiments, the brushing goal can be chosen from alternative options, such as a mild, moderate, or heavy cleaning. In yet other options, the brushing goal can be a cleaning that is focused on removing particles from the front teeth, a cleaning that is focused on removing food from the molars, or a cleaning for a set period of time.

In a further operation, brushing goal data can be generated, transmitted, and/or received, the brushing goal data being indicative of the brushing goal received by the user interface (operation 2204). For purposes of the present disclosure, the term "brushing goal data" is any type of information indicative of a brushing goal of a user, including information extracted or derived from other information or data indicative of a brushing goal, regardless of the form of the extracted information, and combinations thereof. The brushing goal data may be in the form of mathematical data, analog data, and/or digital data. In the exemplified embodiment, the user interface 2175 receives the brushing goal, generates brushing goal data based on the brushing goal, and transmits the brushing goal data to the programmable processor 2169. But the invention is not so limited. For example, in other embodiments, the programmable processor can work with the user interface to receive and process brushing goal data.

In a further operation, a suggested brushing routine is determined based at least in part on the brushing goal data (operation 2206). The suggested brushing routine can be any one or more steps or instructions for brushing teeth. The determination of the suggested brushing routine may be achieved in any number of ways. In certain embodiments, the suggested brushing routine may be determined by presenting the user with a list of potential brushing routines that accord with the selected brushing goal, and having the user select the suggested brushing routine from among the list of potential brushing routines. In certain embodiments, the suggested brushing routine may be determined by adjusting a standardized brushing routine based on the brushing goal data, or by adjusting a time based on the brushing goal data, as described below. In certain embodiments, the suggested brushing routine may be determined by selecting a predetermined brushing routine based on the brushing goal data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 2171 of the data processing unit 2105 or in a memory of the server 2107. In still other embodiments, one or more of the aforementioned processes for determining the suggested brushing routine may be used in combination.

In one embodiment, the suggested brushing routine is determined by adjusting an optimum brushing time based on the brushing goal data to determine the brushing time for the suggested brushing routine. In this embodiment, the optimum brushing time is predetermined from a standardized brushing routine. The standardized brushing routine may be an industry standard brushing routine in which the optimum brushing time is 2 minutes. This process can begin with the brushing goal data being received by the data processing unit 2105. Next, the data processing unit 2105 determines an offset time based on the brushing goal data. For example, if the goal is a quick refresh of the oral cavity, then the offset time may be a negative number. Following the offset time determination, the target brushing time for the brushing routine is calculated. As part of this step, the programmable processor 2169 of the data processing unit 2105 calculates the target brushing time by retrieving an optimum time which is stored in the memory 2171 and adding the determined offset time to the optimum time. The determined target brushing time can then be displayed, and the user can be instructed to begin the suggested brushing routine. In certain embodiments, the processor 2169 of the data processing unit 2105 may provide other specific instructions for the brushing routine, such as the order for brushing different sections of the user's denture, the length of time to brush each section, which section to start with, and the like. When the brushing time has expired, the programmable processor 2169 of the data processing unit 2105 can instruct the user that the brushing routine is at an end.

In the exemplified embodiment, after determining the suggested brushing routine, there is a determination of a brushing evaluation based on the brushing goal data (step 2208). As will be discussed in further detail below, the oral care system 2101 can be configured to perform a brushing evaluation of a brushing session of a user. The brushing evaluation can be any assessment of the effectiveness of one or more brushing sessions. For example, the toothbrush 2103 can include sensors, and data derived from the sensors can be used to determine the motion and/or location of the toothbrush. From this determination, the system 2101 can determine how well the user brushed his or her teeth. In the exemplified embodiment, the evaluation is based in part on the brushing goal data. Thus, for example, while a brushing evaluation would typically provide a negative evaluation when the brushing session was only one minute, the brushing evaluation according to the invention need not be negative if the user indicated that the purpose of the given brushing session was only a quick refresh of the oral cavity. Accordingly, the user is not penalized in his brushing evaluation for carrying out a supplemental brushing session for refreshing his oral cavity. In one embodiment, the determination of the brushing evaluation is based on both brushing goal data and brushing data from a brushing session, the brushing data being derived from a sensor forming part of the toothbrush. Further, the brushing evaluation can be based on a comparison of the brushing data from the brushing session and the suggested brushing routine.

The brushing goal data can impact an evaluation of an individual brushing session, and can also impact an evaluation of a plurality of brushing sessions. Thus, while one-minute of brushing may be adequate for a modest brushing goal, carrying out only two one-minute brushing sessions per day will not be adequate, and a cumulative evaluation can reflect this. The cumulative evaluation will not penalize a user for meeting a modest brushing goal for a session, but will also ensure that general brushing goals are being met. Such general brushing goals can be based on established ideal brushing objectives, or can be individualized based on factors particular to the user.

In the foregoing method 2200, the brushing goal data is used to both determine a suggested brushing routine and determine a brushing evaluation. It is noted, however, that in other embodiments the brushing goal data can be used to determine a suggested brushing routine but not to determine a brushing evaluation, or to determine a brushing evaluation but not to determine a suggested brushing routine.

Figure 27:
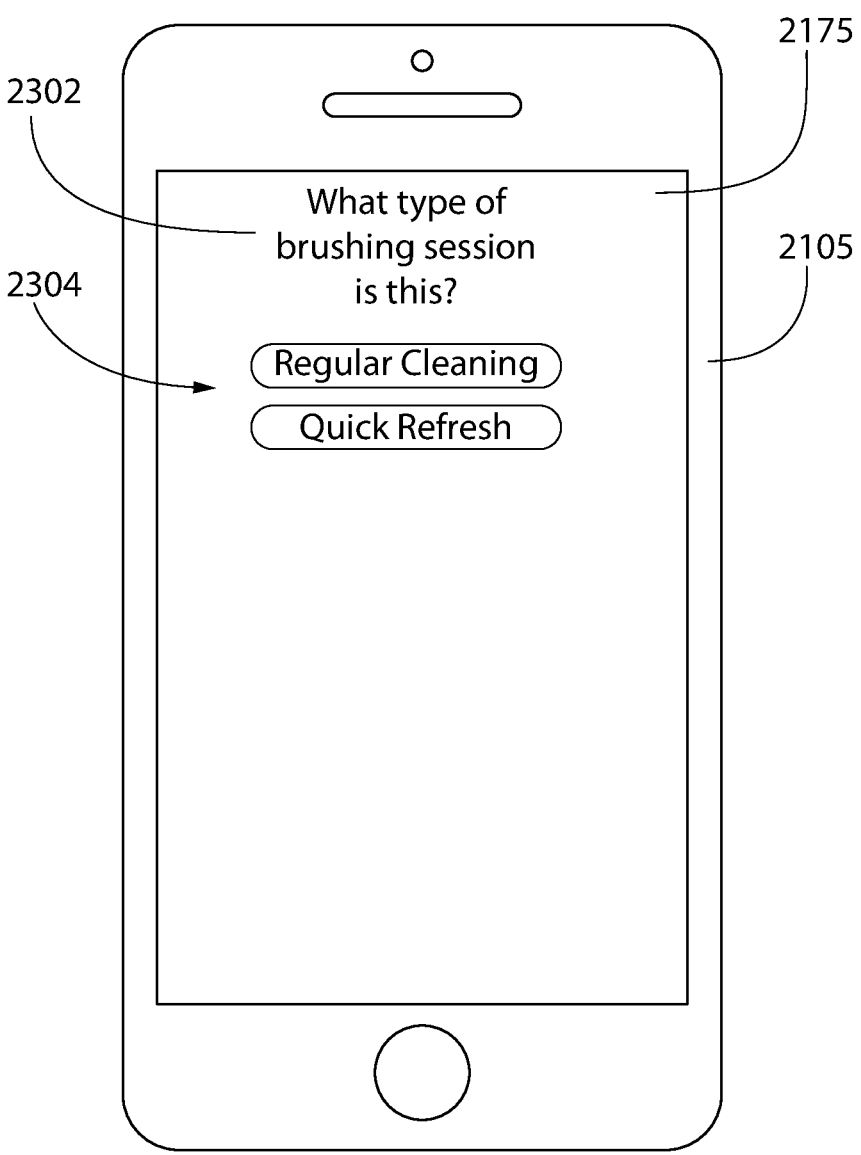
FIG. 27 illustrates a data processing unit having a user interface whereby a user inputs a brushing goal according to an embodiment of the invention.

FIG. 27 illustrates a data processing unit 2105 having a user interface 2175 according to one embodiment. Here, the user may input the brushing goal data through the user interface 2175. In such embodiments, the data processing unit 2105 may present to the user using the user interface one or more questions 2302 concerning at least one brushing goal of the user, and then receive a selected answer 2304 to the one or more questions. The questions and answers shown are merely exemplary in nature, and any of the brushing goals discussed herein (as well as others) can be the subject of a question or answer on a user interface for the purposes of receiving brushing goal data. In other embodiments, a user can type a goal and be provided with options that corresponded with the typed goal. In other embodiments, a series of questions or topics can be provided to the user by the user interface. For example, in addition to the type of brushing session, the user can be prompted to indicate the intended brushing time or an area of the oral cavity upon which the user would like to focus.

Figure 28:
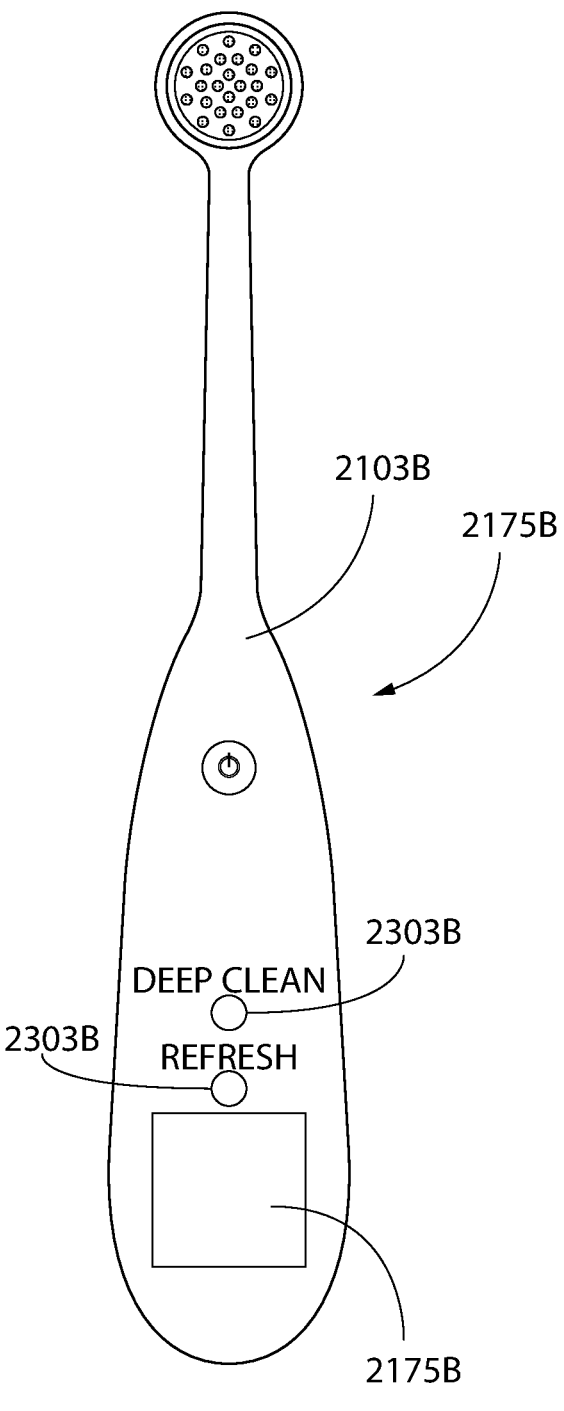
FIG. 28 illustrates a toothbrush comprising a user interface according to an embodiment of the invention.

FIG. 28 illustrates a toothbrush 2103B comprising a user interface 2175B according to another embodiment of the invention. In this embodiment, the toothbrush 2103B comprises the user interface 2175B and the programmable processor (not shown). The user interface 2175B comprises buttons 2303B for selecting a brushing goal option. Brushing goal data can be generated based on the button 2303B pressed, and the brushing goal data can be utilized as discussed herein. The exemplified user interface 2175B further comprises a display 2175B. The display can provide information similar to the information displayed on the touch-sensitive display 2175. For example, the display 2175 can provide information regarding a suggested brushing routine, or brushing evaluation information. In other embodiments, other buttons indicative of other goals can be used. For example, a button can indicate increased or decreased brushing time, which can then be shown on the display 2175B. In other embodiments, the display 2175 can be omitted. In this case, the user can indicate his brushing goal using the buttons (or other user interface) on the toothbrush, but the determined routine or evaluation can appear elsewhere, such as on a data processing unit. Further, the toothbrush 2103B can be any type of toothbrush, including a manual toothbrush or an electric toothbrush having an electrically-powered vibratory element.

Figure 29:
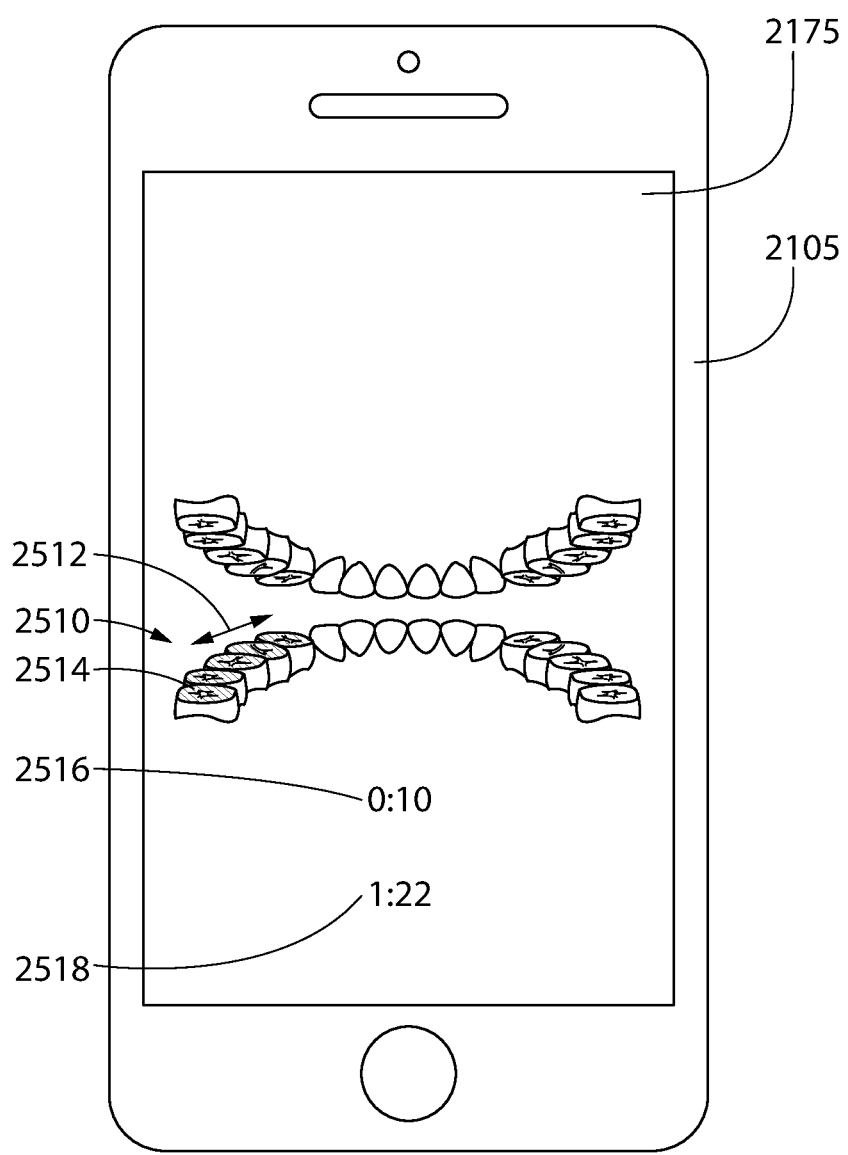
FIG. 29 illustrates a data processing unit having a user interface that provides brushing instructions for a brushing routine according to an embodiment of the invention.

FIG. 29 illustrates a data processing unit 2105 having a user interface 2175 that provides brushing instructions 2510 for a brushing routine according to one embodiment, the instructions 2510 being based in part on the brushing goal received. In this embodiment, the brushing instructions 2510 comprise real-time directions for a user to follow during a brushing session. The instructions 2510 comprise an indication 2514 of a region of the denture to brush, an indication 2512 of a brushing motion, and an indication 2516 of a time remaining for brushing the specified region. In this embodiment, the user interface 2175 also provides an indication 2518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity. The instructions (such as motion, region, and time) can be based at least in part on the brushing goal of the user. Thus, for example, if the user desired only a quick refresh of the oral cavity, the routine could reflect this goal by decreasing the time to be less than a typical brushing session, or by changing the brushing motions provided or the brushing regions indicated to those more likely to promote fresh breath. Further, if the user wished to dedicate more time to removing food from the molars, the instructions could reflect this goal by extending the time dedicated to the molars from the time typically dedicated to the molars.

The suggested brushing routine can be determined by adjusting a preexisting brushing routine, the adjustment based at least in part on the brushing goal data. In other embodiments, the suggested brushing routine need not rely on a preexisting brushing routine.

Figure 30:
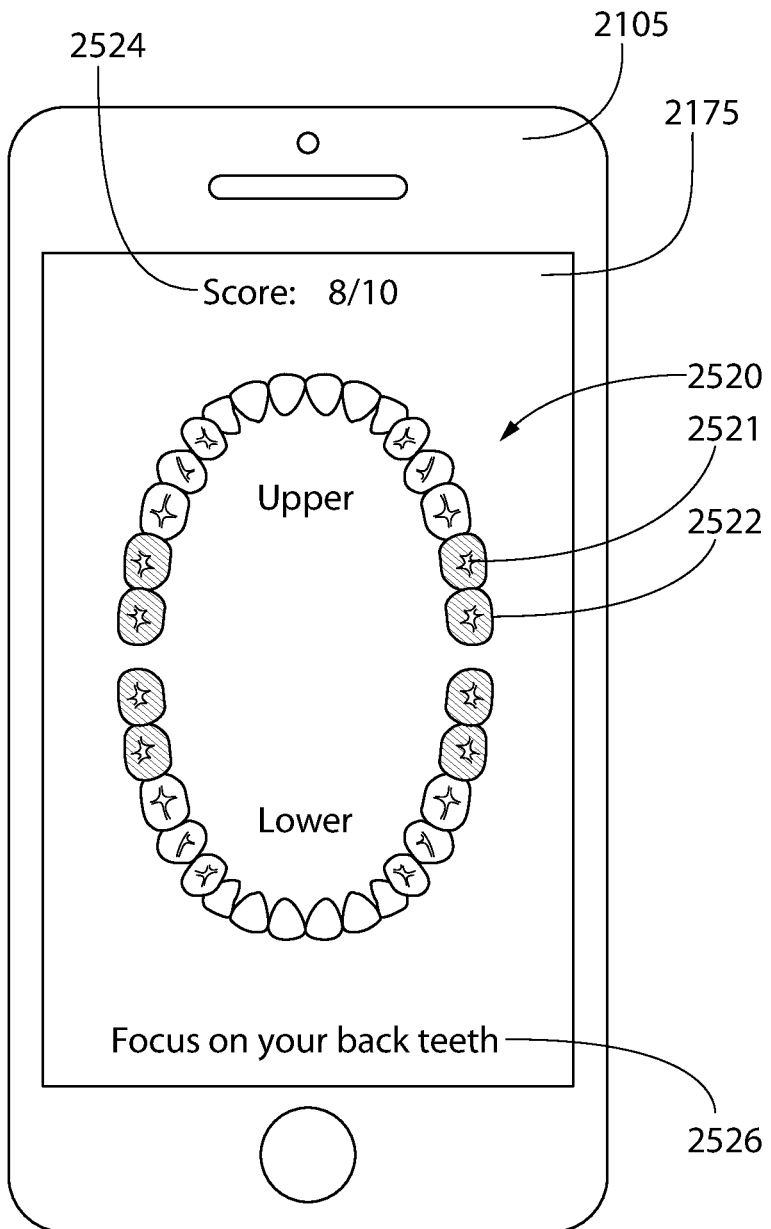
FIG. 30 illustrates a data processing unit having a user interface that provides an evaluation of a brushing session of a user according to an embodiment of the invention.

FIG. 30 illustrates a data processing unit 2105 having a user interface 2175 that provides an evaluation 2520 of a brushing session of a user according to an embodiment of the invention. In this embodiment, the evaluation 2520 comprises a visualization 2521 of the user's denture. The denture can be divided into different regions, each of which the user is expected to brush during the brushing session. Brushing session data may be collected and processed according to the different regions of the denture. The collection of such brushing session data is described in more detail below with respect to FIGS. 32-34.

In the exemplified embodiment, the visualization 2521 includes an indication 2522 of a region of the denture not properly brushed. The evaluation 2520 further comprises a recommendation 2526 that provides the user advice on how to improve his or her brushing. The evaluation 2520 also includes a performance metric 2524 that indicates how well the user performed in brushing his or her teeth during the brushing session. In other embodiments, other metrics or visualizations can be used to indicate brushing performance, such as a percentage, or a number of stars (for example, three stars out of five). Further, as discussed above, in other embodiments, the evaluation can be a cumulative evaluation based on a plurality of brushing sessions and brushing goal data from those brushing sessions.

Figure 31:
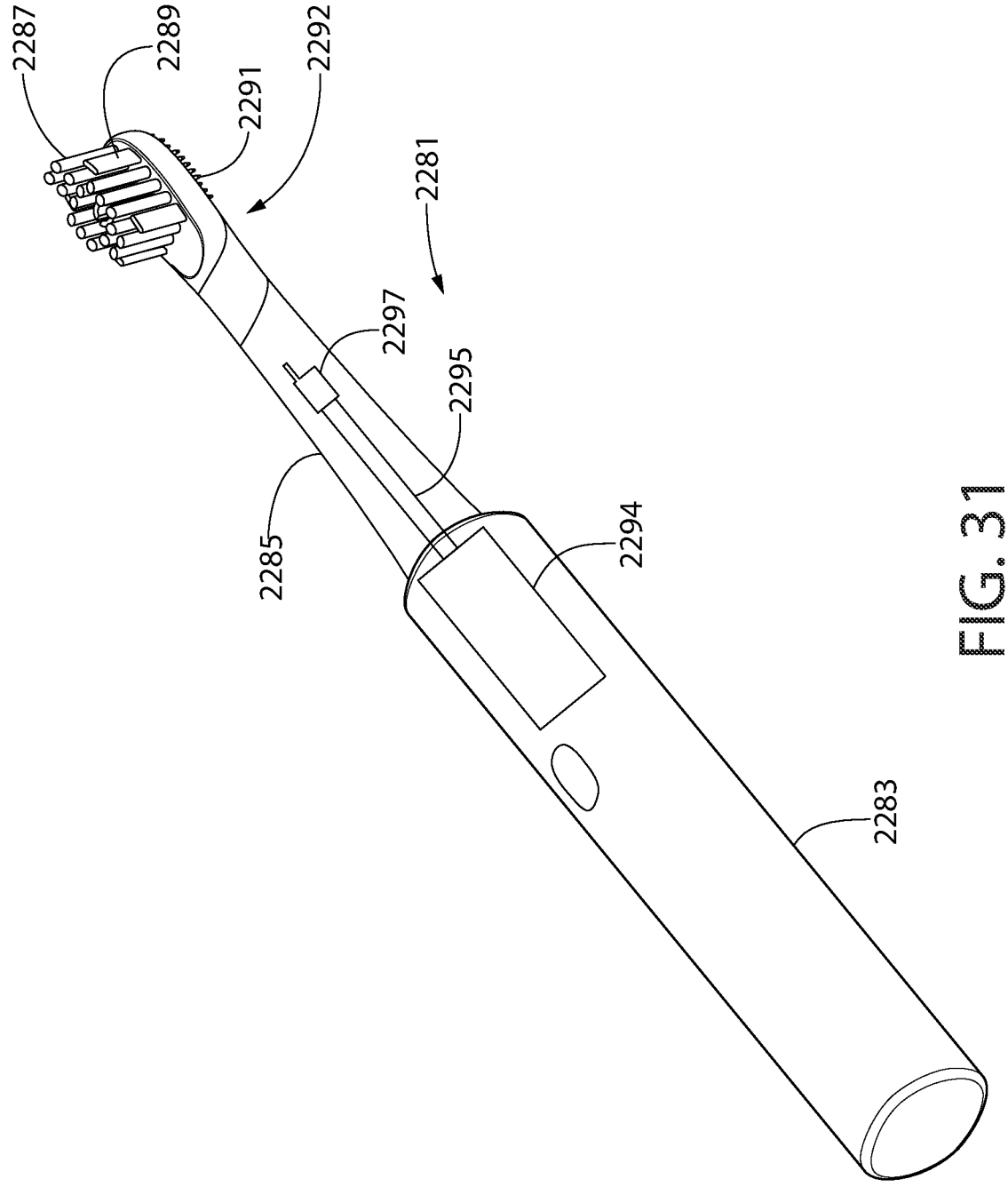
FIG. 31 illustrates an electronic toothbrush according to an embodiment of the invention.

FIG. 31 illustrates an electronic toothbrush 2281 according to an embodiment of the invention. The electric toothbrush 2281 includes a handle 2283 and a refill head 2285. In certain embodiments, the handle 2283 and the refill head 2285 are removably coupled to each other. In certain embodiments of electric toothbrushes, the control circuit 2165 of the data processing unit 2105 may reside at least partially within the handle 2283. Alternatively, the handle 2283 may include a separate toothbrush control circuit which controls the electric toothbrush and communicates with the data processing unit 2105.

In this embodiment, the refill head 2285 includes a bristle field 2287 which includes at least one elastomeric element 2289 and a tongue cleaner 2291 on the back side 2292 of the refill head 2285. Also in this embodiment, shown schematically, the handle includes a motor 2294 operably coupled to a shaft 2295, with an eccentric mass 2297 positioned at the distal end of the shaft 2295. In combination, the motor 2294, the shaft 2295, and the eccentric mass 2297 form an electrically-powered vibratory element.

Figures 32, 33:
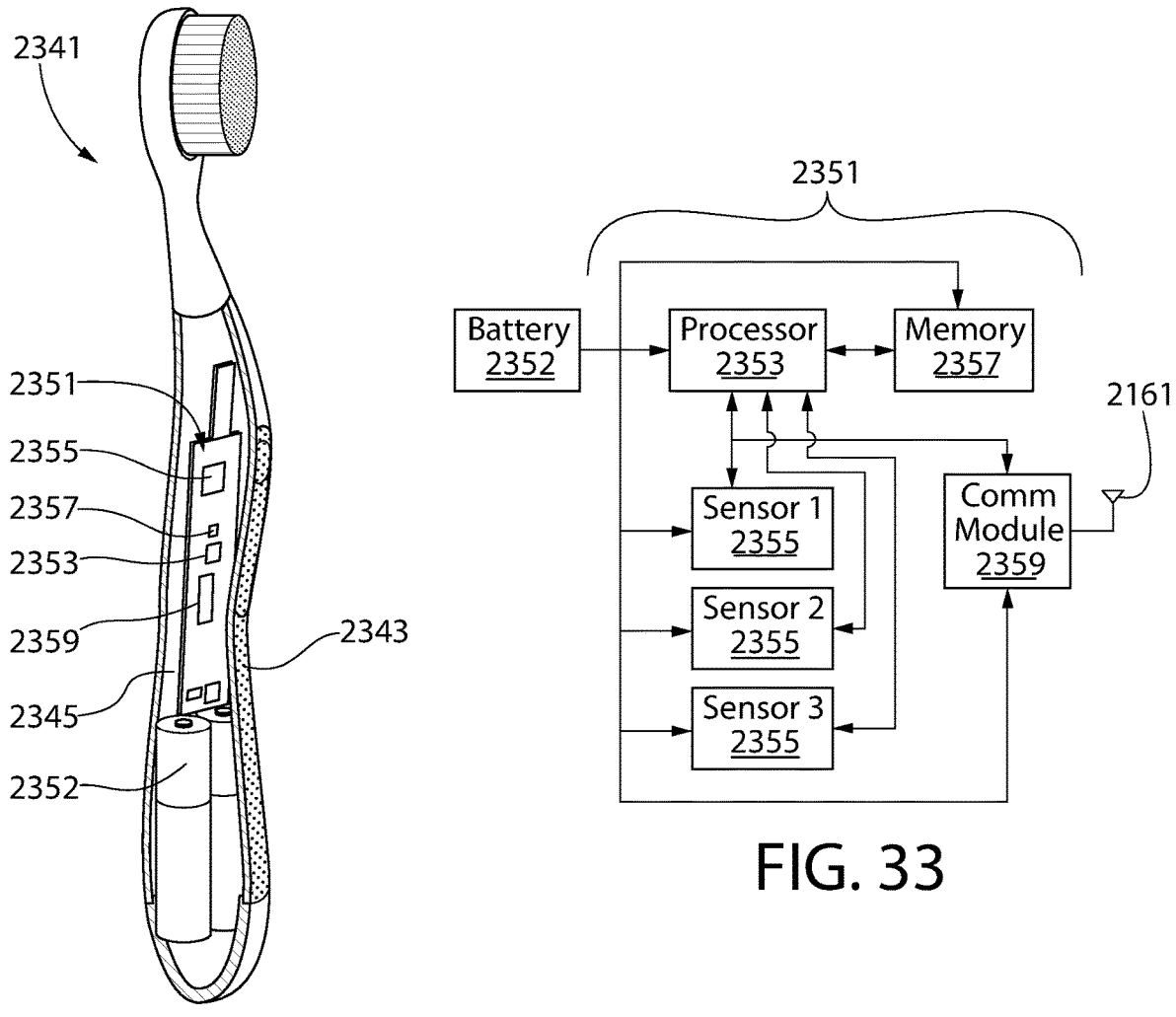
FIG. 32 illustrates a partial sectional view of a toothbrush having electronic circuitry for collecting brushing session data according to an embodiment of the invention.
FIG. 33 is a schematic of the electronic circuitry of the toothbrush of FIG. 32.

FIG. 32 illustrates a partial sectional view of a toothbrush 2351 having electronic circuitry for collecting brushing session data according to an embodiment of the invention. The handle 2343 of the toothbrush 2341 forms a housing for containing electronic circuitry 2351 for collecting brushing session data. The handle 2343 is a hollow structure in which a cavity 2345 is formed. The electronic circuitry 2351, which includes a power source 2352, is located within the cavity. The electronic circuitry 2351 may be used to collect and analyze brushing session data from which an evaluation of the brushing session may be made. In certain embodiments, the evaluation of the brushing session may be based at least in part upon the brushing goal data.

FIG. 33 is a schematic of the electronic circuitry 2351 of the toothbrush 2341 of FIG. 32. The electronic circuitry 2351 includes a processor 2353 communicably coupled to sensors 2355, a memory 2357, and a communication module 2359. The number of sensors 2355 included as part of the electronic circuitry 2351 depends upon the type of brushing session data to be detected and the functionality of each type of sensor employed. The brushing session data that is detected and collected may include position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 2355 may be included as part of the electronic circuitry 2351, and in other embodiments, two or more sensors 2355 may be included. By way of example, the at least one sensor 2355 may be any one or more of the following: a 3-axis accelerometer, a 6-axis accelerometer, a gyroscope, a magnetometer, a pressure sensor, among other types of sensors. In general, each sensor 2355 included as part of the electronic circuitry 2351 generates at least part of the brushing session data. For purposes of the present disclosure, the term "brushing session data" is any type of information which may be extracted or derived from a sensor or sensor signal, regardless of the form of the extracted information. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 2353 and the memory 2357 may be omitted from the electronic circuitry 2351 of the toothbrush 2341. In such embodiments, the sensors 2355 may communicate brushing session data directly to the communication module for transmission.

The memory 2357 may be any appropriate type of memory or storage which enables the processor 2353 to perform the desired programming, such as volatile and/or non-volatile random access memory, or any other type of storage. The particular type of storage used for the memory 2357 is not to be limiting of the invention. The communication module 2359 in the exemplary embodiment includes an antenna 2361 to enable wireless communication. The communication module 2359 may be configured and/or programmed to communicate using a wireless technology standard such as Wi-Fi, Bluetooth®, and the like, or it may communicate using any type of proprietary wireless transmission protocol. In certain embodiments, the communication module 2359 may include a port to enable communications using wires and wired protocols, such as USB and the like. The particular mode of communication used by the communication module is not limiting of the invention unless specifically set forth in a claim.

Figure 34:
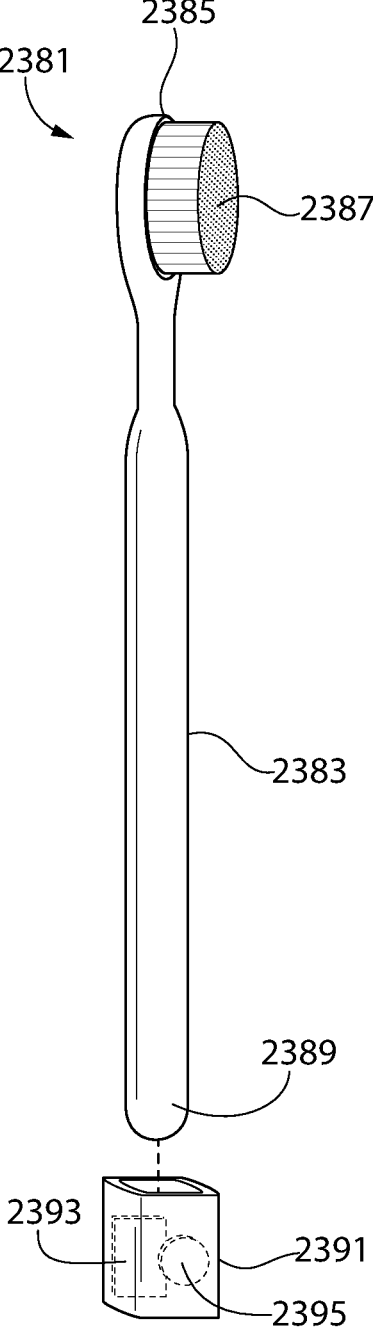
FIG. 34 illustrates a toothbrush dongle having electronic circuitry for collecting brushing session data.

FIG. 34 illustrates a toothbrush dongle 2391 for collecting brushing session data. Generally, the toothbrush 2381 includes a handle 2383 and a head 2385 to which a plurality of teeth cleaning elements 2387 are affixed. The dongle 2391 may be removably affixed to the proximal end 2389 of the handle 2383. The dongle 2391 comprises a housing for containing electronic circuitry 2393 and an associated a power source 2395, which may be similar to that described above in connection with FIG. 33.

The brushing session data which is detected and collected by the toothbrush embodiments shown in FIGS. 32-34 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 2171 of the data processing unit 2105 for later use. In certain embodiments, the data processing device 2105 may transmit the calculated performance metrics to the server 2107 for storage and or additional analysis.

In certain embodiments, the performance metrics which are stored in the memory 2171 of the data processing unit 2105 or on the server 2107 may be used during future brushing sessions to aid in determining what brushing routine to suggest to the user. For example, performance metrics may be used in combination with the brushing goal data to help determine the target brushing time for a brushing routine. Also, in embodiments in which performance metrics are stored, the performance metrics may be analyzed by machine learning processes, and the machine learning may be used to enhance future brushing routines.

The disclosed embodiments provide several advantages. For example, the system can provide a brushing routine that takes into consideration the brushing goal of the user. Thus, the brushing routine provided can reflect the objective of a user for a given brushing session, rather than providing the same standard routine regardless of the situation. Further, the system can provide a brushing evaluation that takes into consideration the brushing goal of the user. Thus, an evaluation can be based on what the user intended to accomplish during the brushing session, rather than judging the brushing session based on an unadaptable, one-size-fits-all standard.

Figure 35A:
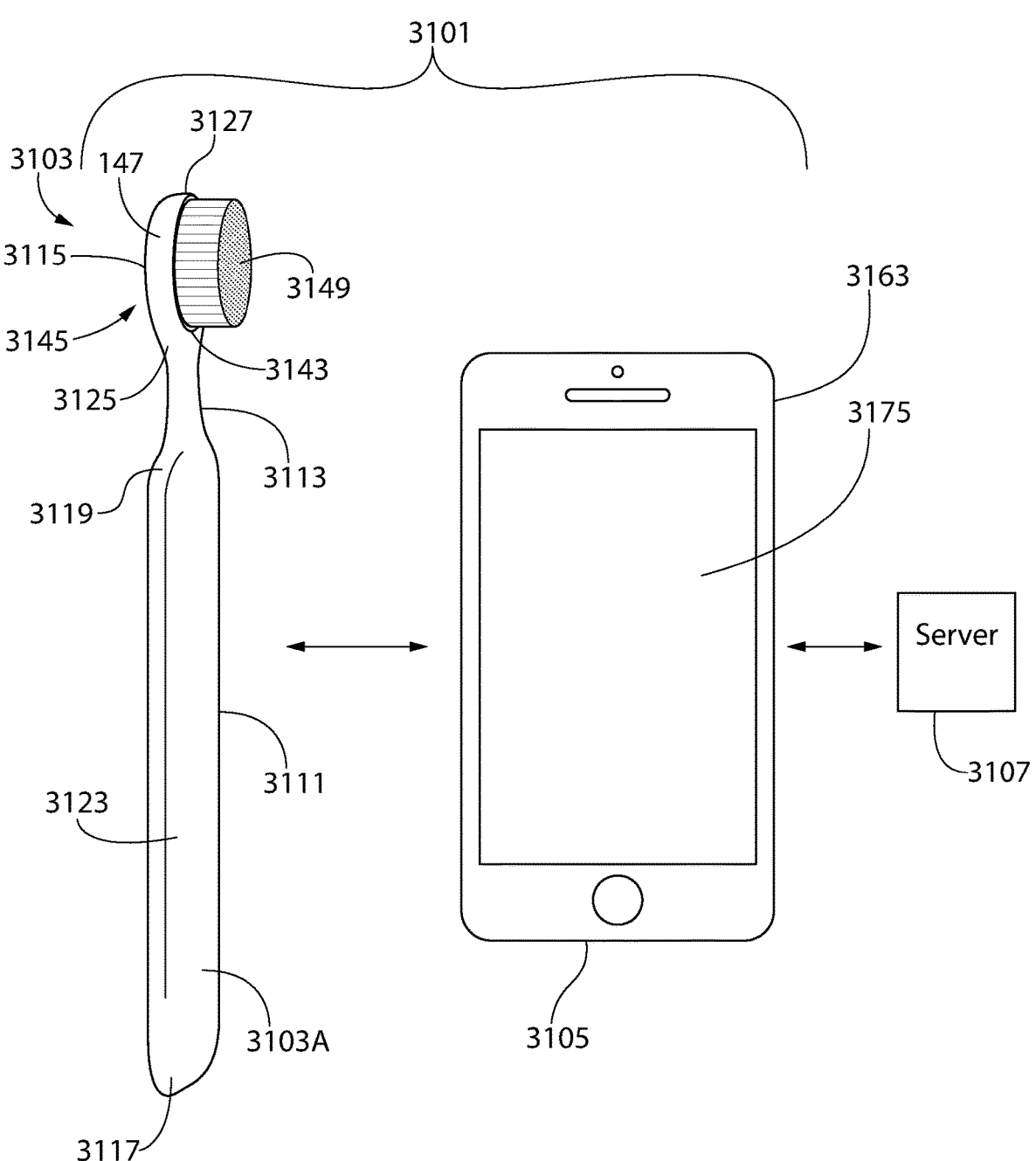
FIG. 35A illustrates an oral care system according to another embodiment of the present invention.

Turning in detail to the drawings, FIG. 35A illustrates an oral care system 3101 in accordance with an embodiment of the present invention. The oral care system 3101 includes a toothbrush 3103 and a data processing unit 3105. The data processing unit 3105 may communicate with a server 3107, for example, for purposes of storing larger amounts of data or to provide server-side processing functionality. The presence of the server 3107 and communication between the data processing unit 3105 and the server 3107, however, are not limiting of the present invention, unless specifically set forth in a claim.

The toothbrush 3103 may be of any type that includes teeth cleaning elements suitable for cleaning teeth, and therefore is not limited to the toothbrush 3103 illustrated as part of the exemplary embodiment. The toothbrush 3103 shown in FIG. 35A generally includes a handle 3111, a neck 3113, and a head 3115. The neck 3113 extends between the handle 3111 and the head 3115 and connects the head 3115 to the handle 3111. The handle 3111 provides the user with a mechanism by which the toothbrush 3103 can be readily gripped and manipulated during a brushing session. The handle 3111 may be formed of many different shapes, sizes and materials and may be formed by a variety of manufacturing methods that are well-known to those skilled in the art. The handle 3111 extends from a proximal end 3117 to a distal end 3119 to form an elongated gripping portion 3123 therebetween. The handle 3111 transitions into the neck 3113 at the distal end 3119. While the neck 3113 generally has a smaller transverse cross-sectional area than the handle 3111, the invention is not so limited. Broadly speaking, the neck 3113 forms a transition region between the handle 3111 and the head 3115, with the head 3115 extending from a proximal end 3125 at the end of the neck 3113 opposite the handle 3111 to a distal end 3127. While the head 3115 is normally widened relative to the neck 3113, in some embodiments the head 3115 can simply be a continuous extension or narrowing of the neck 3113 and/or handle 3111.

The handle 3111, the neck 3113, and the head 3115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 3111, the neck 3113, and the head 3115 of the toothbrush 3103 may be formed as a single unitary structure using a molding, milling, machining, or other suitable process. In certain embodiments, the neck 3113 may be made from a material which is more flexible than the handle 3111 or the head 3115, and in such embodiments, the flexibility of the neck 3113 provides the head 3115 with mobility with respect to the handle 3111. Whether the handle 3111, the neck 3113, and the head 3115 are of a unitary or multi-piece construction (including connection techniques) is not limiting of the present invention, unless specifically set forth in a claim. In some embodiments of the invention, the head 3115 can have a first portion that is flexibly attached to a second portion of the head 3115. During brushing, the first portion can move with respect to the second portion to enhance the brush head's ability to reach certain portions of the denture of the user (the denture being understood as the user's set of teeth). In some embodiments of the invention, the head 3115 may be detachable (and replaceable) from the handle 3111 and/or from the neck 3113 using techniques known in the art.

The head 3115 generally includes a front surface 3143, a rear surface 3145 and peripheral side surfaces 3147 that extend between the front and rear surfaces 3143, 3145. The front surface 3143 and the rear surface 3145 of the head 3115 can take on a wide variety of shapes and contours, none of which are limiting of the present invention. For example, the front and rear surfaces 3143, 3145 can be planar, contoured or combinations thereof.

The front surface 3143 of the head 3115 includes at least one teeth cleaning element, shown in the exemplary embodiment as a plurality of bristles 3149, extending therefrom for cleaning teeth surfaces. As used herein, the term "teeth cleaning element" is used in a generic sense to refer to any structure that can be used to clean or polish the teeth through relative surface contact. In certain embodiments, the head 3115 may include a single teeth cleaning element, and in other embodiments, the head 3115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 3149 of the toothbrush 3111 can be connected to the head 3115 in any manner known in the art. For example, staples/anchors, in-mold tufting (IMT) or anchor free tufting (AFT) could be used to mount the bristles 3149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 35B:
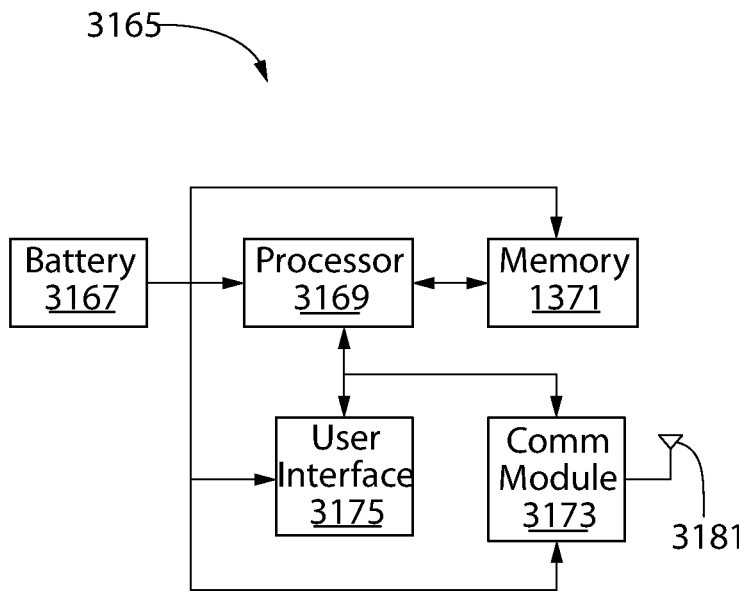
FIG. 35B is a schematic of the electronic circuitry of the data processing unit of FIG. 35A.

Referring to both FIGS. 35A and 35B, the data processing unit 3105 includes a housing 3163 and electronic circuitry 3165, with the housing 3163 enclosing and/or supporting the various components of the electronic circuitry 3165. The electronic circuitry 3165 includes a power source, shown as a battery 3167 in the exemplary embodiment. The invention is not so limited, and other types of power sources may be used. The electronic circuitry 3165 of the data processing unit 3105 also includes a processor 3169 communicably coupled to a memory 3171, a communication module 3173, and a user interface 3175.

In certain embodiments, the electronic circuitry 3165 may include other components, such as a speaker to provide audible feedback to the user, one or more buttons to receive input from the user, and one or more ports for making a wired connection between the electronic circuitry 3165 and other circuitry external to the data processing unit 3105. In certain other embodiments, the data processing unit 3105 may be a smartphone, a tablet computer, a laptop computer, and the like, although the invention is not so limiting. In the exemplified embodiment, the electronic circuitry 3165 is located within housing 3163 of the data processing unit 3105, this housing 3163 being separate and distinct from the housing 3103A of the toothbrush 3103 In other embodiments, such as that discussed below with respect to FIG. 38, the electronic circuitry 3165 or certain components thereof may be located within the housing 3103A of the toothbrush 3103.

The memory 3171 may be any appropriate type of memory or storage which enables the processor 3169 to perform the desired programming, such as volatile and/or non-volatile random access memory. The particular type of storage used for the memory 3171 is not to be limiting of the invention.

In the exemplified embodiment, the user interface 3175 is a touch-sensitive display which accepts input from the user directly on the display surface. The display may be any type of light emitting display, and as shown in the exemplary embodiment, the display may be an LED panel. In certain other embodiments, the display may be an LCD panel, an OLED panel, or any other type of display which is electronically controllable by the programmable processor 3169 to provide visual feedback to the user. As will be discussed below, the user interface is not limited to the exemplary embodiment, but can comprise any device or method by which a user interacts with the data processing unit or a programmable processor. For example, in other embodiments the user interface can utilize a non-touch-sensitive graphical user interface, buttons, a dial, a keyboard, and/or a mouse. In other embodiments, a user interface can be omitted. For example, instead of receiving an oral characteristic by a user interface, oral characteristic data can be received from, or based on, data from a sensor that forms part of a brush.

The communication module 3173 may include an antenna 3181 to enable wireless transmission of communication signals. The communication module 3173 may be configured and/or programmed to communicate using a wireless technology standard such as Wi-Fi, Bluetooth®, and the like, or it may communicate using any type of proprietary wireless transmission protocol. The mode of communication for which the communication module 3173 is configured is not limiting of the invention unless specifically set forth in a claim. In certain embodiments, the communication module 3173 may include a port to enable communications using wires and wired protocols, such as USB and the like.

The communication module 3173 of the data processing unit 3105 may be configured and/or programmed to communicate with the server 3107. The communication module 3173 may communicate with the server 3107 over any combination of public and/or private network, and the communications may be wired, wireless, or a combination of the two. In certain embodiments, the communication module 3173 may communicate with the server 3107 over the Internet using one or more types of communication protocols. In certain embodiments, the server 3107 may be programmed with one or more application programming interfaces (APIs) which provides server-side functionality to the data processing unit 3105. The communication module 3173 may also be configured to communicate with the toothbrush 3103, for example, in the receipt from the toothbrush 3103 of data related to a brushing session.

Figure 36:
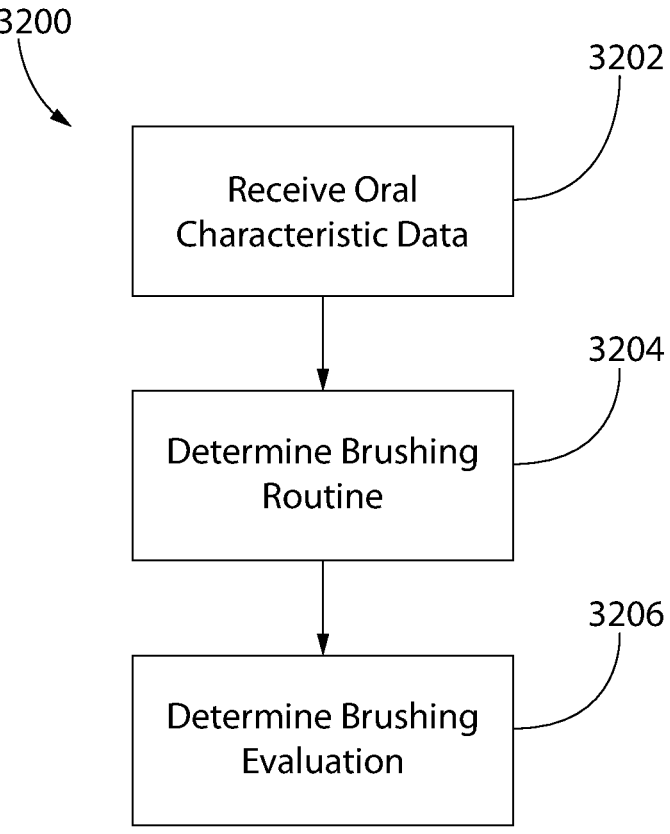
FIG. 36 is a flowchart showing a process for determining a brushing routine and a brushing evaluation based on oral characteristic data according to an embodiment of the invention.

FIG. 36 is a flowchart showing a process 3200 for determining a brushing routine and a brushing evaluation from an oral characteristic according to an embodiment of the invention. In one embodiment, the exemplified process 3200 may be implemented as programming for the programmable processor 3169 of the data processing unit 3105. For convenience, as part of the description below, reference will also be made to the hardware components of the data processing unit 3105 discussed above in FIG. 35B, and means for obtaining brushing session data discussed with respect to FIGS. 42-44. While in the exemplified embodiment the processor 3169 and other electronic circuitry 3165 form part of the data processing unit, the disclosure is not so limited. For example, in other embodiments, a processor forming part of the toothbrush can carry out the steps carried out by processor 3169 in the embodiments discussed herein.

In a first operation, the programmable processor 3169 receives oral characteristic data indicative of an oral characteristic of a user (operation 3202). An "oral characteristic" can refer to any quality or trait of or affecting a user's oral cavity. Such oral characteristics can include, but are not limited to, an oral sensitivity (e.g., of the teeth, gums, or another part of the mouth), an abnormality of the denture (e.g., a missing tooth, a crooked tooth, an extra tooth), the presence or absence of wisdom teeth, a receding gum line, a tooth structure that traps (or tends to trap) plaque, plaque present at a first portion of the denture, a cavity, an erosion of one or more teeth, an oral injury or procedure (e.g., a recent tooth removal), a type of bacteria present in the mouth (including excessive bacteria or a harmful bacteria), and any indicator (physical, chemical, or otherwise) of a disease or malady (e.g., oral cancer).

"Oral characteristic data" can refer to any type of information indicative of an oral characteristic of a user, including information extracted or derived from other information or data indicative of an oral characteristic, regardless of the form of the extracted information, and combinations thereof. The oral characteristic data may be in the form of mathematical data, analog data, and/or digital data. For example, the oral characteristic data can be data obtained from a user interface, data obtained from a sensor, or data derived from one or both of the foregoing.

In certain embodiments, the oral characteristic is input at a user interface of a data processing unit. The data processing unit then generates oral characteristic data indicative of the chosen oral characteristic, which is then transmitted to a programmable processor. The receipt of oral characteristic data from a user interface is discussed in more detail below with respect to FIGS. 37A and 37B.

In certain other embodiments, the oral characteristic data can be generated using a sensor operably coupled to a programmable processor. The sensor can be any device or subsystem configured to detect an oral characteristic (or evidence of an oral characteristic) and generate oral characteristic data. For example, the sensor can be an accelerometer, a gyroscope, a magnetometer, a pressure sensor, an optical imaging subsystem, and an oral malady detection subsystem. In some embodiments, the sensor can form part of the toothbrush (e.g., an accelerometer located on a head of the toothbrush to detect motion of the brush head). In other embodiments, the sensor can form part of a separate device, such as a data processing unit (e.g., a camera on the phone that can carry out optical imaging to detect a receding gum line or a cavity).

Figures 42, 43:
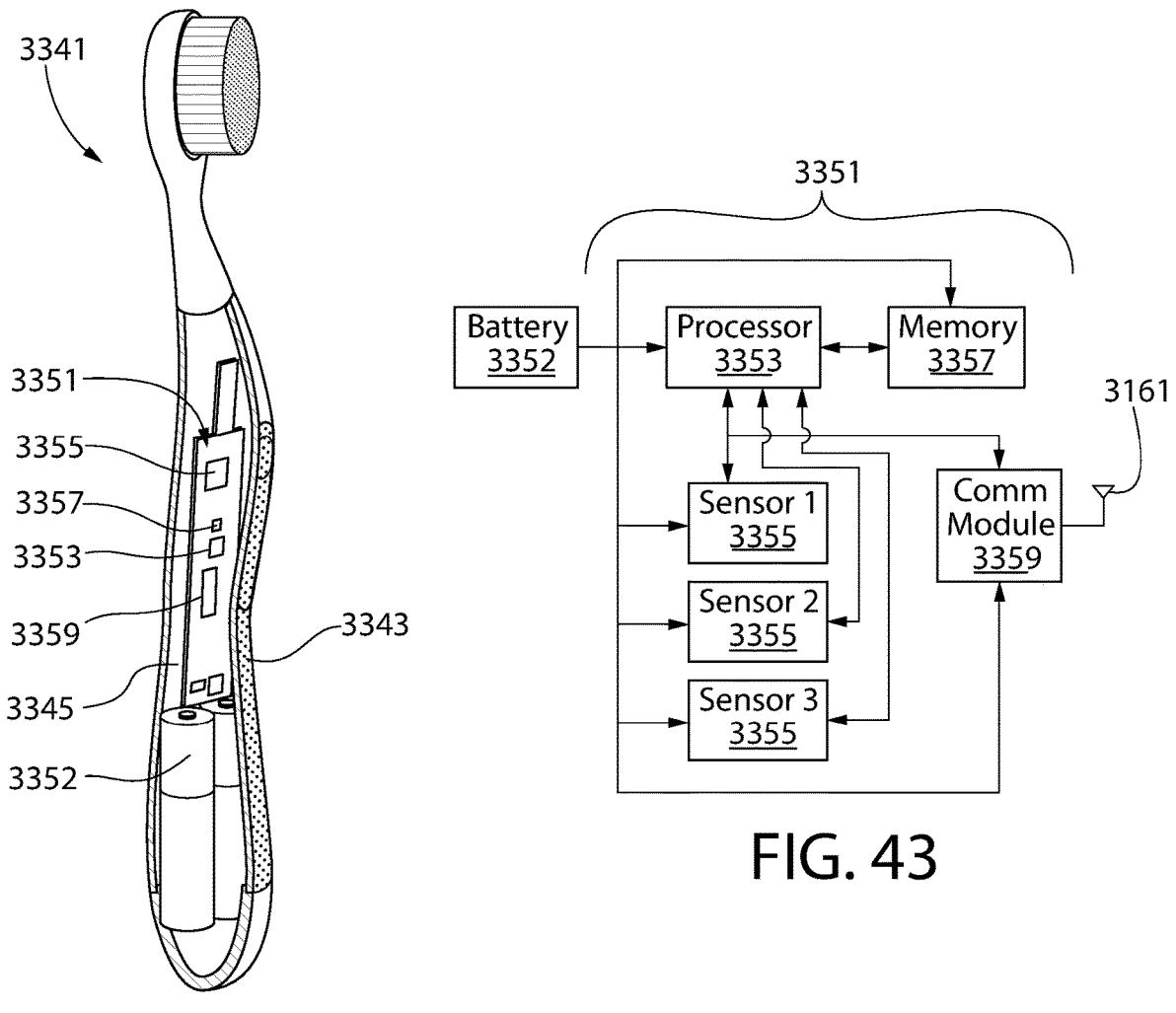
FIG. 42 illustrates a partial sectional view of a toothbrush having electronic circuitry for collecting brushing session data according to an embodiment of the invention.
FIG. 43 is a schematic of the electronic circuitry of the toothbrush of FIG. 42.
Figure 44:
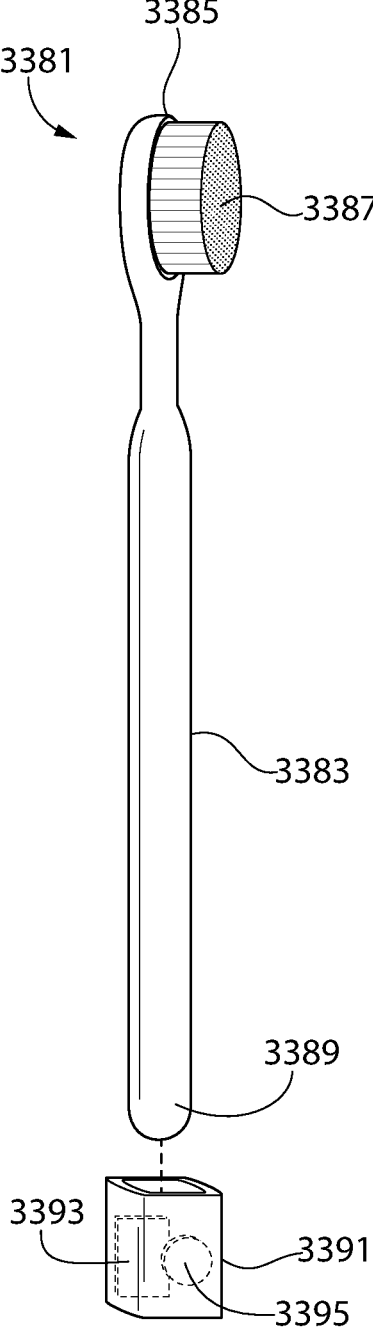
FIG. 44 illustrates a toothbrush dongle having electronic circuitry for collecting brushing session data according to an embodiment of the invention.

For example, FIGS. 42-44 discuss a toothbrush 3351 having electronic circuitry for collecting brushing session data. As is discussed in more detail below, the one or more sensors 3355 can be, for example, an accelerometer, gyroscope, magnetometer, or pressure sensor. The brushing session data that is detected by the sensor may include data regarding, for example, a toothbrush's position, motion, acceleration, frequency, and/or pressure against the surface of the teeth. The brushing session data can be indicative of numerous issues, such as avoidance of a portion of the denture (indicating, for example, an oral sensitivity), excessive brushing (indicating for example, a tooth structure that traps plaque or food), a unique brushing motion (indicating for example, a hidden, crooked, or missing tooth), or the presence or absence of a chemical (indicating, for example, a high bacteria content in the user's mouth).

In one embodiment, the sensors generate brushing session data indicative of brushing motion, location, and/or pressure. This data is then used to determine that the user is avoiding brushing a certain portion of the denture, or using only minimal pressure. This avoidance can indicate an oral sensitivity at or adjacent to that portion of the denture. To confirm, a user interface, upon receiving such brushing session data, can provide the user a question such as "Do you have oral sensitivity in the region indicated below," with an image of the user's denture and an indication of the avoided portion.

In another embodiment, excessive brushing of a certain portion of the denture can indicate a tooth structure that traps plaque or food, such as molars that tend to cause cavities, or a crooked or hidden tooth (i.e., a tooth behind another tooth and difficult to access). If the brushing session data indicates excessive brushing of a certain portion, the user interface can query the user to determine or confirm the reason.

In another embodiment, the sensor can determine that the user is using a unique brushing motion for a portion of the denture. The user interface can query the user as to whether this motion is being carried out to clean a unique oral characteristic, such as a hidden, crooked, or missing tooth, a gap in the teeth, or another unique property of the user's denture. For example, a user may use a unique, vertical brushing motion to brush a hidden tooth, or may not move the brush as deeply into the oral cavity because of missing wisdom teeth or molars.

In another embodiment, the sensor can be an oral malady detection subsystem. For example, a subsystem could use chemistry to determine the presence of an abnormal property, such as high bacteria content in a user's saliva. Other properties could be indicative of a cavity, plaque, bad breath, or cancer, or another oral disease or malady.

In another embodiment, the sensor can be an optical imaging subsystem that can identify a unique oral characteristic, such as receding gum line in a certain area, a missing or crooked tooth, an extra tooth, or a cavity. For example, an imaging system can distinguish the white of a tooth and the pink of gums to determine a length of a gum line and whether there is an abnormality. An imaging system could similarly be used to identify a developing cavity and thus an area that warranted more brushing attention, or tooth erosion from tooth grinding that can cause sensitivity. The subsystem can utilize the technology of a data processing unit providing a user interface (such as the camera and processor of a smartphone), or another, separate device.

It is noted that, in some of the embodiments discussed above, the user is queried to confirm that the suspected oral characteristic is present. In other embodiments, this step can be omitted. Further, the sensor(s) can determine a suspected oral characteristic based on data from one brushing session or from a plurality of brushing sessions. Further, the above characteristics can alternatively be determined by querying the user, rather than by using brushing session data provided by sensors.

In a further operation, a suggested brushing routine is determined based at least in part on the oral characteristic data (operation 3204). The suggested brushing routine can be any one or more steps or instructions for brushing teeth. The determination of the suggested brushing routine may be achieved in any number of ways. In certain embodiments, the suggested brushing routine may be determined by presenting the user with a list of potential brushing routines that accord with the determined oral characteristic, and having the user select the suggested brushing routine from among the list of potential brushing routines. In certain embodiments, the suggested brushing routine may be determined by adjusting a standardized brushing routine based on the oral characteristic data, or by adjusting a time based on the oral characteristic data, as described below. In certain embodiments, the suggested brushing routine may be determined by selecting a predetermined brushing routine based on the oral characteristic data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 3171 of the data processing unit 3105 or in a memory of the server 3107. In still other embodiments, one or more of the aforementioned processes for determining the suggested brushing routine may be used in combination.

In one embodiment, the suggested brushing routine is determined by adjusting an optimum brushing time based on the oral characteristic data to determine the brushing time for the suggested brushing routine. In this embodiment, the optimum brushing time is predetermined from a standardized brushing routine. The standardized brushing routine may be an industry standard brushing routine in which the optimum brushing time is 2 minutes. This process can begin with the oral characteristic data being received by the data processing unit 3105. Next, the data processing unit 3105 determines an offset time based on the oral characteristic data. For example, if a certain portion of the denture is sensitive, then the offset time for this portion may be a negative number. Following the offset time determination, the target brushing time for the brushing routine is calculated. As part of this step, the programmable processor 3169 of the data processing unit 3105 calculates the target brushing time by retrieving an optimum time which is stored in the memory 3171 and adding the determined offset time to the optimum time. The determined target brushing time can then be displayed, and the user can be instructed to begin the suggested brushing routine. In certain embodiments, the processor 3169 of the data processing unit 3105 may provide other specific instructions for the brushing routine, such as the order for brushing different sections of the user's denture, the length of time to brush each section, which section to start with, the brushing motions to use for each section, and the like. When the brushing time has expired, the programmable processor 3169 of the data processing unit 3105 can instruct the user that the brushing routine is at an end.

In the exemplified embodiment, after determining the suggested brushing routine, there can be a determination of a brushing evaluation based on the oral characteristic data (operation 3206). As will be discussed in further detail below, the oral care system 3101 can be configured to perform a brushing evaluation of a brushing session of a user. The brushing evaluation can be any assessment of the effectiveness of one or more brushing sessions. For example, as discussed in FIGS. 42-44, the toothbrush 3103 can include sensors, and data derived from the sensors can be used to determine the motion, location, and/or pressure of the toothbrush. From this determination, the system 3101 can determine how well the user brushed his or her teeth. In the exemplified embodiment, the evaluation is based in part on the oral characteristic data. Thus, for example, while a brushing evaluation would typically provide a negative evaluation when a certain portion of the denture was only brushed for ten seconds or with light pressure, the brushing evaluation according to the invention need not be negative if the user indicated that this was a sensitive portion of the denture. Accordingly, the user is not penalized in his brushing evaluation for dedicating less brushing time (or applying softer pressure) to a sensitive area of his denture. Thus, in certain embodiments, the determination of the brushing evaluation is based on both oral characteristic data and brushing data from a brushing session, the brushing data being derived from a sensor forming part of the toothbrush. Further, the brushing evaluation can be based on a comparison of the brushing data from the brushing session and the suggested brushing routine. For example, the brushing evaluation can be based on how well the user followed the suggested brushing routine.

The oral characteristic data can impact an evaluation of an individual brushing session, and can also impact an evaluation of a plurality of brushing sessions. Thus, while a recent wisdom tooth removal surgery will justify less and more gentle brushing of the molars for a few weeks, there is an expectation that eventually the brushing time and intensity will increase. A cumulative evaluation can reflect this. The cumulative evaluation will not penalize the user for gentle brushing immediately after the surgery, but will also expect more normal brushing to return eventually.

In the exemplified method 3200, the oral characteristic data is used to both determine a suggested brushing routine and determine a brushing evaluation. It is noted, however, that in other embodiments the oral characteristic data can be used to determine a suggested brushing routine but not to determine a brushing evaluation, or to determine a brushing evaluation but not to determine a suggested brushing routine.

The following are some examples of determined oral characteristics, and resulting brushing routines and/or evaluations. In one example, if there is a determination that a portion of the denture is sensitive, a suggested routine can recommend less time brushing the sensitive portion. Further, an evaluation can expect less time brushing this portion of the denture.

In another example, if there is a determination of an oral characteristic that warrants excessive brushing of a portion of the denture (e.g., a tooth structure that traps plaque or food, such as molars that tend to cause cavities, or a crooked or hidden tooth), a suggested brushing routine can dedicate additional time to this portion of the denture. Further, an evaluation can expect additional time brushing this portion of the denture.

In another example, if there is a determination that a unique oral characteristic warrants a unique brushing motion (e.g., a hidden, crooked, or missing tooth), a suggested routine can adjust its instructions to allow adequate brushing of these unique oral characteristics, including recommending the unique brushing motion. Further, an evaluation can allow for or expect these unique brushing motions.

Figure 37A:
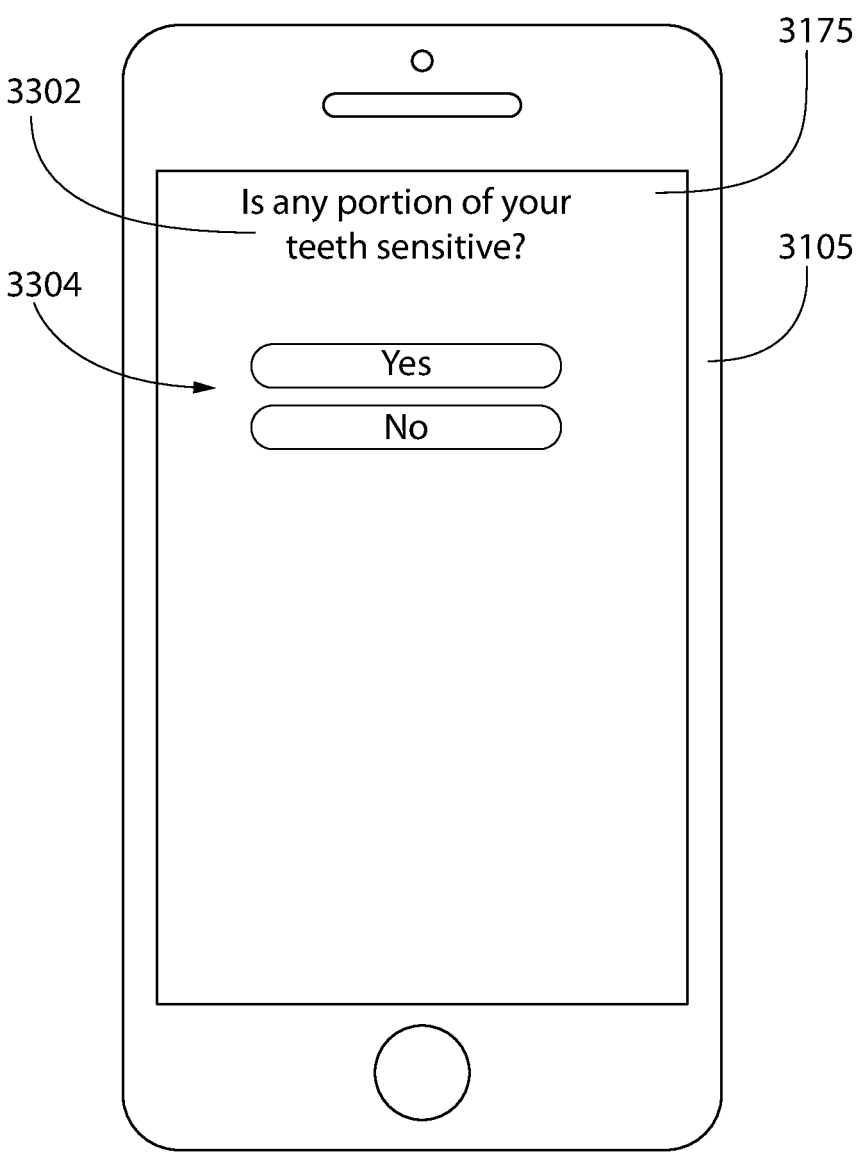
FIG. 37A illustrates a data processing unit having a user interface providing a question and answer options regarding an oral characteristic according to an embodiment of the invention.
Figure 37B:
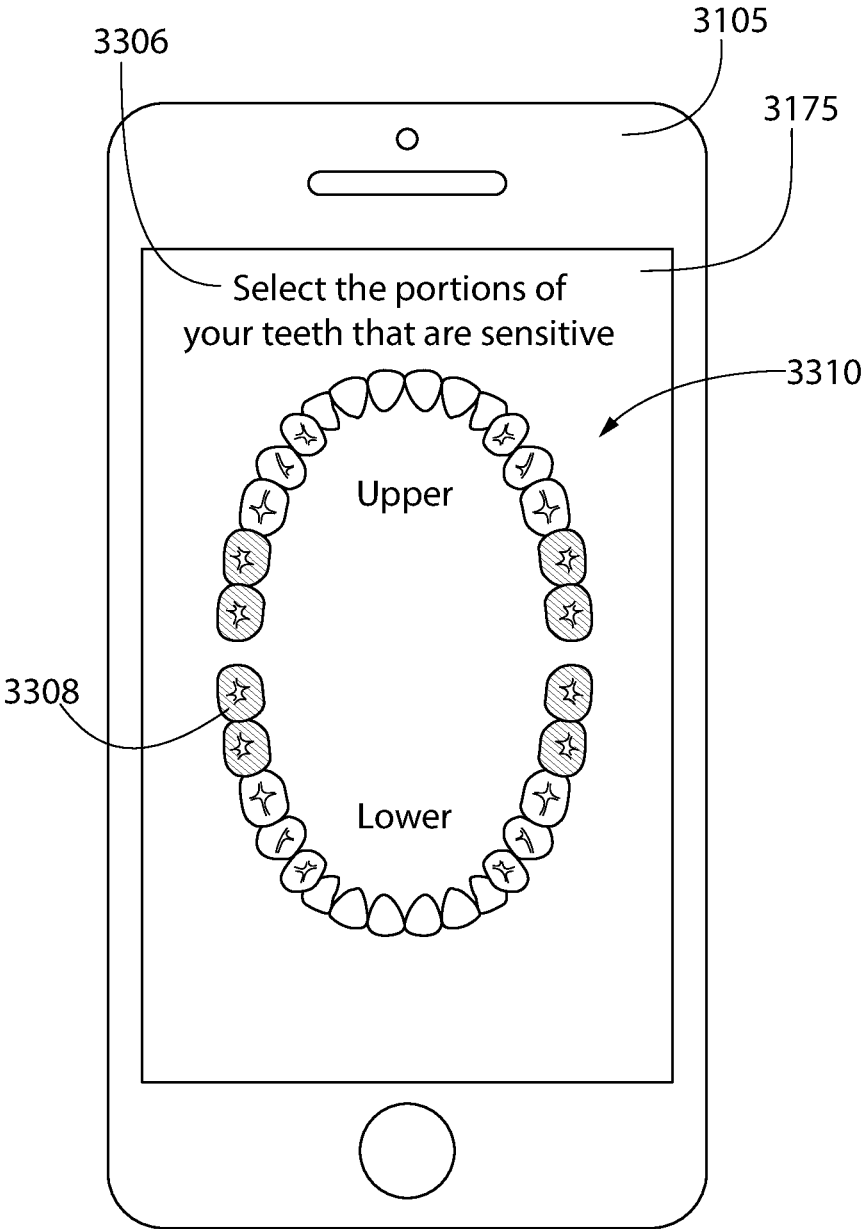
FIG. 37B illustrates a data processing unit having a user interface providing a statement and response options regarding an oral characteristic according to an embodiment of the invention.

FIGS. 37A and 37B illustrates a data processing unit 3105 having a user interface 3175 for determining an oral characteristic according to one embodiment. In FIG. 37A, the user interface 3175 provides a question 3302 and answer options 3304 regarding an oral characteristic. Here, the user inputs the oral characteristic through a user interface 3175 that is a touch-sensitive screen, though alternative types of user interfaces can be utilized. In this embodiment, the user indicates that he has sensitive teeth. In FIG. 37B, a statement 330 is provided that is responsive to the answer 3304. The statement 3306 asks the user which portion of the user's teeth are sensitive. A visualization of the denture 3310 is provided. Here, the user provides a response 3308 indicating that the back molars are sensitive. The questions, answers, statements, and responses shown are merely exemplary in nature, and any oral characteristics can be the subject of a question, answer, statement, or response on a user interface for the purposes of receiving oral characteristic data. In other embodiments, a user can type an oral characteristic and be provided with options that corresponded with the typed oral characteristic. In other embodiments, a series of questions, statements, or topics can be provided to the user by the user interface. For example, the user interface can be used to determine several oral characteristics of the user and in varying degrees of detail.

Figure 38:
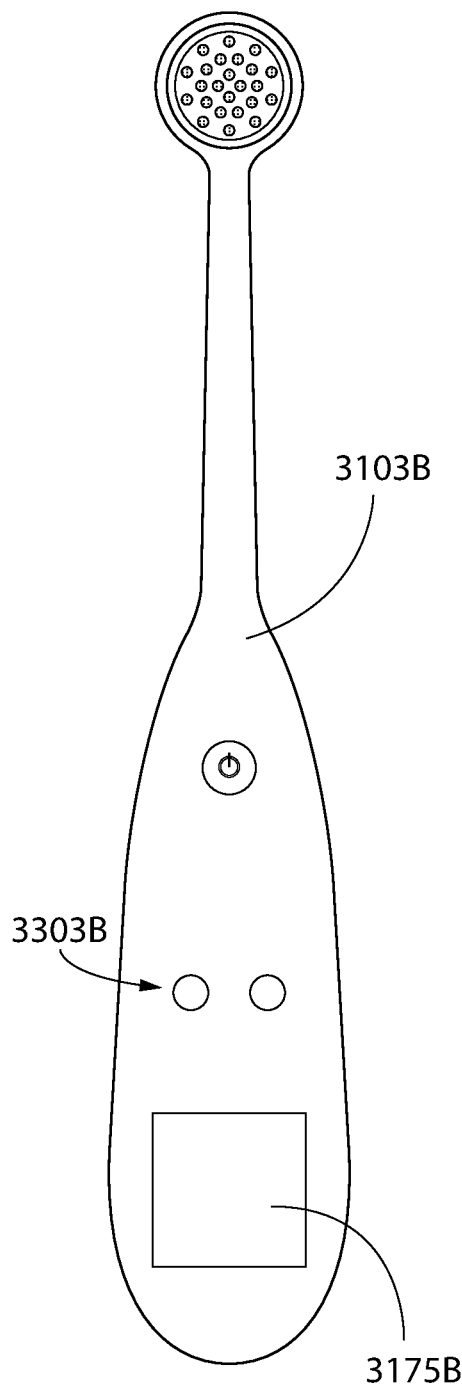
FIG. 38 illustrates a toothbrush comprising a user interface according to an embodiment of the invention.

FIG. 38 illustrates a toothbrush 3103B comprising a user interface 3175B according to another embodiment of the invention. In this embodiment, the toothbrush 3103B comprises a user interface 3175B and a programmable processor (not shown) similar to programmable processor 3169 that forms part of data processing unit 3105. The user interface 3175B comprises buttons 3303B for use in providing or selecting an oral characteristic. The exemplified user interface 3175B further comprises a display. The display can provide information similar to the information displayed on the touch-sensitive display 3175. For example, the display can provide information regarding a suggested brushing routine, or brushing evaluation information. In other embodiments, the display can have more limited functionality. In other embodiments, the display can be omitted. In this case, the user can indicate his oral characteristic using the buttons (or another user interface), but the determined routine or evaluation can appear elsewhere, such as on a separate data processing unit. Further, the toothbrush 3103B can be any type of toothbrush, including a manual toothbrush or an electric toothbrush having an electrically-powered vibratory element.

Figure 39:
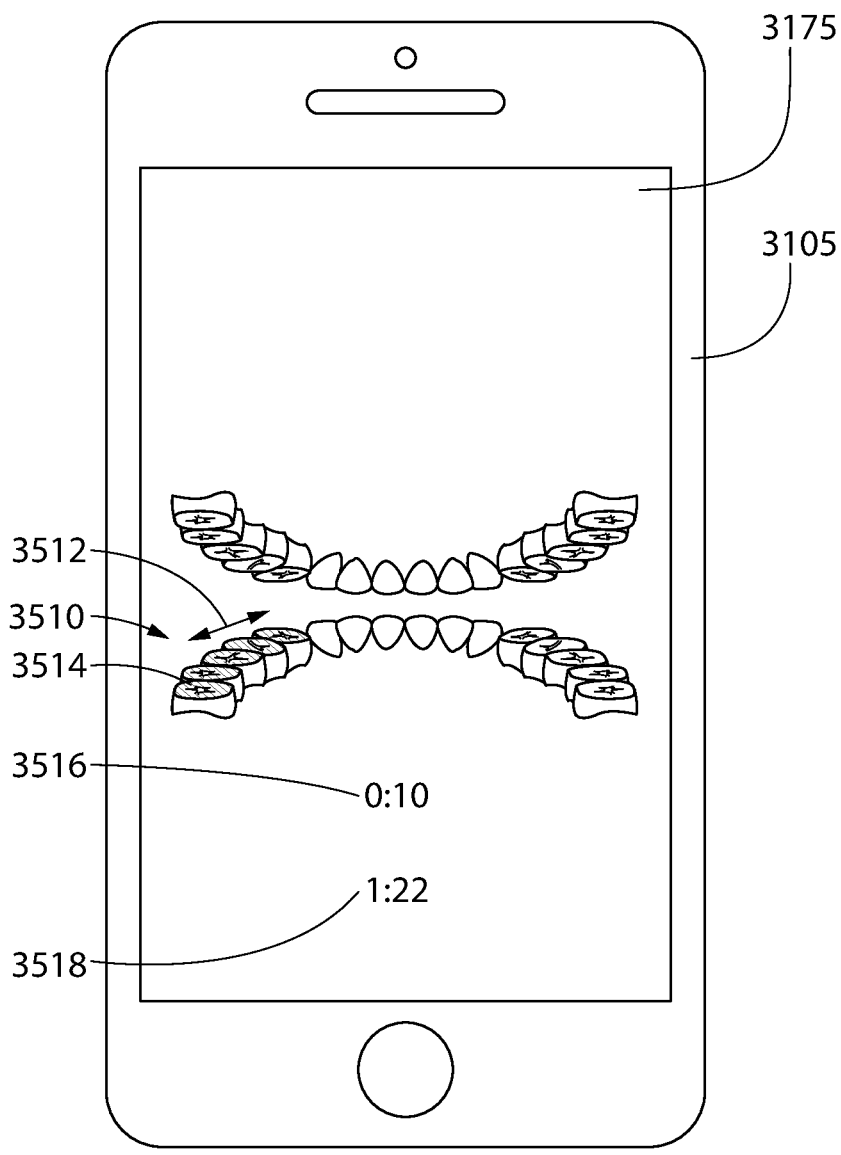
FIG. 39 illustrates a data processing unit having a user interface that provides brushing instructions for a brushing routine according to an embodiment of the invention.

FIG. 39 illustrates a data processing unit 3105 having a user interface 3175 that provides brushing instructions 3510 for a brushing routine according to one embodiment, the instructions 3510 being based in part on the oral characteristic received. In this embodiment, the brushing instructions 3510 comprise real-time directions for a user to follow during a brushing session. The instructions 3510 comprise an indication 3514 of a region of the denture to brush, an indication 3512 of a brushing motion, and an indication 3516 of a time remaining for brushing the specified region. In this embodiment, the user interface 3175 also provides an indication 3518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity. The instructions (such as motion, region, and time) can be based at least in part on the oral characteristic of the user. Thus, for example, if a first portion of the user's denture was sensitive (or was adjacent to a receding gum line, or included a sensitive eroded tooth), the routine could reflect this by decreasing the brushing time suggested for this first portion of the denture, and/or by changing the brushing motions suggested for this portion of the dentiture. Further, if an oral characteristic is a tooth structure that traps plaque, the routine can reflect this by increasing the brushing time for the portion of the dentiture having this tooth structure, and/or by changing the brushing motions suggested for this portion of the dentiture. An evaluation of the brushing session can also reflect such adjusted expectations.

The suggested brushing routine can be determined by adjusting a preexisting brushing routine, the adjustment based at least in part on the oral characteristic data. In other embodiments, the suggested brushing routine need not rely on a preexisting brushing routine. The brushing routine of the exemplified embodiment is provided in real-time, so that the user can follow a succession of instructions provided on the user interface 3175. In other embodiments, the entire routine can be provided at once, and can be provided by other means, such as an email or a text message.

Figure 40:
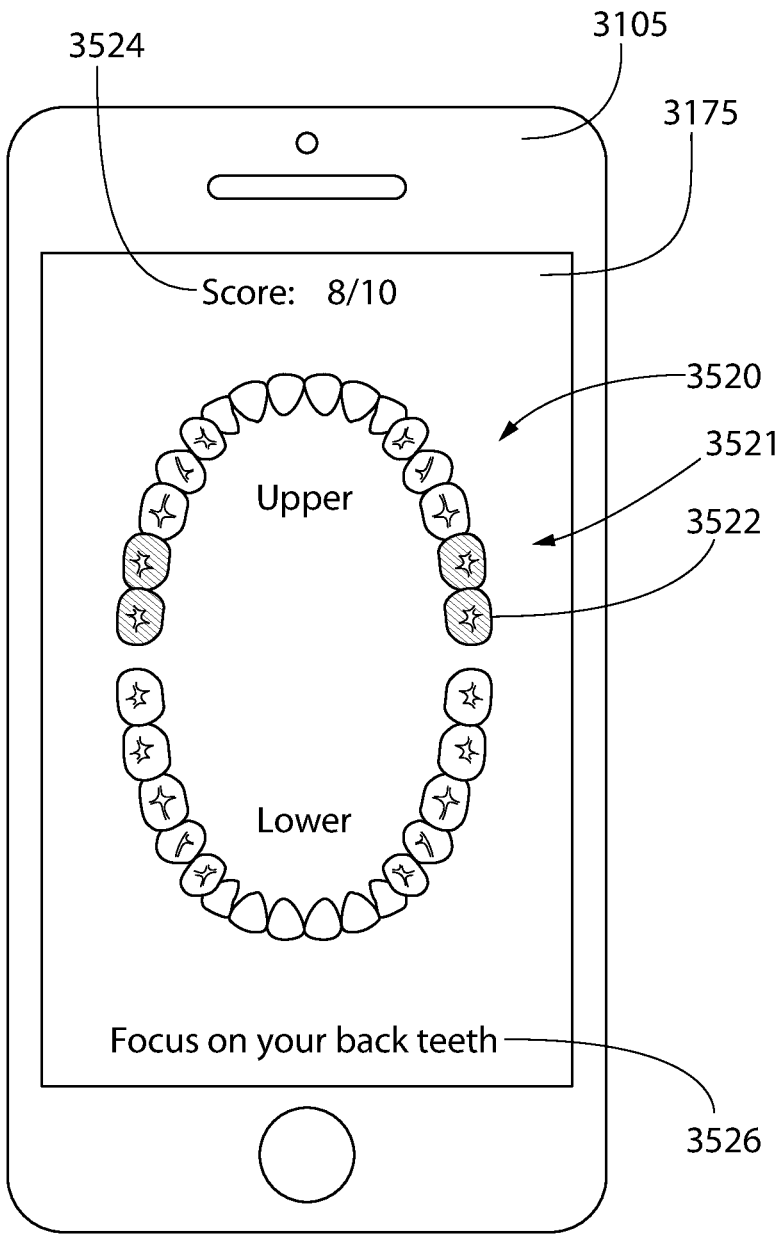
FIG. 40 illustrates a data processing unit having a user interface that provides an evaluation of a brushing session of a user according to an embodiment of the invention.

FIG. 40 illustrates a data processing unit 3105 having a user interface 3175 that provides an evaluation 3520 of a brushing session of a user according to an embodiment of the invention. In this embodiment, the evaluation 3520 comprises a visualization 3521 of the user's denture. The denture can be divided into different regions, each of which the user is expected to brush during the brushing session. Brushing session data may be collected and processed according to the different regions of the denture. The collection of such brushing session data is described in more detail below with respect to FIGS. 42-44.

In the exemplified embodiment, the visualization 3521 includes an indication 3522 of a region of the denture not properly brushed. The evaluation 3520 further comprises a recommendation 3526 that provides the user advice on how to improve his or her brushing. The evaluation 3520 also includes a performance metric 3524 that indicates how well the user performed in brushing his or her teeth during the brushing session. In other embodiments, other metrics or visualizations can be used to indicate brushing performance, such as a percentage, or a number of stars (for example, three stars out of five). Further, as discussed above, in other embodiments, the evaluation can be a cumulative evaluation based on a plurality of brushing sessions and oral characteristic data from those brushing sessions.

Figure 41:
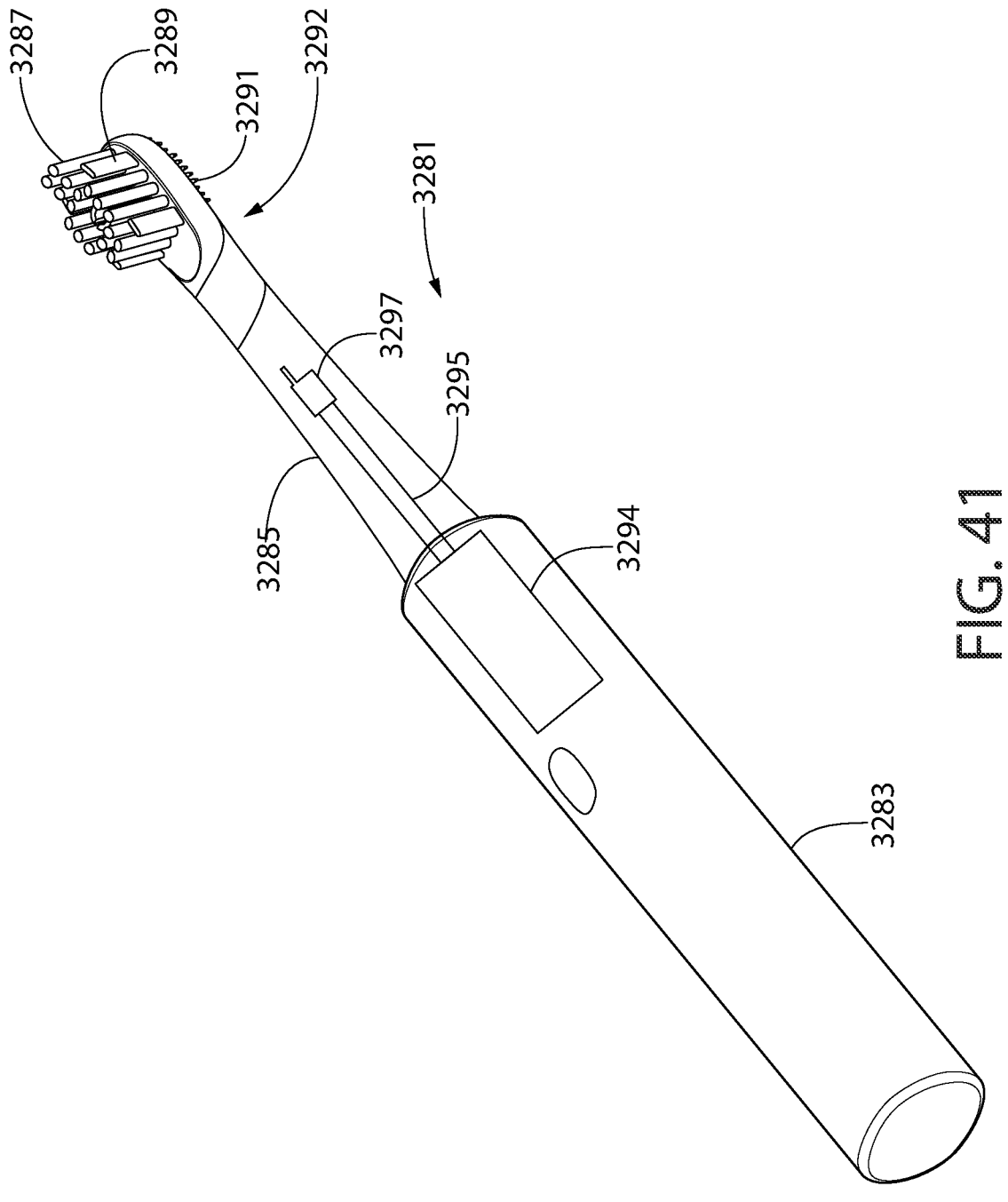
FIG. 41 illustrates an electronic toothbrush according to an embodiment of the invention.

FIG. 41 illustrates an electronic toothbrush 3281 according to an embodiment of the invention. The electric toothbrush 3281 includes a handle 3283 and a refill head 3285. In certain embodiments, the handle 3283 and the refill head 3285 are removably coupled to each other. In certain embodiments of electric toothbrushes, the control circuit 3165 of the data processing unit 3105 may reside at least partially within the handle 3283. Alternatively, the handle 3283 may include a separate toothbrush control circuit which controls the electric toothbrush and communicates with the data processing unit 3105.

In this embodiment, the refill head 3285 includes a bristle field 3287 which includes at least one elastomeric element 3289 and a tongue cleaner 3291 on the back side 3292 of the refill head 3285. Also in this embodiment, shown schematically, the handle includes a motor 3294 operably coupled to a shaft 3295, with an eccentric mass 3297 positioned at the distal end of the shaft 3295. In combination, the motor 3294, the shaft 3295, and the eccentric mass 3297 form an electrically-powered vibratory element.

FIG. 42 illustrates a partial sectional view of a toothbrush 3351 having electronic circuitry for collecting brushing session data according to an embodiment of the invention. The handle 3343 of the toothbrush 3341 forms a housing for containing electronic circuitry 3351 for collecting brushing session data. The handle 3343 is a hollow structure in which a cavity 3345 is formed. The electronic circuitry 3351, which includes a power source 3352, is located within the cavity. The electronic circuitry 3351 may be used to collect and analyze brushing session data from which an evaluation of the brushing session may be made. In certain embodiments, the evaluation of the brushing session may be based at least in part upon the oral characteristic data. As discussed above, the brushing session data can also be used to determine an oral characteristic.

FIG. 43 is a schematic of the electronic circuitry 3351 of the toothbrush 3341 of FIG. 42. The electronic circuitry 3351 includes a processor 3353 communicably coupled to sensors 3355, a memory 3357, and a communication module 3359. The number of sensors 3355 included as part of the electronic circuitry 3351 depends upon the type of brushing session data to be detected and the functionality of each type of sensor employed. The brushing session data that is detected and collected may include data regarding position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 3355 may be included as part of the electronic circuitry 3351, and in other embodiments, two or more sensors 3355 may be included. By way of example, the at least one sensor 3355 may be any one or more of the following: a 3-axis accelerometer, a gyroscope, a magnetometer, a pressure sensor, among other types of sensors. In general, each sensor 3355 included as part of the electronic circuitry 3351 generates at least part of the brushing session data. For purposes of the present disclosure, the term "brushing session data" is any type of information which may be extracted or derived from a sensor or sensor signal, regardless of the form of the extracted information, for determining information about a brushing session of a user. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 3353 and the memory 3357 may be omitted from the electronic circuitry 3351 of the toothbrush 3341. In such embodiments, the sensors 3355 may communicate brushing session data directly to the communication module for transmission.

The memory 3357 may be any appropriate type of memory or storage which enables the processor 3353 to perform the desired programming, such as volatile and/or non-volatile random access memory, or any other type of storage. The particular type of storage used for the memory 3357 is not to be limiting of the invention. The communication module 3359 in the exemplary embodiment includes an antenna 3361 to enable wireless communication. The communication module 3359 may be configured and/or programmed to communicate using a wireless technology standard such as Wi-Fi, Bluetooth®, and the like, or it may communicate using any type of proprietary wireless transmission protocol. In certain embodiments, the communication module 3359 may include a port to enable communications using wires and wired protocols, such as USB and the like. The particular mode of communication used by the communication module is not limiting of the invention unless specifically set forth in a claim.

FIG. 44 illustrates a toothbrush dongle 3391 for collecting brushing session data. Generally, the toothbrush 3381 includes a handle 3383 and a head 3385 to which a plurality of teeth cleaning elements 3387 are affixed. The dongle 3391 may be removably affixed to the proximal end 3389 of the handle 3383. The dongle 3391 comprises a housing for containing electronic circuitry 3393 and an associated a power source 3395, which may be similar to that described above in connection with FIG. 43.

The brushing session data which is detected and collected by the toothbrush embodiments shown in FIGS. 42-44 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 3171 of the data processing unit 3105 for later use. In certain embodiments, the data processing device 3105 may transmit the calculated performance metrics to the server 3107 for storage and or additional analysis.

In certain embodiments, the performance metrics which are stored in the memory 3171 of the data processing unit 3105 or on the server 3107 may be used during future brushing sessions to aid in determining what brushing routine to suggest to the user. For example, performance metrics may be used in combination with the oral characteristic data to help determine the target brushing time for a brushing routine. Also, in embodiments in which performance metrics are stored, the performance metrics may be analyzed by machine learning processes, and the machine learning may be used to enhance future brushing routines.

The embodiments above discuss using oral characteristic data to determine a brushing routine and/or evaluation. Note that the routine or evaluation can also be based on other factors, such as predetermined brushing standards (e.g., two minutes of total brushing time and recommended brushing motions for different portions of the denture), physical characteristics of the brush being used by the user (e.g., soft or hard bristles, or the shape and/or size of the toothbrush head), and the user's brushing goals for a given brushing session (e.g., a quick fresh as opposed to a deep clean).

In certain embodiments, the user can use the data processing unit while brushing his teeth to receive real-time instructions for the brushing routine. In such instances, the brush and the data processing unit can be in communication. In other instances, the brush can be used without the data processing unit, and/or without a processor immediately determining a brushing routine or evaluation. For example, the brush can store brushing session data locally in the toothbrush, and this data can be retrieved at a later time. This stored brushing session data can subsequently be used for providing a brushing evaluation or suggested brushing routine, and/or for suggesting potential oral characteristics.

The disclosed embodiments provide several advantages. For example, the system can provide a brushing routine that takes into consideration the unique oral characteristics of the user. Thus, the brushing routine provided can reflect oral characteristics of the user, rather than providing the same standard routine regardless of the user. Further, the system can provide a brushing evaluation that takes into consideration the oral characteristics of the user. Thus, an evaluation can be based on the user's unique oral characteristics, rather than judging the brushing session based on an unadaptable, one-size-fits-all standard. For example, if a user has a first portion of the denture that is sensitive and is adjacent to a receding gum line, the suggested routine can dedicate less brushing time to this first portion, and can avoid penalizing the user for spending less than a standard time brushing this portion. Alternatively, if a user still has his or her wisdom teeth, the suggested routine can dedicate more time to the back molars, and the evaluation can expect that the user's brushing motion reaches further back in the oral cavity when brushing the back molars.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention or inventions have been described with respect to specific examples, those skilled in the art will appreciate that there are numerous variations and permutations of the above described invention(s). It is to be understood that other embodiments may be utilized and structural and functional modifications may be made without departing from the scope of the present invention(s). Thus, the spirit and scope should be construed broadly as set forth in the appended claims.

The invention claimed is:

1. An oral care system comprising:
a toothbrush comprising a sensor configured to generate brushing data during a brushing session of a user;
a programmable processor configured to:
receive the brushing data from the sensor;
receive oral characteristic data indicative of a user-identified structural abnormality of the denture; and
determine at least one of a suggested brushing routine and a brushing evaluation for a brushing session based at least in part on the oral characteristic data and the brushing data;
wherein the user-identified structural abnormality is present in or adjacent to a first portion of the denture; and
wherein the brushing evaluation or the suggested brushing routine is based on or includes at least one of:
an altered target brushing time for the first portion of the denture, the altered target brushing time determined by altering a standard brushing time by a time offset that is based on the oral characteristic data; and
a modified brushing motion expectation for the first portion of the denture, the modified brushing motion expectation determined by modifying a standard brushing motion based on the oral characteristic data;
wherein the brushing data generated by the sensor is indicative of a brushing motion associated with the abnormality of the denture; and
wherein the altered target brushing time and the modified brushing motion expectation are determined during the brushing session based on both the user-identified structural abnormality and real-time brushing data indicative of interaction with the user-identified structural abnormality, the user-identified structural abnormality being at least one of: a missing tooth, a crooked tooth, or an extra tooth.

2. The system according to claim 1 wherein the programmable processer is configured to both determine the suggested brushing routine and determine the brushing evaluation for the brushing session.

3. The system according to claim 1 wherein the receiving of the oral characteristic data comprises:

presenting to the user, by a user interface that is operably coupled to the programmable processor, one or more questions or statements concerning at least one oral characteristic of the user; and receiving the oral characteristic data as answers or responses to the one or more questions or statements, the answers or responses being selected by the user using the user interface.

4. The system according to claim 1 wherein the oral characteristic further pertains to at least one of an oral sensitivity, a receding gum line, a tooth structure that traps plaque, plaque present at a first portion of the denture, a cavity, an erosion of one or more teeth, an oral injury or procedure, a type of bacteria present in the mouth, or an oral disease or malady.

5. The system according to claim 1 wherein:

the oral characteristic is an oral sensitivity, a receding gum line, or an erosion of one or more teeth; and the altered target brushing time is determined by decreasing the standard brushing time by the time offset.

6. The system according to claim 1 wherein:

the oral characteristic is a tooth structure that traps plaque at the first portion of the denture of the user; and the altered target brushing time is determined by increasing the standard brushing time by the time offset.

7. The system according to claim 1 further comprising a user interface operably coupled to the programmable processor, the user interface being configured to display brushing instructions based on the suggested brushing routine, the brushing instructions comprising real-time directions for a user to follow during the brushing session.

8. The system according to claim 1 further comprising a data processing unit, the data processing unit comprising the programmable processor.

9. An oral care method comprising:

generating, via a sensor, brushing data during a brushing session of a user;

receiving oral characteristic data indicative of a user-identified structural abnormality of the denture;

determining, by a programmable processor, at least one of a suggested brushing routine and a brushing evaluation for a brushing session based at least in part on the oral characteristic data and the brushing data;

wherein the user-identified structural abnormality of the denture is present in or adjacent to a first portion of the denture; and wherein the brushing evaluation or the suggested brushing routine is based on or includes at least one of:

an altered target brushing time for the first portion of the denture, the altered target brushing time determined by altering a standard brushing time by a time offset that is based on the oral characteristic data; and a modified brushing motion expectation for the first portion of the denture, the modified brushing motion expectation determined by modifying a standard brushing motion based on the oral characteristic data;

wherein the brushing data generated by the sensor is indicative of a brushing motion associated with the abnormality of the denture; and wherein the altered target brushing time and the modified brushing motion expectation is determined during the brushing session based on both the user-identified structural abnormality and real-time brushing data indicative of interaction with the user-identified structural abnormality, the user-identified structural abnormality being at least one of: a missing tooth, a crooked tooth, or an extra tooth.

10. The method according to claim 9 wherein the receiving of the oral characteristic data comprises:

presenting to the user, via a user interface, one or more questions or statements concerning at least one oral characteristic of the user; and receiving the oral characteristic data as answers or responses to the one or more questions or statements, the answers or responses being selected by the user using the user interface.

11. The method according to claim 9 wherein the oral characteristic further pertains to at least one of an oral sensitivity, a receding gum line, a tooth structure that traps plaque, plaque present at a first portion of the denture, a cavity, an erosion of one or more teeth, an oral injury or procedure, a type of bacteria present in the mouth, or an oral disease or malady.

12. The method according to claim 9 further comprising a user interface that displays brushing instructions based on the suggested brushing routine, the brushing instructions comprising real-time directions for a user to follow during the brushing session.

13. An oral care system comprising:

a toothbrush comprising a sensor configured to generate brushing data during a brushing session of a user; and a data processing unit comprising:

a programmable processor configured to:

receive oral characteristic data indicative of a user-identified structural abnormality of the denture;

determine for the user, based at least in part on the oral characteristic data and the brushing data, a suggested brushing routine; and determine for the user, based at least in part on the oral characteristic data and the brushing data, a brushing evaluation for a brushing session;

wherein the user-identified structural abnormality is present in or adjacent to a first portion of the denture; and wherein the brushing evaluation or the suggested brushing routine is based on or includes at least one of:

an altered target brushing time for the first portion of the denture, the altered target brushing time determined by altering a standard brushing time by a time offset that is based on the oral characteristic data; and a modified brushing motion expectation for the first portion of the denture, the modified brushing motion expectation determined by modifying a standard brushing motion based on the oral characteristic data;

wherein the brushing data generated by the sensor is indicative of a brushing motion associated with the abnormality of the denture; and wherein the altered target brushing time and the modified brushing motion expectation is determined during the brushing session based on both the user-identified structural abnormality and real-time brushing data indicative of interaction with the user-identified structural abnormality, the user-identified structural abnormality being at least one of: a missing tooth, a crooked tooth, or an extra tooth.

14. The system according to claim 13 wherein the receiving of the oral characteristic data comprises:

presenting to the user, via a user interface, one or more questions or statements concerning at least one oral characteristic of the user; and receiving the oral characteristic data as answers or responses to the one or more questions or statements, the answers or responses being selected by the user using the user interface.

\* \* \* \* \*